(12) United States Patent
Fuse et al.

(10) Patent No.: US 6,335,814 B1
(45) Date of Patent: Jan. 1, 2002

(54) OPTICAL TRANSMISSION SYSTEM AND OPTICAL TRANSMITTER AND OPTICAL RECEIVER USED THEREFOR

(75) Inventors: Masaru Fuse, Toyonaka; Jun Ohya, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/136,934

(22) Filed: Aug. 20, 1998

(30) Foreign Application Priority Data

Aug. 22, 1997 (JP) .................................................. 9-226291
Mar. 11, 1998 (JP) ................................................ 10-060135
Apr. 30, 1998 (JP) ................................................ 10-121498

(51) Int. Cl.[7] .................................................. H04B 10/04
(52) U.S. Cl. .......................................... 359/182; 359/183
(58) Field of Search ................................... 359/182–183, 359/140, 173, 188

(56) References Cited

U.S. PATENT DOCUMENTS

| 4,959,826 A | * | 9/1990 | Smith ............................. 370/1 |
| 5,541,755 A | | 7/1996 | Noe et al. ...................... 359/110 |
| 5,625,479 A | * | 4/1997 | Suzuki et al. ................ 359/135 |
| 6,271,950 A | * | 8/2001 | Hansen et al. ............... 359/135 |

FOREIGN PATENT DOCUMENTS

JP          7-73639         3/1995

OTHER PUBLICATIONS

K. Kikushima et al., "Optical Super Wide–Band FM modulation Scheme and Its application to Multi–Channel AM Video Transmission Systems", IOOC '95, PD2–7, pp. 33 and 34.

* cited by examiner

Primary Examiner—Kinfe-Michael Negash
(74) Attorney, Agent, or Firm—Wenderoth, Lind & Ponack, L.L.P.

(57) ABSTRACT

An angle modulating portion 1 converts an inputted electrical signal into a predetermined angle-modulated signal. An optical modulating portion 2 converts the angle-modulated signal outputted from the angle modulating portion 1 into an optical-modulated signal and sends the optical-modulated signal to an optical waveguide portion 3. An interference portion 6 separates the optical-modulated signal transmitted through the optical waveguide portion 3 into two optical signals having predetermined difference in propagation delay and then combines the optical signals. An optical/electrical converting portion 4 subjects the combined optical signal to homodyne detection, to acquire a demodulated signal of the original electrical signal and output the electrical signal. That is, the interference portion 6 and the optical/electrical converting portion 4 constitute a delayed detection system of an optical signal, so that the delayed detection system performs conversion processing of an optical signal into an electrical signal and angle demodulation processing simultaneously. In this way, a signal with a wide-band and a high-frequency can be acquired by demodulation without electrical part for wide-bands and high-frequencies.

36 Claims, 31 Drawing Sheets

AMPLITUDE FLUCTUATION COMPONENT OF FIRST OPTICAL SIGNAL

AMPLITUDE FLUCTUATION COMPONENT OF SECOND OPTICAL SIGNAL

Io(t)
WAVEFORM OF OPTICAL CURRENT OUTPUTTED FROM OPTICAL/ ELECTRICAL CONVERTING PORTION

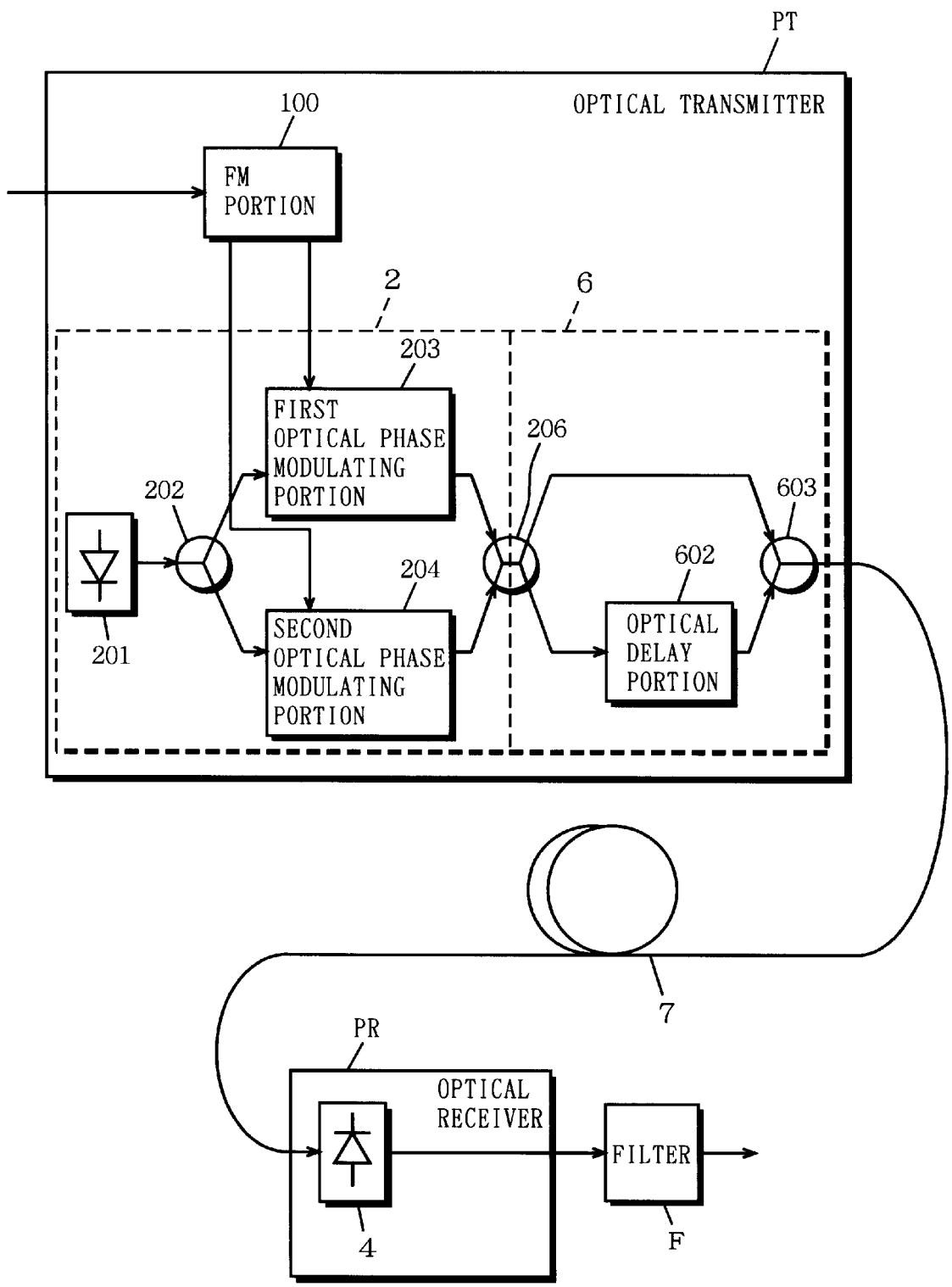

AMPLITUDE
FLUCTUATION
COMPONENT
OF FIRST
OPTICAL
SIGNAL

AMPLITUDE
FLUCTUATION
COMPONENT
OF SECOND
OPTICAL
SIGNAL

WAVEFORM
OF OPTICAL
CURRENT
OUTPUTTED
FROM
OPTICAL/
ELECTRICAL
CONVERTING
PORTION

AMPLITUDE
FLUCTUATION
COMPONENT
OF FIRST
OPTICAL
SIGNAL

AMPLITUDE
FLUCTUATION
COMPONENT
OF SECOND
OPTICAL
SIGNAL

OPTICAL
CURRENT
OUTPUTTED
FROM
OPTICAL/
ELECTRICAL
CONVERTING
PORTION $Io(t)$

FM
DEMODULATED
SIGNAL

ORIGINAL DEMODULATED
SIGNAL LEVEL

DEMODULATED SIGNAL LEVEL
OF FM SIGNAL WHEN
ITS AMPLITUDE IS DEGRADED

FIG. 16a

FM SIGNAL OF WIDE-BAND

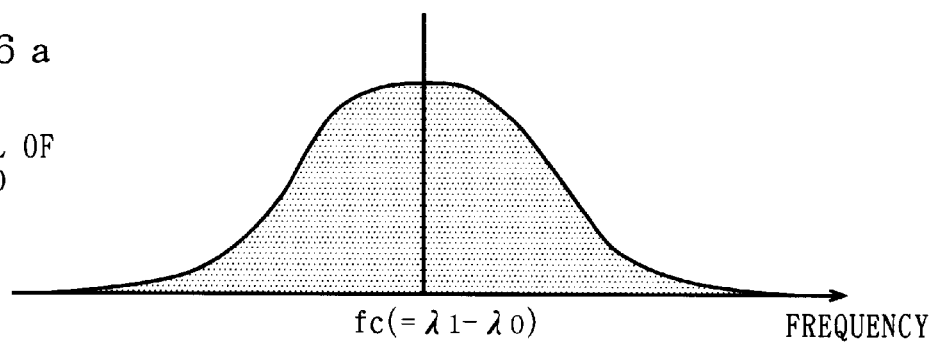

$fc(=\lambda_1-\lambda_0)$

FIG. 16b

OUTPUTTED SIGNAL OF OPTICAL/ ELECTRICAL CONVERTING PORTION

DEMODULATED SIGNAL

RESIDUAL FM SIGNAL COMPONENT OF WIDE-BAND

INTERFERENCE LEVEL

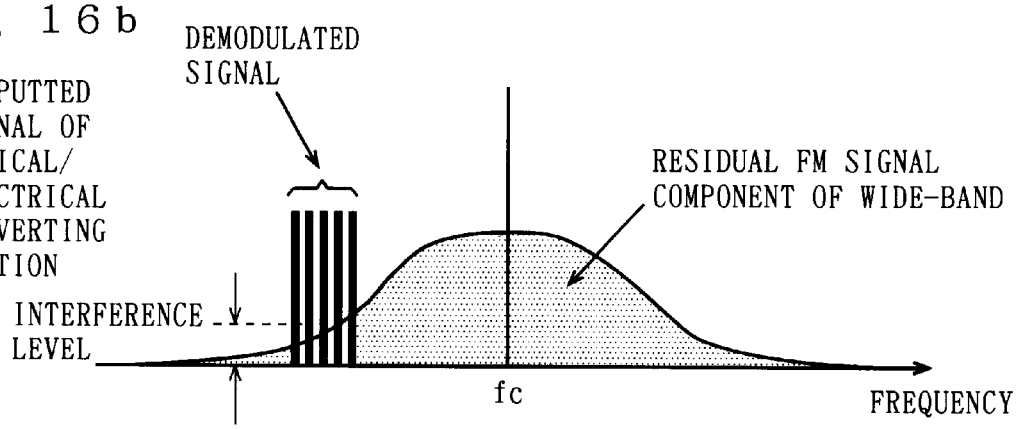

FM SIGNAL OF LIMITTED WIDE-BAND

LIMITED BANDWIDTH

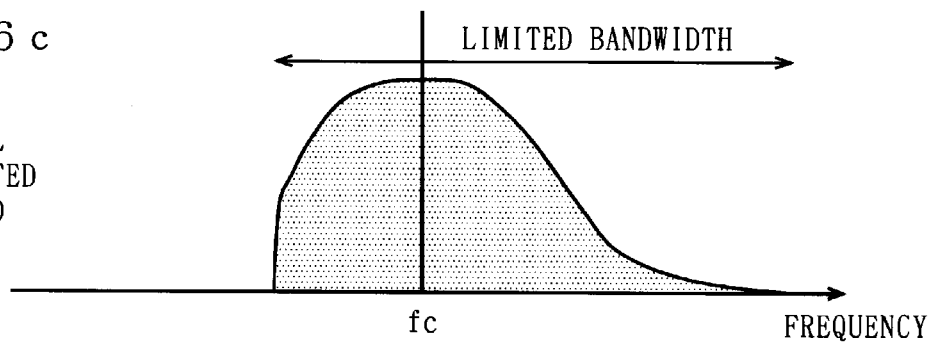

OUTPUTTED SIGNAL OF OPTICAL/ ELECTRICAL CONVERTING PORTION

DEMODULATED SIGNAL

RESIDUAL FM SIGNAL COMPONENT OF WIDE-BAND

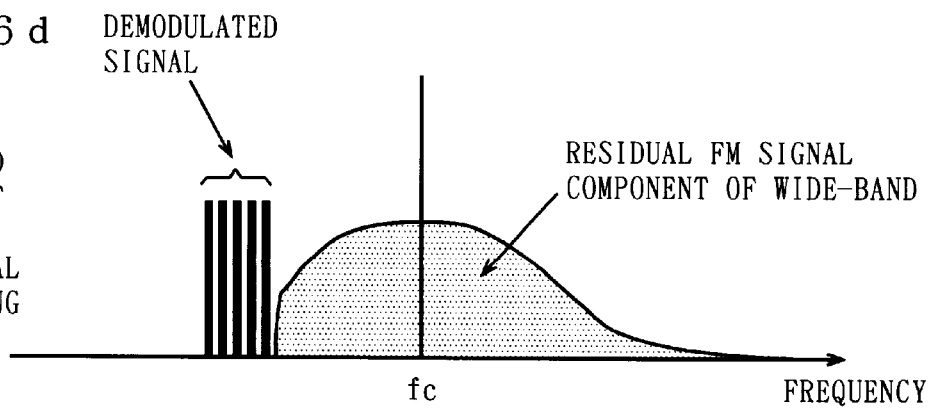

fc

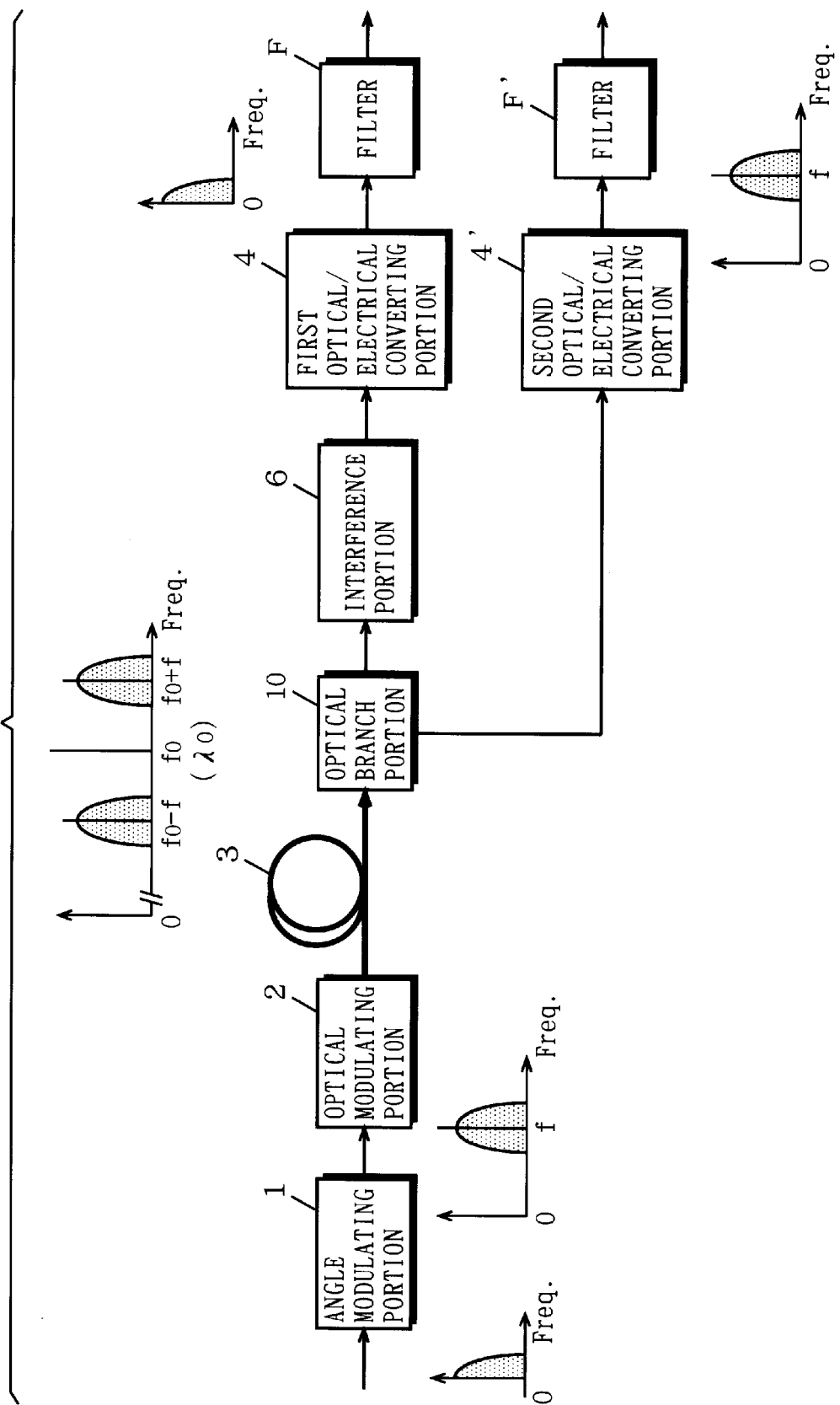

OPTICAL TRANSMISSION SYSTEM AND OPTICAL TRANSMITTER AND OPTICAL RECEIVER USED THEREFOR

BACKGROUND OF THE INVENTION

1. Field of the Invention

The present invention relates to optical transmission systems, more specifically to a system for optically transmitting an angle-modulated signal.

2. Description of the Background Art

FIG. 30 is a block diagram showing an example of the configuration of a conventional optical transmission system which transmits an angle-modulated signal. In FIG. 30, the optical transmission system includes an angle modulating portion 1, an optical modulating portion 2, an optical waveguide portion 3, an optical/electrical converting portion 4, an angle demodulating portion 5 and a filter F. Such optical transmission system is described, for example, in a document (K. Kikushima, et al., "Optical Super Wide-Band FM Modulation Scheme and Its Application to Multi-Channel AM Video Transmission Systems", IOOC'95, PD2–7, 1995, pp. 33–34.).

Next, the operation of the conventional optical transmission system structured as above will be described. As an electrical signal inputted to the angle modulating portion 1, assumed is an analog signal such as an audio or video signal, or a digital signal such as computer data and the like. The angle modulating portion 1 converts the inputted electrical signal into an angle-modulated signal with a predetermined frequency and a predetermined angle modulation scheme to output the angle-modulated signal. The angle modulation scheme includes FM (frequency modulation) or PM (phase modulation) for an analog signal and FSK (frequency-shift keying) or PSK (phase-shift keying) for a digital signal, and is generically referred to as angle modulation hereinafter. The optical modulating portion 2 converts the inputted angle-modulated signal into an optical-modulated signal to output the optical-modulated signal. The optical/electrical converting portion 4, which includes a photodetector having square-law-detection characteristics (a pin photo-diode, an avalanche photo-diode or the like), re-converts the optical-modulated signal transmitted by the optical waveguide portion 3 into an electrical signal to output an angle-modulated signal. The angle demodulating portion 5 converts variations in frequency (or variations in phase) of the angle-modulated signal into variations in amplitude (or variations in intensity) of an electrical signal, thereby re-generating a signal correlating with the original electrical signal. The filter F passes only a signal component corresponding to the original electrical signal (that is a signal component of the same frequency band as that of the original electrical signal) among signals outputted from the angle demodulating portion 5.

In FIG. 31 is shown an example of the structure of the angle demodulating portion 5 in FIG. 30. In FIG. 31, the angle-modulated signal inputted from the optical/electrical converting portion 4 is branched into two signals in a branch portion 51. One signal of the two signals obtained by the branch is provided with a predetermined delay $T_p$ in a delay portion 52. A mixing portion 53, which is generally constituted by a mixer and the like, receives the other signal outputted from the branch portion 51 and the signal outputted from the delay portion 52 to generate a product signal of these signals and output the product signal.

The conventional optical transmission system of the angle-modulated signal as described above has an advantage in the following, compared with an optical transmission system of an amplitude-modulated (AM) signal. That is, the frequency deviation (or the phase deviation) of the angle-modulated signal is set larger, so that a larger gain in angle modulation can be acquired at the optical transmission. As a result, SNR (signal-to-noise power ratio) of a demodulated signal increases, realizing transmission of a signal of good quality. Moreover, the frequency deviation (or the phase deviation) of the angle-modulated signal is increased to spread a frequency spectrum of the optical-modulated signal and suppress a peak level of the frequency spectrum, which leads to an advantage in that deterioration of signal quality due to multipath reflection on an optical transmission line is reduced.

As described above, in the conventional optical transmission system, an electrical signal to be transmitted, after being subjected to angle modulation, is converted into an optical-modulated signal to be optically transmitted, subjected to square-law-detection on a receiving side to be re-converted into an angle-modulated signal, and further subjected to angle demodulation to be the original electrical signal. Therefore, it is possible, in the conventional optical transmission system, to perform optical transmission of better quality by increasing the frequency deviation (the phase deviation) even on an optical transmission line of poor quality.

However, increasing in the frequency deviation (or the phase deviation) of the angle-modulated signal makes the frequency and band of the angle-modulated signal higher and wider. Accordingly, the conventional optical transmission system as described above, requires electrical parts for high frequencies and wide-bands in order to constitute the angle modulating portion 1 and the angle demodulating portion 5. Connection and matching among such electrical parts for high frequencies and wide-bands are difficult and multipath reflection among the parts readily occurs. This causes deterioration of characteristics of the angle modulating portion 1 and the angle demodulating portion 5, resulting in significant deterioration of quality of modulated/demodulated signals.

Further, in the case where an expensive electrical part for wide-bands and high frequencies (for example, the branch portion 51 and the mixing portion 53 in FIG. 31) is used in the angle demodulating portion 5 which is installed as a receiving terminal of an optical transmission system, when configuring an optical subscriber (optical multi-distribution) system such as a FTTH (Fiber To The Home) system, a CATV network and the like, the system cost per subscriber becomes very high to significantly degrade the system from the view point of its economy.

As explained in the above, the conventional optical transmission system is required, when optically transmitting an angle-modulated signal with a wider-band and a higher frequency, to use the electrical parts for wide-bands and high frequencies especially as constituents of the demodulating portion. Thereby, the conventional optical transmission system has a specific problem in that group delay characteristics and modulation/demodulation characteristics are easily deteriorated and economy of overall system is significantly degraded because of increase in the cost of the receiving terminal.

SUMMARY OF THE INVENTION

Therefore, an object of the present invention is to provide an optical transmission system which realizes good angle demodulation characteristics by adopting new optical signal processing and is greatly economical by constituting a receiving terminal at lower cost without electrical parts for wide-bands and high-frequencies.

The present invention has features described below in order to attain the above-mentioned object.

A first aspect of the present invention is an optical transmission system for optically transmitting an angle-modulated signal, comprising:

an optical modulating portion for converting the angle-modulated signal into an optical-modulated signal;

an interference portion for separating the optical-modulated signal into a plurality of optical signals having predetermined difference in propagation delay and then combining the optical signals; and an optical/electrical converting portion, having square-law-detection characteristics, for converting the combined optical signal outputted from the interference portion into an electrical signal, the interference portion and the optical/electrical converting portion constituting a delayed detection system of an optical signal, and the delayed detection system performing conversion processing of an optical signal into an electrical signal and angle demodulation processing simultaneously.

In the case where an electrical circuit using parts for wide-bands and high-frequencies is adopted as a demodulation device for an angle-modulated signal, connection or matching among the parts are difficult, causing deterioration of linearities of demodulation characteristics or group delay characteristics easily to degrade the quality of an demodulated signal. Moreover, the parts for wide-bands and high-frequencies are generally expensive, so that the cost of the demodulation device increases, significantly deteriorating the economy of the system.

Hence, in the above first aspect, an angle-modulated signal is converted into an optical-modulated signal and the optical-modulated signal is homodyne detected employing square-law-detection characteristics of a photodetector, so that demodulation and optical transmission can be performed only by optical signal processing without using electrical parts for wide-bands and high-frequencies. Further, when the present aspect is applied to an optical distribution system, the portions in the configuration up to the interference portion are installed on a transmitting equipment side and only the optical/electrical converting portion is installed on a receiving terminal side, whereby the expensive constituents are included in only the transmitting equipment. Thus, it is possible to construct an optical subscriber system which is greatly economical.

A second aspect is an aspect according to the first aspect, wherein the angle-modulated signal is an FM signal obtained by subjecting an analog signal to frequency modulation.

A third aspect is an aspect according to the first aspect, wherein the angle-modulated signal is a PM signal obtained by subjecting an analog signal to phase modulation.

A fourth aspect is an aspect according to the first aspect, wherein the angle-modulated signal is an FSK modulated signal obtained by subjecting a digital signal to frequency modulation.

A fifth aspect is an aspect according to the first aspect, wherein the angle-modulated signal is a PSK modulated signal obtained by subjecting a digital signal to phase modulation.

A sixth aspect is an aspect according to claim 1, wherein the optical modulating portion generates an optical-intensity-modulated signal as the optical-modulated signal.

A seventh aspect is an aspect according to the sixth aspect, wherein the optical modulating portion comprises:
  a light source for outputting a light with a given optical intensity and a given wavelength;
  an optical branch portion for branching the light from the light source into two;
  first and second optical phase modulating portions, provided for the two outputted lights from the optical branch portion respectively, for subjecting the outputted lights to optical phase modulation using the angle-modulated signal as an original signal; and
  an optical coupling portion for combining the two optical-phase-modulated signals outputted from the first and second optical phase modulating portions.

As described in the foregoing, in the seventh aspect, in order to generate an optical-intensity-modulated signal, an external modulation scheme is adopted. In place of such external modulation scheme, a direct modulation scheme can be also adopted.

An eighth aspect is an aspect according to the sixth aspect, wherein the interference portion comprises:
  an optical branch portion for branching an inputted optical signal into a first optical signal and a second optical signal;
  an optical delay portion for providing the second optical signal outputted from the optical branch portion with a predetermined delay; and
  an optical combining portion for combining the first optical signal outputted from the optical branch portion and the second optical signal outputted from the optical delay portion.

As described in the foregoing, in the eighth aspect, the inputted optical signal is branched into two optical signals by the optical branch portion, the predetermined propagation delay is provided for one of the two optical signals and then the two optical signals are combined again by the optical combining portion, which constitutes an interference system necessary for delayed detection of an optical signal.

A ninth aspect is an aspect according to the sixth aspect, wherein the optical modulating portion comprises:
  a light source for outputting a light with a given optical intensity and a given wavelength;
  an optical branch portion for branching the light from the light source into two;
  first and second optical phase modulating portions, provided for the two outputted lights from the optical branch portion respectively, for each subjecting each of the outputted lights to optical phase modulation using the angle-modulated signal as an original signal; and
  an optical directional coupling portion for combining the two optical-phase-modulated signals outputted from the first and second optical phase modulating portions and then dividing the resultant signal into first and second optical signals in which optical-intensity modulated components are set in opposite phases to each other, and the interference portion comprises:
  an optical delay portion for providing the second optical signal outputted from the optical directional coupling portion with a predetermined delay; and
  an optical combining portion for combining the first optical signal outputted from the optical directional coupling portion and the second optical signal outputted from the optical delay portion.

As described in the foregoing, in the ninth aspect, the external modulation scheme is adopted in the optical modulating portion and the optical directional coupling portion is provided, to input the first and second optical signals, in which optical-intensity-modulated components are set in opposite phases to each other, to the interference portion. This eliminates the need for branching the inputted optical signal in the interference portion.

A tenth aspect is an aspect according to the sixth aspect, wherein the interference portion comprises:
an optical waveguide portion for guiding the optical signal outputted from the optical modulating portion; and
first and second optical transparent/reflecting portions, cascaded on the optical waveguide portion at a prescribed interval, for respectively transmitting parts of the inputted optical signals and reflecting the remained parts, and
propagation time in which an optical signal goes and returns between the first and second optical transparent/reflecting portions is the predetermined difference in propagation delay.

As described in the foregoing, according to the tenth aspect, two optical transparent/reflecting portions are provided on the optical waveguide portion, and a direct light which propagates through both of the optical transparent/reflecting portions and an indirect light which goes and returns between the optical transparent/reflecting portions one time and then propagates are generated, which constitutes an interference system necessary for delayed detection of an optical signal without physically branching the optical signal into two. This allows constitution of the interference system with a simpler configuration.

An eleventh aspect is an aspect according to the first aspect, wherein the optical modulating portion generates an optical-amplitude-modulated signal as the optical-modulated signal.

A twelfth aspect is an aspect according to the eleventh aspect, wherein the optical modulating portion comprises:
a light source for outputting a light with a given optical intensity and a given wavelength;
an optical branch portion for branching the light from the light source into two;
first and second optical phase modulating portions, provided for the two outputted lights from the optical branch portion respectively, for each subjecting each of the outputted lights to optical phase modulation using the angle-modulated signals as an original signal; and
an optical coupling portion for combining the two optical-phase-modulated signals outputted from the first and second optical phase modulating portions.

A thirteenth aspect is an aspect according to the eleventh aspect, wherein the interference portion comprises:
an optical branch portion for branching the inputted optical signal into a first optical signal and a second optical signal;
an optical delay portion for providing the second optical signal outputted from the optical branch portion with a predetermined delay; and
an optical combining portion for combining the first optical signal outputted from the second optical branch portion and the second optical signal outputted from the optical delay portion.

As described in the foregoing, according to the thirteenth aspect, the inputted optical signal is branched into two optical signals by the optical branch portion, the predetermined propagation delay is provided for one of the two optical signals in the delay portion and then the two optical signals are combined again in the optical combining portion, to constitute an interference system necessary for delayed detection of an optical signal.

A fourteenth aspect is an aspect according to the eleventh aspect, wherein the optical modulating portion comprises:
a light source for outputting a light with a given optical intensity and a given wavelength;
an optical branch portion for branching the light from the light source into two;
first and second optical phase modulating portions, provided for the two outputted lights from the optical branch portion respectively, for each subjecting each of the outputted lights to optical phase modulation using the angle-modulated signal as an original signal; and
an optical directional coupling portion for combining the two optical-phase-modulated signals outputted from the first and second optical phase modulating portions and then dividing the resultant signal into first and second optical signals in which optical-amplitude-modulated components are set in opposite phases to each other, and the interference portion comprises:
an optical delay portion for providing the second optical signal outputted from the optical directional coupling portion with a predetermined delay; and
an optical combining portion for combining the first optical signal outputted from the optical directional coupling portion and the second optical signal outputted from the optical delay portion.

As described in the foregoing, in the fourteenth aspect, the external modulation scheme is adopted in the optical modulating portion and the optical directional coupling portion is provided, to input the first and second optical signals, in which optical-intensity-modulated components are set in opposite phases to each other, to the interference portion. This eliminates the need for branching the inputted optical signal in the interference portion.

A fifteenth aspect is an aspect according to the eleventh aspect, wherein the interference portion comprises:
an optical waveguide portion for guiding the optical signal outputted from the optical modulating portion; and
first and second optical transparent/reflecting portions, cascaded on the optical waveguide portion at a predetermined interval, for respectively transmitting parts of the inputted optical signals and reflecting the remained parts, and
propagation time in which an optical signal goes and returns between the first and second optical transparent/reflecting portions is the predetermined difference in propagation delay.

As described in the foregoing, according to the fifteenth aspect, two optical transparent/reflecting portions are provided on the optical waveguide portion, and the direct light which propagates through both of the optical transparent/reflecting portions and the indirect light which goes and returns between the optical transparent/reflecting portions one time and then propagates are generated, which constitutes an interference system necessary for delayed detection of an optical signal without physically branching the optical signal into two. This allows constitution of the interference system with a simpler configuration.

A sixteenth aspect is an aspect according to the twelfth aspect, wherein predetermined optical phase modulation is performed in the first and second optical phase modulating portions so that difference between the optical phase shift by the first optical phase modulating portion and the optical phase shift by the second optical phase modulating portion is set in phase with the angle-modulated signal.

A seventeenth aspect is an aspect according to the fourteenth aspect, wherein predetermined optical phase modulation is performed in the first and second optical phase modulating portions so that difference between the optical phase shift by the first optical phase modulating portion and the optical phase shift by the second optical phase modulating portion is set in phase with the angle-modulated signal.

An eighteenth aspect is an aspect according to the twelfth aspect, wherein predetermined optical phase modulation is performed in the first and second optical phase modulating portions so that difference between the optical phase shift by the first optical phase modulating portion and the optical phase shift by the second optical phase modulating portion is set in opposite phases with the angle-modulated signal.

A nineteenth aspect is an aspect according to the fourteenth aspect, wherein predetermined optical phase modulation is performed in the first and second optical phase modulating portions so that difference between the optical phase shift by the first optical phase modulating portion and the optical phase shift by the second optical phase modulating portion is set in opposite phases with the angle-modulated signal.

In the sixteenth to nineteenth aspects, phase relation between the angle-modulated signals inputted into the first and second optical phase modulating portions is optimally adjusted, to enlarge the optical-amplitude-modulated component in the optical signal inputted into the optical coupling portion or the optical directional coupling portion, which realizes high efficient demodulation and optical transmission with optical signal processing.

A twentieth aspect is an aspect according to the first aspect, wherein a product value of a center angular frequency of the angle-modulated signal and the predetermined difference in propagation delay in the interference portion is set to be equal to $\pi/2$.

As described in the foregoing, in the twentieth aspect, the center angular frequency of the angle-modulated signal and the predetermined difference in propagation delay in the interference portion are set at optimal values, to increase demodulation efficiency.

A twenty-first aspect is an aspect according to the fourth aspect, wherein the predetermined difference in propagation delay in the interference portion is set to be equal to one symbol length of the digital signal.

A twenty-second aspect is an aspect according to the fifth aspect, wherein the predetermined difference in propagation delay in the interference portion is set to be equal to one symbol length of the digital signal.

As described in the foregoing, in the twenty-first and twenty-second aspects, when the angle-modulated signal is an FSK modulated signal or a PSK modulated signal obtained by subjecting a digital signal to frequency modulation or phase modulation, the symbol length of the digital signal and the predetermined difference in propagation delay in the interference portion are set to optimal values, thereby increasing the demodulation efficiency.

A twenty-third aspect is an aspect according to the eighth aspect, wherein polarization states of the first optical signal and the second optical signal to be combined in the optical combining portion are set to be the same with each other.

A twenty-fourth aspect is an aspect according to the ninth aspect, wherein polarization states of the first optical signal and the second optical signal to be combined in the optical combining portion are set to be the same with each other.

A twenty-fifth aspect is an aspect according to the thirteenth aspect, wherein polarization states of the first optical signal and the second optical signal to be combined in the optical combining portion are set to be the same with each other.

A twenty-sixth aspect is an aspect according to the fourteenth aspect, wherein
 polarization states of the first optical signal and the second optical signal to be combined in the optical combining portion are set to be the same with each other.

As described in the foregoing, in the twenty-third to twenty-sixth aspects, the polarization states of the first and second optical signals in the optical combining portion are set to be the same with each other, thereby increasing homodyne detection efficiency in the optical/electrical converting portion, that is demodulation efficiency.

A twenty-seventh aspect is an aspect according to the tenth aspect, wherein
 polarization states of the optical signal transmitting through the first and second optical transparent/reflecting portions along the optical waveguide portion and the optical signal transmitting through the first optical transparent/reflecting portion, reflected at the second optical transparent/reflecting portion, reflected at the first optical transparent/reflecting portion and transmitting through the second optical transparent/reflecting portion are set to be the same with each other.

A twenty-eighth aspect is an aspect according to the fifteenth aspect, wherein
 polarization states of the optical signal transmitting through the first and second optical transparent/reflecting portions along the optical waveguide portion and the optical signal transmitting through the first optical transparent/reflecting portion, reflected at the second optical transparent/reflecting portion, reflected at the first optical transparent/reflecting portion and transmitting through the second optical transparent/reflecting portion are set to be the same with each other.

As described in the foregoing, in the twenty-seventh and twenty-eighth aspects, the polarization states of the direct light and the indirect light are set to be the same, thereby increasing the homodyne detection efficiency in the optical/electrical converting portion, that is the demodulation efficiency.

A twenty-ninth aspect is an aspect according to the eighth aspect, wherein
 the optical modulating portion and the interference portion are connected with a first optical waveguide portion,
 the interference portion and the optical/electrical converting portion are connected with a second optical waveguide portion, and
 the first and/or second optical waveguide portions are composed of single-mode optical fibers.

The thirtieth aspect is an aspect according to the thirteenth aspect, wherein
 the optical modulating portion and the interference portion are connected with a first optical waveguide portion, the interference portion and the optical/electrical converting portion are connected with a second optical waveguide portion, and the first and/or second optical waveguide portions are composed of single-mode optical fibers.

As described in the foregoing, in the twenty-ninth and thirtieth aspects, the first and/or second optical waveguide portions are composed of single-mode optical fibers, making it possible to perform optical transmission with optical fibers which are inexpensive.

A thirty-first aspect is an aspect according to the ninth aspect, wherein the interference portion and the optical/electrical converting portion are connected with an optical waveguide portion, and the optical waveguide portion is composed of a single-mode optical fiber.

A thirty-second aspect is an aspect according to the fourteenth aspect, wherein the interference portion and the optical/electrical converting portion are connected with an optical waveguide portion, and the optical waveguide portion is composed of a single-mode optical fiber.

As described in the foregoing, in the thirty-first and thirty-second aspects, the optical waveguide portion provided between the interference portion and the optical/electrical converting portion is composed of a single-mode optical fiber, making it possible to perform optical transmission with an optical fiber which is inexpensive.

A thirty-third aspect is an aspect according to the tenth aspect, wherein a whole or a part of the optical waveguide portion in the interference portion is composed of a single-mode optical fiber.

A thirty-fourth aspect is an aspect according to the fifteenth aspect, wherein a whole or a part of the optical waveguide portion in the interference portion is composed of a single-mode optical fiber.

As described in the foregoing, in the thirty-third and thirty-fourth aspects, the whole or a part of the optical waveguide portion in the interference portion is composed of a single-mode optical fiber, allowing optical transmission with an optical fiber which is inexpensive.

A thirty-fifth aspect is an aspect according to the first aspect, further comprising an amplitude adjusting portion for adjusting an amplitude of the angle-modulated signal and outputting the angle-modulated signal of a constant amplitude.

In the case where delayed detection is performed employing the square-law-detection characteristics of the optical/electrical converting portion, as the amplitude of the angle-modulated signal which is the original signal becomes smaller, the demodulation efficiency decreases. Further, when the angle-modulated signal has an amplitude fluctuation, deterioration in signal quality such as waveform distortion and the like occurs. Hence, in the above thirty-fifth aspect, the amplitude adjusting portion maintaining the amplitude constant is provided for the inputted angle-modulated signal, to suppress the above-mentioned deterioration.

A thirty-sixth aspect is an aspect according to the first aspect, further comprising a bandwidth limiting portion for limiting a band of the angle-modulated signal.

As described in the foregoing, in the thirty-sixth aspect, the bands of the angle-modulated signal is previously limited, to lessen the spectrum in width, thereby preventing deterioration in quality of a demodulated signal caused by that the part of the spread spectrum of the angle-modulated signal component is superimposed on the band of the demodulated signal outputted from the optical/electrical converting portion.

A thirty-seventh aspect is an optical transmitter for optically transmitting an angle-modulated signal, comprising:

an optical modulating portion for converting the angle-modulated signal into an optical-modulated signal; and an interference portion for separating the optical-modulated signal into a plurality of optical signals having predetermined difference in propagation delay and then combining the optical signals, and the optical transmitter transmitting the combined optical signal outputted from the interference portion.

A thirty-eighth aspect is an aspect according to the thirty-seventh aspect, wherein the angle-modulated signal is an FM signal obtained by subjecting an analog signal to frequency modulation.

A thirty-ninth aspect is an aspect according to the thirty-seventh aspect, wherein the angle-modulated signal is a PM signal obtained by subjecting an analog signal to phase modulation.

A fortieth aspect is an aspect according to the thirty-seventh aspect, wherein the angle-modulated signal is an FSK modulated signal obtained by subjecting a digital signal to frequency modulation.

A forty-first aspect is an aspect according to the thirty-seventh aspect, wherein the angle-modulated signal is a PSK modulated signal obtained by subjecting a digital signal to phase modulation.

A forty-second aspect is an aspect according to the thirty-seventh aspect, wherein the optical modulating portion generates an optical-intensity- modulated signal as the optical-modulated signal.

A forty-third aspect is an aspect according to the thirty-seventh aspect, wherein the optical modulating portion generates an optical-amplitude- modulated signal as the optical-modulated signal.

A forty-fourth aspect is an optical receiver for receiving an optical-modulated signal and acquiring a demodulated signal of the optical-modulated signal, comprising:

an interference portion for separating the received optical-modulated signal into a plurality of optical signals having predetermined difference in propagation delay and then combining the optical signals; and an optical/electrical converting portion, having square-law-detection characteristics, for converting the combined optical signal outputted from the interference portion into an electrical signal, and the interference portion and the optical/electrical converting portion constituting a delayed detection system of an optical signal and the delayed detection system performing conversion processing of an optical signal into an electrical signal and angle demodulation processing simultaneously.

A forty-fifth aspect is an aspect according to the forty-fourth aspect, wherein the optical-modulated signal is generated from a $2^n$-phase (n is an integer of not less than two) PSK electrical-modulated signal as an original signal, the interference portion includes:

a received light dividing portion for dividing an inputted optical signal into $2^{n-1}$ received lights; and first to $2^{n-1}$th optical interference circuits, provided corresponding to the $2^{n-1}$ received lights respectively, for each branching each of the received lights into a first optical signal and a second optical signal, providing the second optical signal with a predetermined delay and then combining the first and second optical signals, and the optical/electrical signals are provided corresponding to the first to $2^{n-1}$th optical interference circuits respectively.

A forty-sixth aspect is an aspect according to the forty-fifth aspect, wherein the optical-modulated signal is generated from a quadrature PSK electrical-modulated signal as an original signal, the interference portion includes:

a received light dividing portion for dividing an inputted optical signal into a first received light and a second received light;

a first optical interference circuit for branching the first received light into a first optical signal and a second optical signal, providing the second optical signal with a first predetermined delay and then combining the first and second optical signals; and a second optical interference circuit for branching the second received light into a first optical signal and a second optical signal, providing the second optical signal with a second predetermined delay and then combining the first and second optical signals, and the first predetermined delay in the first optical interference circuit and the second predetermined delay in the second optical interference circuit are both set to have the absolute magnitude of ½ symbol length of the digital signal and be in opposite phases to each other.

A forty-seventh aspect is an optical transmission system for optically transmitting an angle-modulated signal, comprising:

an optical modulating portion for converting the angle-modulated signal into an optical-modulated signal;

an optical branch portion for branching the optical-modulated signal outputted from the optical modulating portion into two signals at least, a first optical-modulated signal and a second optical-modulated signal;

an interference portion for separating the first optical-modulated signal outputted from the optical branch portion into a plurality of optical signals having predetermined difference in propagation delay and then combining the optical signals;

a first optical/electrical converting portion, having square-law-detection characteristics, for converting the combined optical signal outputted from the interference portion into an electrical signal; and a second optical/electrical converting portion, having square-law-detection characteristics, for converting the second optical-modulated signal outputted from the optical branch portion into an electrical signal.

As described in the foregoing, according to the forty-seventh aspect, an angle-modulated signal is converted into an optical signal and branched into a plurality of optical signals, a part of the optical signals are subjected to homodyne detection by the interference portion and the first optical/electrical converting portion to reproduce the original electrical signal for the angle modulation as described in the first aspect and the remained part of the optical signals are subjected to direct detection by the second optical/electrical converting portion to reproduce the angle-modulated signal. Thereby, if a wired network is constructed by using an optical fiber as its backbone and the angle-modulated signal outputted from the second optical/electrical converting portion is sent out in the air as a radio wave, the optical transmission system can expand to a wireless network for mobile terminals and the like. Especially, a high-frequency signal such as a micro wave, a millimetre wave and the like, which is thought as an suitable signal for a wireless network, is received and subjected to demodulation, in a wired system, by a low cost configuration with optical signal processing and at the same time a radio wave is sent to the mobile terminals and the like, so that a flexible and greatly economical system can be constructed.

A forty-eighth aspect is an aspect according to the forty-seventh aspect, further comprising:

a local light source for outputting a light of a predetermined wavelength; and an optical combining portion, inserted between the optical branch portion and the second optical/electrical converting portion, for combining the second optical-modulated signal outputted from the optical branch portion and the light from the local light source, wherein the second optical/electrical converting portion heterodyne detects the combined optical signal outputted from the optical combining portion and then converts the optical signal into an electrical signal.

A forty-ninth aspect is an aspect according to the forty-seventh aspect, further comprising:

a local light source for outputting a light of a predetermined wavelength; and an optical combining portion, inserted between the optical modulating portion and the optical branch portion, for combining the optical-modulated signal outputted from the optical modulating portion and the light from the local light source, wherein the second optical/electrical converting portion heterodyne detects the second optical-modulated signal outputted from the optical branch portion and converts the optical-modulated signal into an electrical signal.

As described in the foregoing, according to the forty-eighth and forty-ninth aspects, the frequency of the local light source is varied, to freely up-convert or down-convert the frequency of the angle-modulated signal outputted from the second optical/electrical converting portion.

A fiftieth aspect is an optical transmission system for optically transmitting an angle-modulated signal, comprising:

an optical modulating portion for converting the angle-modulated signal into an optical-modulated signal;

a local light source for outputting a light of a predetermined wavelength;

an optical combining portion for combining the optical-modulated signal outputted from the optical modulating portion and the light from the local light source;

an interference portion for separating the combined optical signal outputted from the optical combining portion into a plurality of optical signals having predetermined difference in propagation delay and then combining the optical signals;

an optical/electrical converting portion, having square-law-detection characteristics, for converting the combined optical signal outputted from the interference portion into an electrical signal; and a dividing portion for separating the electrical signal outputted from the optical/electrical converting portion for each of frequency components and outputting the electrical signals.

A fifty-first aspect is an optical transmission system for optically transmitting an angle-modulated signal, comprising:
- an optical modulating portion for converting the angle-modulated signal into an optical-modulated signal;
- an optical branch portion for branching the optical-modulated signal outputted from the optical modulating portion into two signals at least, a first optical-modulated signal and a second optical-modulated signal;
- an interference portion for separating the first optical-modulated signal outputted from the optical branch portion into a plurality of optical signals having predetermined difference in propagation delay and then combining the optical signals;
- a first optical/electrical converting portion, having square-law-detection characteristics, for converting the combined optical signal outputted from the interference portion into an electrical signal;
- a local oscillation portion for outputting an unmodulated signal of a predetermined frequency; and
- a second optical/electrical converting portion, having square-law-detection characteristics, in which its bias is modulated with the unmodulated signal from the local oscillation portion, for converting the second optical-modulated signal outputted from the optical branch portion into an electrical signal.

A fifty-second aspect is an optical transmission system for optically transmitting an angle-modulated signal, comprising:
- an optical modulating portion for converting the angle-modulated signal into an optical-modulated signal;
- an optical branch portion for branching the optical-modulated signal outputted from the optical modulating portion into two signals at least, a first optical-modulated signal and a second optical-modulated signal;
- an interference portion for separating the first optical-modulated signal outputted from the optical branch portion into a plurality of optical signals having predetermined difference in propagation delay and then combining the optical signals;
- a first optical/electrical converting portion, having square-law-detection characteristics, for converting the combined optical signal outputted from the interference portion into an electrical signal;
- a second optical/electrical converting portion, having square-law-detection characteristics, for converting the second optical-modulated signal outputted from the optical branch portion into an electrical signal;
- a local oscillation portion for outputting an unmodulated signal of a predetermined frequency; and
- a mixing portion for mixing the electrical signal outputted from the second optical/electrical converting portion and the unmodulated signal outputted from the local oscillation portion and outputting the resultant signals.

As described in the foregoing, according to the fiftieth to fifty-second aspects, the original electrical signal and the angle-modulated signal for angle modulation can be reproduced only by optical signal processing. Further, the frequency of the local light source or the local oscillation portion is varied, to freely up-convert or down-convert the frequency of the angle-modulated signal to be reproduced.

A fifty-third aspect is an optical transmission system for optically transmitting two signals at least, a first electrical signal and a second electrical signal simultaneously, comprising:
- an angle modulating portion for converting the first electrical signal into an angle-modulated signal;
- a combining portion for combining the angle-modulated signal and the second electrical signal;
- an optical modulating portion for converting the combined signal outputted from the combining portion into an optical-modulated signal;
- an optical branch portion for branching the optical-modulated signal outputted from the optical modulating portion into two signals at least, a first optical-modulated signal and a second optical-modulated signal;
- an interference portion for separating the first optical-modulated signal outputted from the optical branch portion into a plurality of optical signals having predetermined difference in propagation delay and then combining the optical signals;
- a first optical/electrical converting portion, having square-law-detection characteristics, for converting the combined optical signal outputted from the interference portion into an electrical signal; and
- a second optical/electrical converting portion, having square-law-detection characteristics, for converting the second optical-modulated signal outputted from the optical branch portion into an electrical signal.

As described in the foregoing, according to the fifty-third aspect, a digital signal and an analog signal, for example, which are different types of electrical signals, can be optically transmitted simultaneously and individually reproduced.

A fifty-fourth aspect is an aspect according to the fifty-third aspect, wherein an occupied frequency band of the first electrical signal, an occupied frequency band of the second electrical signal and an occupied frequency band of the angle-modulated signal do not overlap with each other.

A fifty-fifth aspect is an aspect according to the fifty-third aspect, further comprising:
- a first signal processing portion for limiting the occupied frequency band of the first electrical signal; and
- a second signal processing portion for limiting the occupied frequency band of the second electrical signal.

A fifty-sixth aspect is an aspect according to the fifty-fifth aspect, further comprising:
- a third signal processing portion for passing only a frequency component corresponding to the occupied frequency band of the first electrical signal as to the electrical signal outputted from the first optical/electrical converting portion and reproducing waveform information which was lost by the band limitation in the first signal processing portion; and
- a fourth signal processing portion for passing only a frequency component corresponding to the occupied frequency band of the second electrical signal as to the electrical signal outputted from the second optical/electrical converting portion and reproducing waveform information which was lost by the band limitation in the second signal processing portion.

As described in the foregoing, according to the fifty-sixth aspect, the waveform distortion caused by the band limitation performed on the transmitting side can be corrected on the receiving side.

A fifty-seventh aspect is an optical transmission system for optically transmitting a plurality of electrical signals, comprising:

a plurality of angle modulating portions for converting each of the plurality of electrical signals into an angle-modulated signals;

a combining portion for combining the angle-modulated signals outputted from the plurality of angle modulating portions;

an optical modulating portion for converting the combined signal outputted from the combining portion into an optical-modulated signal;

an optical branch portion for branching the optical-modulated signal outputted from the optical modulating portion into a plurality of optical-modulated signals; and an plurality of optical signal processing portions, provided corresponding to the plurality of optical-modulated signals outputted from the optical branch portion respectively, for each performing predetermined optical signal processing and then individually reproducing the plurality of electrical signals, and each of the optical signal processing portions including:
an interference portion for separating the optical-modulated signal outputted from the optical branch portion into a plurality of optical signals having difference in propagation delay decided according to frequencies of angle-modulated signals to be acquired by demodulation and then combining the optical signals; and an optical/electrical converting portion, having square-law-detection characteristics, for converting the combined optical signal outputted from the interference portion into an electrical signal.

As described in the above, according to the fifty-seventh aspect, a digital signal and an analog signal, for example, which are different types of electrical signals, can be optically transmitted simultaneously and individually reproduced.

A fifty-eighth aspect is an aspect according to the fifty-seventh aspect, wherein occupied frequency bands of the plurality of electrical signals and occupied frequency bands of the plurality of angle-modulated signals do not overlap with each other.

A fifty-ninth aspect is an aspect according to the fifty-seventh aspect, further comprising a plurality of signal pre-processing portions for limiting the occupied frequency bands of the plurality of electrical signals.

A sixtieth aspect is an aspect according to the fifty-ninth aspect, wherein each of the plurality of optical signal processing portions further includes a signal post-processing portion for passing a frequency component corresponding to an occupied frequency band of an electrical signal to be reproduced and reproducing waveform information which was lost by the band limitation in the signal pre-processing portion as to the electrical signal outputted from the optical/electrical converting portion.

As described in the foregoing, according to the sixtieth aspect, the waveform distortion caused by the band limitation performed on the transmitting side can be corrected on the receiving side.

A sixty-first aspect is an optical transmission system for optically transmitting a multichannel angle-modulated signal obtained by subjecting plurality-channel electrical signals to angle modulation respectively and frequency-division multiplexing, comprising:

an optical modulating portion for converting the multi-channel angle-modulated signal into an optical-modulated signal;

an optical branch portion for branching the optical-modulated signal outputted from the optical modulating portion into a plurality of optical-modulated signals; and a plurality of optical signal processing portions, provided corresponding to the plurality of optical-modulated signals outputted from the optical branch portion respectively, for each performing predetermined optical signal processing and then reproducing an electrical signal on an individual channel, and each of the optical signal processing portions including:
an interference portion for separating the optical-modulated signal outputted from the optical branch portion into a plurality of optical signals having difference in propagation delay decided according to frequencies of electrical signals on channels to be reproduced and then combining the optical signals; and an optical/electrical converting portion, having square-law-detection characteristics, for converting the combined optical signal outputted from the interference portion into an electrical signal.

As described in the foregoing, according to the sixty-first aspect, the multichannel angle-modulated signal obtained by frequency-division-multiplexing can be optically transmitted simultaneously.

These and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a block diagram showing a second specific example of configuration of the optical transmission system according to the first embodiment of the present invention.

FIGS. 16a to 16d are diagrams for explaining FM demodulation operation in the optical transmission system in FIG. 15.

FIG. 17 is a block diagram showing the configuration of an optical transmission system according to a second embodiment of the present invention.

DESCRIPTION OF THE PREFERRED EMBODIMENTS (First Embodiment)

Figure 1:
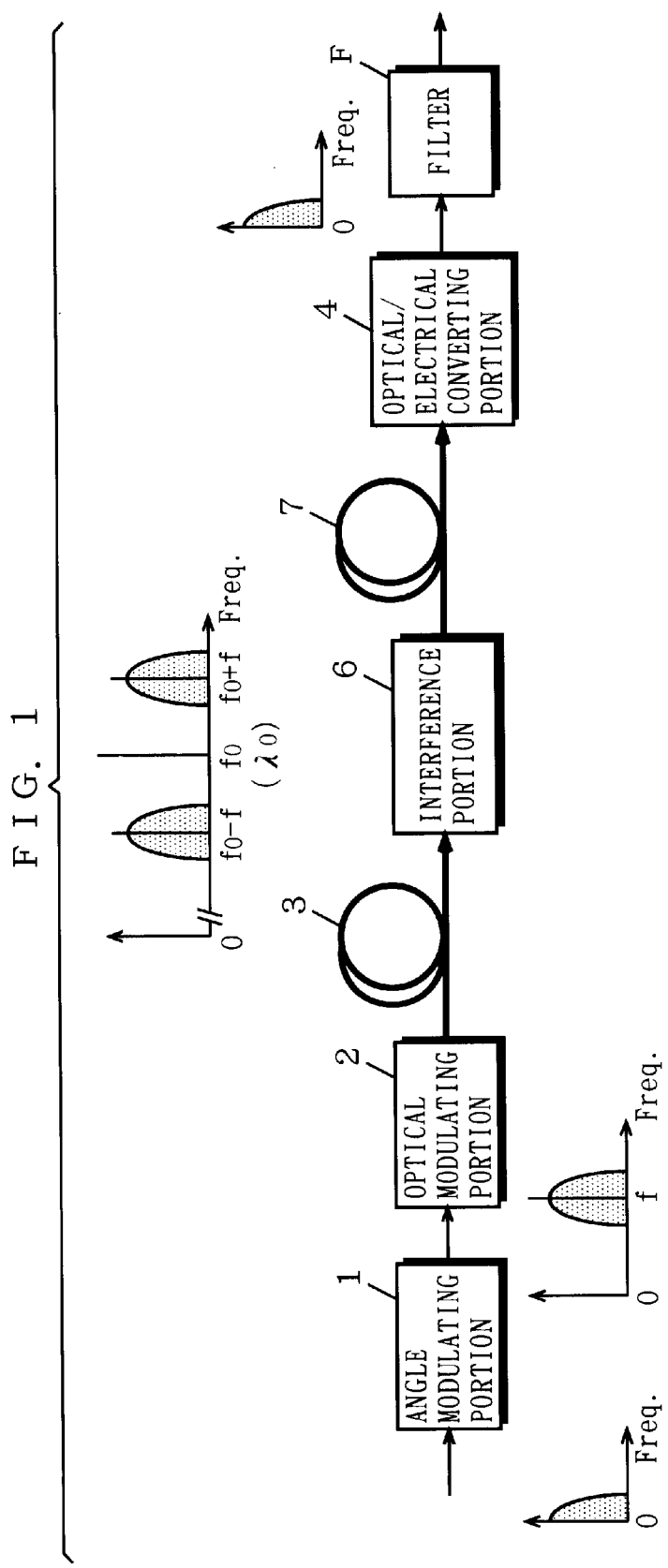
FIG. 1 is a block diagram showing the configuration of an optical transmission system according to a first embodiment of the present invention.

FIG. 1 is a block diagram showing the configuration of an optical transmission system according to a first embodiment of the present invention. FIG. 1 also shows schematic diagrams of frequency spectrums of signals in respective portions. In FIG. 1, the optical transmission system of the present embodiment includes an angle modulating portion 1, an optical modulating portion 2, a first optical waveguide portion 3, an interference portion 6, a second optical waveguide portion 7, an optical/electrical converting portion 4 and a filter F. Depending on the required structure of a transmission side and a receiving side from the view point of the whole system, the first and second optical waveguide portions 3 and 7 are both needed in some cases, or either one of the optical waveguide portions is needed in other cases.

Figure 30:
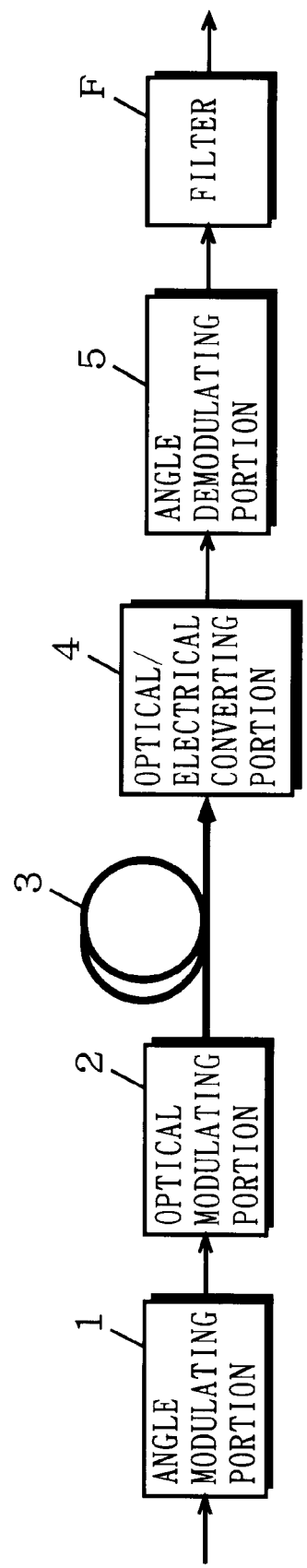
FIG. 30 is a block diagram showing the configuration of a conventional optical transmission system.
Figure 31:
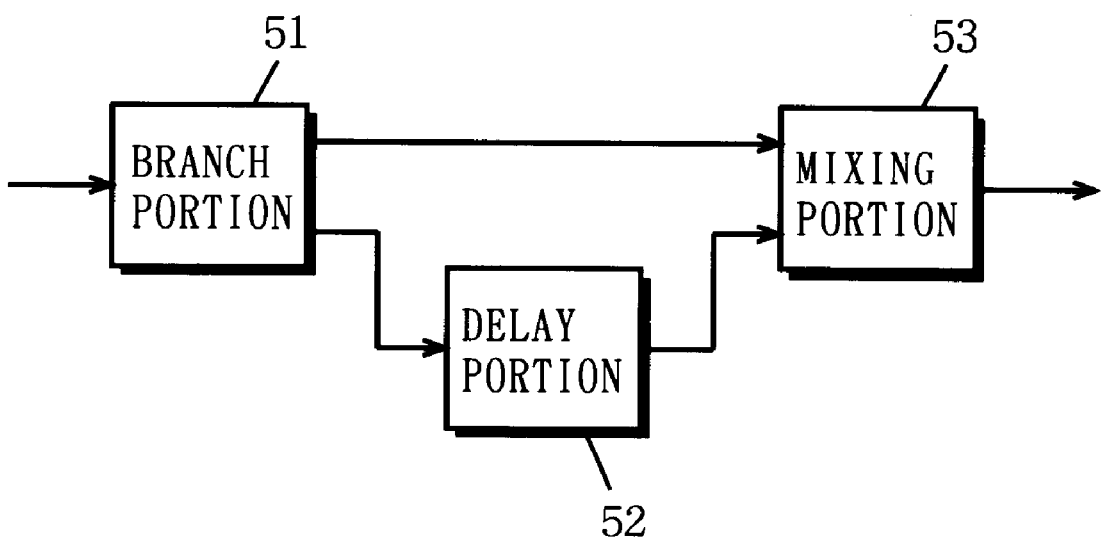
FIG. 31 is a block diagram showing the structure of an angle demodulating portion in FIG. 30.

It is to be noted in FIG. 1 that the angle demodulating portion 5 shown in FIG. 30 is not provided. That is, the present embodiment is characterized by that a demodulated signal can be acquired with performing a new and peculiar optical signal processing without performing electrical demodulation processing.

Next, the operation of the embodiment shown in FIG. 1 will be explained. The angle modulating portion 1 receives an analog signal such as an audio signal, a video signal and the like, or a digital signal such as computer data and the like as an electrical signal to be transmitted and outputs an angle-modulated signal originated from the above-mentioned signal. The optical modulating portion 2 receives the angle-modulated signal outputted from the angle modulating portion 1 and outputs an optical-intensity-modulated signal with, for example, a direct modulation scheme, or outputs an optical-intensity-modulated signal or an optical-amplitude-modulated signal with an external modulation scheme. The optical signal is transmitted through the first optical waveguide portion 3. The interference portion 6 separates the inputted optical signal into two optical signals having predetermined difference in propagation delay and then combines the optical signals again. The combined optical signal is transmitted through the second optical waveguide portion 7. The optical/electrical converting portion 4, which includes a photodetector having square-law-detection characteristics (a pin photo-diode, an avalanche photo-diode or the like), re-converts the inputted combined optical signal into an electrical signal and re-generates an electrical signal (an analog signal or a digital signal) correlating with the original electrical signal with angle demodulation operation to output the electrical signal. The filter F passes only a signal component corresponding to the original electrical signal (that is, a signal component of the same frequency band as that of the original electrical signal) among signals outputted from the optical/electrical converting portion 4. Described below are more specific examples of configuration of the present embodiment.

(1) First specific example of configuration in the first embodiment

Figure 2:
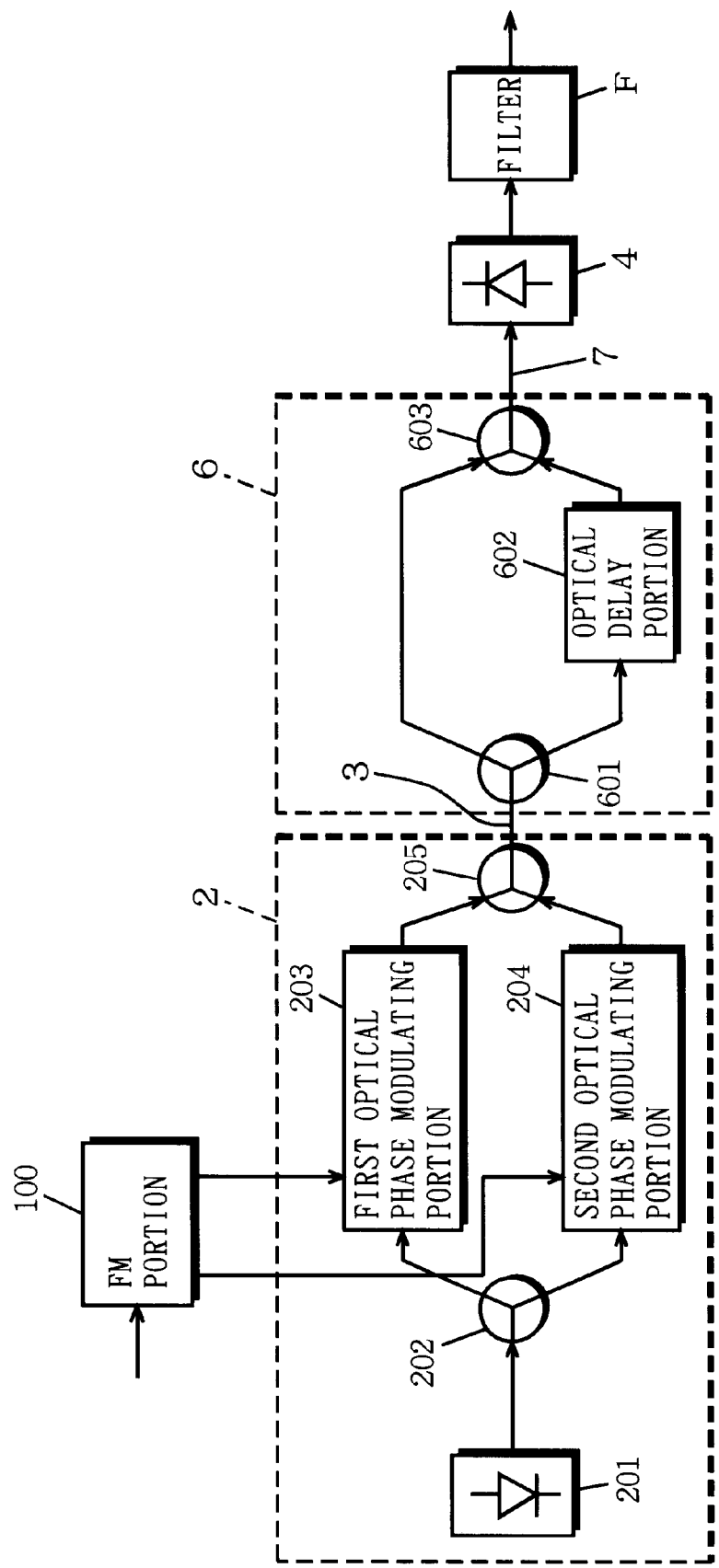
FIG. 2 is a block diagram showing a first specific example of configuration of the optical transmission system according to the first embodiment of the present invention.

FIG. 2 is a block diagram showing a first specific example of configuration of the optical transmission system according to the first embodiment of the present invention. In FIG. 2, the optical transmission system of the present example of configuration includes an FM portion 100 as an example of the angle modulating portion 1. The optical modulating portion 2 includes a light source 201, a first optical branch portion 202, a first optical phase modulating portion 203, a second optical phase modulating portion 204 and an optical coupling portion 205. The interference portion 6 includes a second optical branch portion 601, an optical delay portion 602 and an optical combining portion 603.

Next, the operation of the specific example shown in FIG. 2 will be explained below. To the FM portion 100 is inputted an electrical signal with a high frequency and a wide-band, for example, a multichannel frequency-division-multiplexed signal and the like as an original signal to be subjected to FM. The FM portion 100 converts the inputted electrical signal into an FM signal with a predetermined frequency. The optical modulating portion 2 of the present configuration example has t he configuration of an external modulation scheme and the light source 201 outputs an unmodulated light. The first optical branch portion 202 branches the unmodulated light outputted from the light source 201 into two. The first and second optical phase modulating portions 203 and 204, which are provided for each of the two lights outputted from the first optical branch portion 202, perform predetermined optical phase modulation with the FM signals outputted from the FM portion 100. The optical-phase-modulated signals outputted from the first and second optical phase modulating portions 203 and 204 are each combined in the optical coupling portion 205 to be converted into an optical-amplitude-modulated signal. The optical-amplitude-modulated signal is inputted to the interference portion 6 through the first optical waveguide portion 3. In the interference portion 6, the second optical branch portion 601 branches the inputted optical signal into first and second optical signals. The optical delay portion 602 provides the second optical signal outputted from the optical branch portion 601 with a predetermined delay $T_p$. The optical combining portion 603 combines the first optical signal outputted from the second optical branch portion 601 and the second optical signal outputted from the optical delay portion 602 to output the resultant signal to the second optical waveguide portion 7. The optical/electrical converting potion 4 creates a product of the first and second optical signals transmitted through the second optical waveguide portion 7 (such operation is commonly called as homodyne detection).

Description will be made of operation of the first specific example below using equations. It is assumed that as to the first and second optical-amplitude-modulated signals outputted from the second optical branch portion 601, an electric field component Ea(t) of the first optical signal is expressed by the following equation (1) and an electric field component Eb(t) of the second optical signal passing through the optical delay portion 602 is expressed by the following equation (2), respectively.

$$Ea(t) = m \cos(2\pi f_t t) \times \cos(2\pi f_0 t) \quad (1)$$

$$Eb(t) = -m \cos\{2\pi f_t(t-T_p)\} \times \cos\{2\pi f_0(t-T_p)\} \quad (2)$$

In the above-described equations (1) and (2), m represents an amplitude in the electric field, $f_t$ represents an (instantaneous) frequency of the FM signal, $f_0$ represents an optical frequency and $T_p$ represents the predetermined delay in the optical delay portion 602. After these are combined to be subjected to square-law-detection in the optical/electrical converting portion 4, an optical current $I_0$(t) after the square-law-detection is expressed by the following equation (3).

$$I_0(t) = \frac{1}{2}[m^2 \cos^2(2\pi f_t t) \times \cos^2(2\pi f_0 t) + m^2 \cos^2\{2\pi f_t(t-T_p)\} \times \cos^2\{2\pi f_0(t-T_p)\} -$$

$$2m^2 \cos(2\pi f_t t) \times \cos\{2\pi f_t(t-T_p)\} \times \cos\{2\pi f_0 t\} \times \cos\{2\pi f_0(t-T_p)\}] \quad (3)$$

Considering that, in the above equation (3), signals corresponding to the terms of periodic functions depending on the optical frequency $f_0$ are not outputted due to a frequency response limit in the optical/electrical converting portion 4, a signal component $I_s$(t) derived from the optical/electrical converting portion 4 is expressed by the following equation (4) by expanding only a third term.

$$I_s(t) = -m^2 \cos(2\pi f_t t) \times \cos\{2\pi f_t(t-T_p)\} \times \quad (4)$$
$$\cos(2\pi f_0 t) \times \cos\{2\pi f_0(t-T_p)\}$$

$$= \begin{Bmatrix} -m^2 \cos\{2\pi f_t(2t-T_p)\} + \dfrac{\cos(2\pi f_t T_p)}{2} \times \\ \dfrac{\cos\{2\pi f_0(2t-T_p)\} + \cos(2\pi f_0 T_p)}{2} \end{Bmatrix} \quad (4a)$$

$$= -\dfrac{m^2}{4}\begin{bmatrix} \cos\{2\pi f_t(2t-T_p)\} \times \cos\{2\pi f_0(2t-T_p)\} + \\ \cos\{2\pi f_t(2t-T_p)\} \times \cos(2\pi f_0 T_p) + \\ \cos\{2\pi f_0(2t-T_p)\} \times \cos(2\pi f_t T_p) + \\ \cos(2\pi f_t T_p) \times \cos(2\pi f_0 T_p) \end{bmatrix} \quad (4b)$$

Since m, $f_0$, $T_p$ are constant values, the magnitude of the fourth term in the second expanded equation (4b) of the equation (4) is changed depending on the instantaneous frequency $f_t$ of the FM signal. That is, it is possible to derive an optical current whose magnitude is changed according to variations in frequency of the FM signal.

While, in the first specific example, the optical modulating portion 2 outputs an optical-amplitude-modulated signal, the optical modulating portion 2 may output an optical-intensity-modulated signal. The operation of this case will be described below using equations. As is the case with the above description, as for the first and second optical-intensity-modulated signals outputted from the second optical branch portion 601, the electric field component Ea(t) of the first optical signal is expressed by the following equation (5) and the electric field component Eb(t) of the second optical signal passing through the optical delay portion 602 is expressed by the following equation (6), respectively.

$$Ea(t) = \sqrt{1 + m\cos(2\pi f_t t)} \times \cos(2\pi f_0 t) \quad (5)$$
$$\cong \left\{1 + \dfrac{m}{2}\cos(2\pi f_t t)\right\} \times \cos(2\pi f_0 t)$$

$$Eb(t) = \sqrt{1 - m\cos\{2\pi f_t(t-T_p)\}} \times \cos\{2\pi f_0(t-T_p)\} \quad (6)$$
$$\cong \left\{1 - \dfrac{m}{2}\cos\{2\pi f_t(t-T_p)\}\right\} \times \cos\{2\pi f_0(t-T_p)\}$$

The optical current $I_0$(t) obtained by subjecting the combined signal to square-law-detection in the optical/electrical converting portion 4 is expressed by the following equation (7).

$$I_0(t) = \quad (7)$$
$$\dfrac{1}{2}\Big(\Big\{1 + \dfrac{m}{2}\cos(2\pi f_t t)\Big\}^2 \times \cos^2(2\pi f_0 t) + \Big[1 - \dfrac{m}{2}\cos\{2\pi f_t(t-T_p)\}\Big]^2 \times$$
$$\cos^2\{2\pi f_0(t-T_p)\} + 2\Big\{1 + \dfrac{m}{2}\cos(2\pi f_t t)\Big\} \times \Big[1 -$$
$$\dfrac{m}{2}\cos\{2\pi f_t(t-T_p)\}\Big] \times \cos(2\pi f_0 t) \times \cos\{2\pi f_0(t-T_p)\}\Big)$$

Considering that, in the above equation (7), signals corresponding to the terms of periodic functions depending on the optical frequency $f_0$ are not outputted due to the frequency response limit of the optical/electrical converting portion 4, the signal component $I_s$ (t) derived from the optical/electrical converting portion 4 is expressed by the following equation (8).

$$I_s(t) = -\frac{m^2}{4}\cos(2\pi f_t t) \times \cos\{2\pi f_t(t-T_p)\} \times \qquad (8)$$
$$\cos(2\pi f_0 t) \times \cos\{2\pi f_0(t-T_p)\}$$

$$= -\frac{m^2}{4}\frac{\cos\{2\pi f_t(2t-T_p)\} + \cos(2\pi f_t T_p)}{2} \times \left.\begin{matrix}\\\\\end{matrix}\right\} \qquad (8a)$$
$$\frac{\cos\{2\pi f_0(2t-T_p)\} + \cos(2\pi f_0 T_p)}{2}$$

$$= -\frac{m^2}{16}[\cos\{2\pi f_t(2t-T_p)\} \times \cos\{2\pi f_0(2t-T_p)\} + $$
$$\cos\{2\pi f_t(2t-T_p)\} \times \cos(2\pi f_0 T_p) + \left.\begin{matrix}\\\\\\\end{matrix}\right\} \qquad (8b)$$
$$\cos\{2\pi f_0(2t-T_p)\} \times \cos(2\pi f_t T_p) + $$
$$\cos(2\pi f_t T_p) \times \cos(2\pi f_0 T_p)]$$

It is found that in a second expanded equation (8b) of the above equation (8), the magnitude of the fourth term is changed depending on the instantaneous frequency $f_t$ of the FM signal, making it possible to derive an optical current whose magnitude is changed according to variations in frequency of the FM signal as in the case with the second expanded equation (4b) of the above-described equation (4).

Figure 3A:
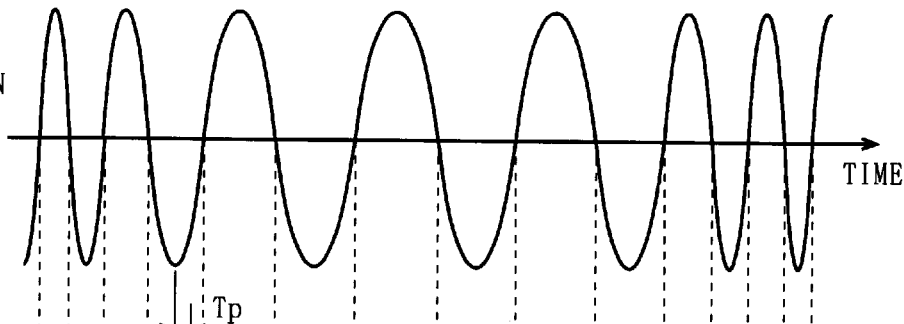
FIGS. 3a to 3c are diagrams for explaining FM demodulation operation in the optical transmission system in FIG. 2.
Figure 3B:
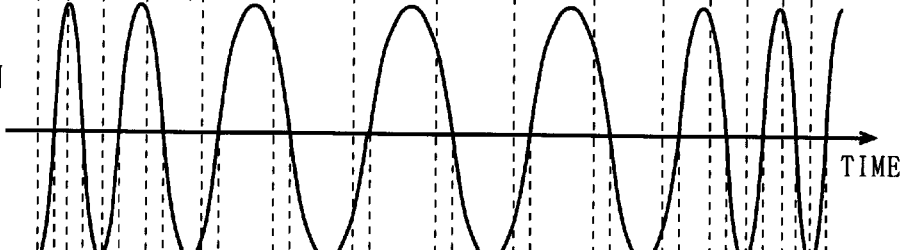
Figure 3C:
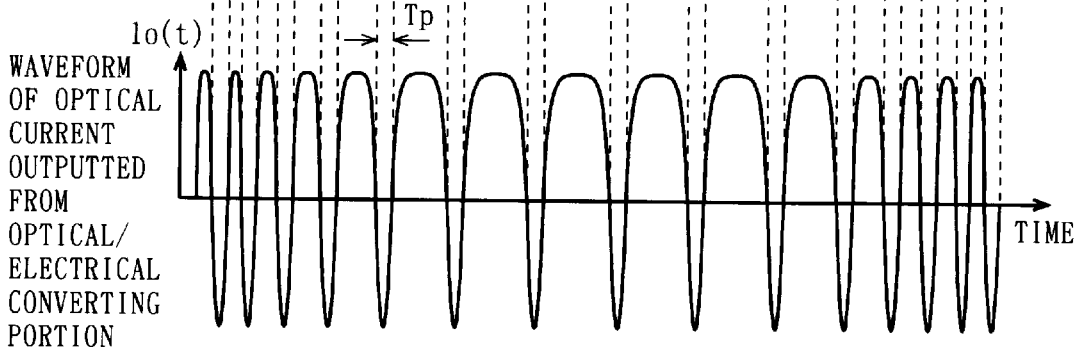

FIGS. 3a and 3b schematically show amplitude fluctuation components (or intensity fluctuation components) of electric fields of the first and second optical signals, respectively. FIG. 3c shows a waveform of an optical current, which is outputted from the optical/electrical converting portion 4, corresponding to t he amplitude fluctuation components or intensity fluctuation component. As shown in FIG. 3c, the optical/electrical converting portion 4 outputs a pulse-like signal comprising of negative differential pulses. Each pulse duration of each differential pulse is constant corresponding to the predetermined delay $T_p$ in the optical delay portion 602, and occurrence intervals of the differential pulses correspond to the variations in frequency of the FM signal outputted from the FM portion 100. The filter F receives the pulse-like signal to pass only a signal component (a low-frequency component) of a band corresponding to that of the electrical signal inputted to the FM portion 100. I n this way, the electrical signal can be obtained.

Figure 4:
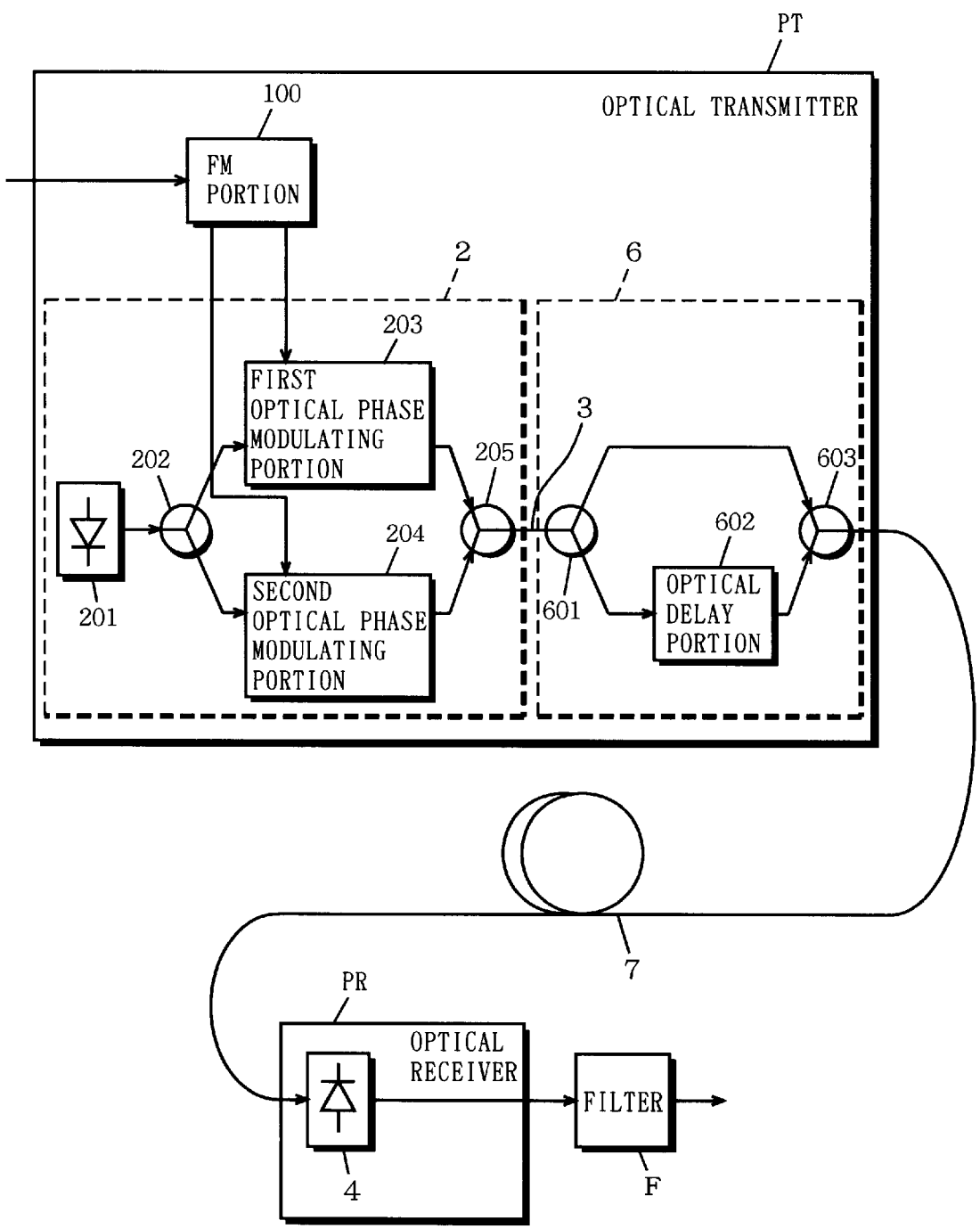
FIG. 4 is a block diagram showing a first operational example of the optical transmission system in FIG. 2.

FIG. 4 is a diagram showing a first operational example of the optical transmission system in FIG. 2. In FIG. 4, according to the present operational example, the FM portion 100, the optical modulating potion 2, the optical waveguide portion 3 and the interference portion 6 constitute an optical transmitter PT, and the optical/electrical converting portion 4 constitutes an optical receiver PR. Further, an optical transmission medium such as an optical fiber and the like is used as the second optical waveguide portion 7 to expand a physical distance between the optical transmitter PT and the optical receiver PR.

In the operational example in FIG. 4, the first and second optical signals transmitted through the second optical waveguide portion 7 (the optical fiber) are both created from the light source 201, so that the optical wavelengths of the optical signals are the same. Therefore, even when not a special optical fiber having polarization maintaining features but a normal single-mode optical fiber is employed as the second optical waveguide portion 7, the relative polarization states of the two optical signals outputted from the optical combining portion 603 can be always maintained constant even after the optical signals are transmitted through the second optical waveguide portion 7. Accordingly, the two optical signals are adjusted so that the polarization states of the optical signals become the same, and then inputted to the optical combining portion 603, thereby enabling the polarization states of the two optical signals to be maintained the same even after the optical signals are transmitted through the second optical waveguide portion 7. As a result, homodyne efficiency in the optical/electrical converting portion 4 reaches its maximum, which makes it possible to realize high FM demodulation efficiency with high stability.

As described in the above, in the operational example in FIG. 4, a constituent required for the optical receiver PR is only the optical/electrical converting potion 4 which is relatively inexpensive, and expensive parts are all accommodated in the optical transmitter PT. Accordingly, the present configuration can provide the optical receiver PR (the receiving terminal) at low costs and especially in the case of an optical distribution system, the system cost is reduced to construct the greatly economical system.

Figure 5:
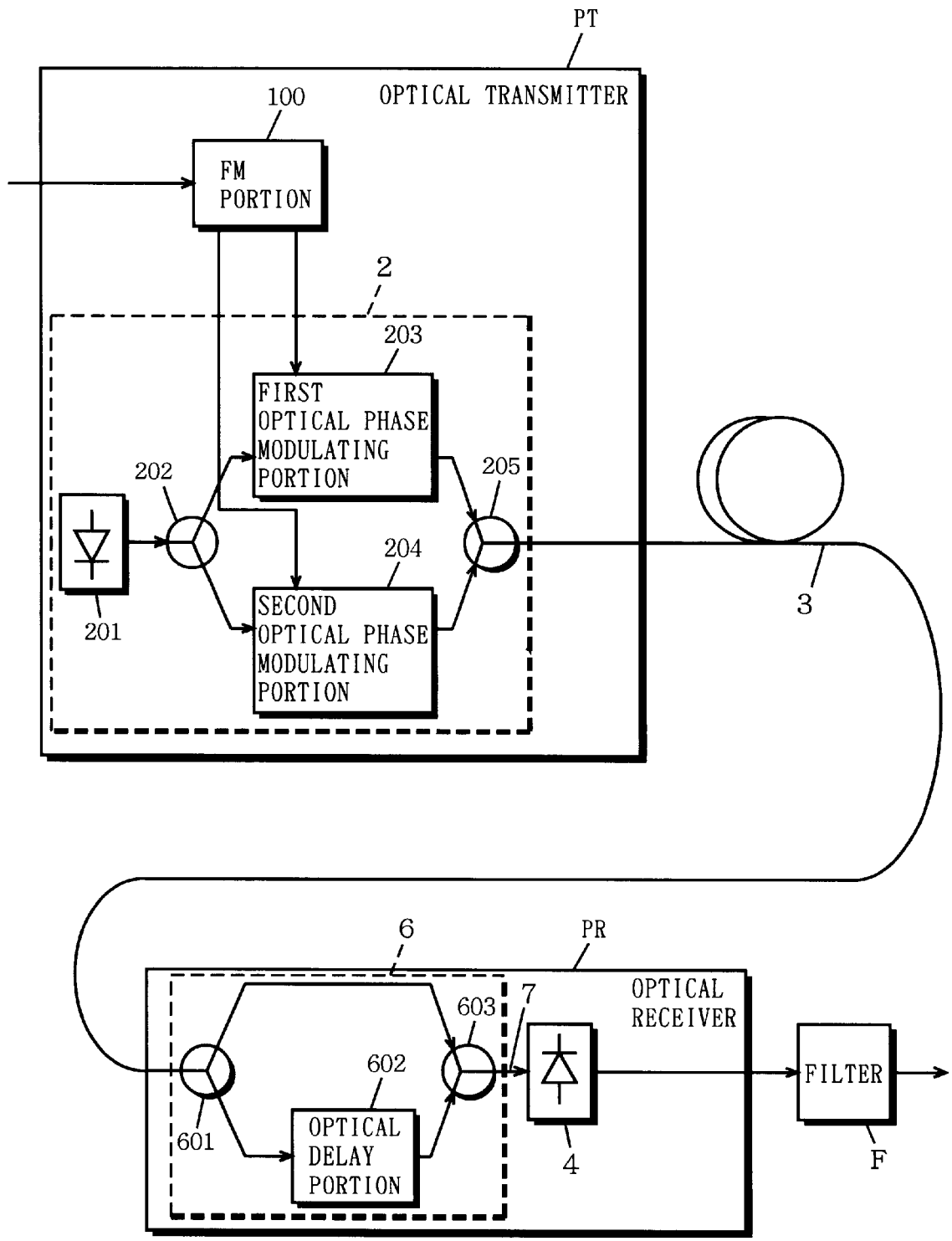
FIG. 5 is a block diagram showing a second operational example of the optical transmission system in FIG. 2.

FIG. 5 is a diagram showing a second operational example of the optical transmission system in FIG. 2. In FIG. 5, according to the present operational example, the FM portion 100 and the optical modulating portion 2 constitute the optical transmitter PT, and the interference portion 6 and the optical/electrical converting portion 4 constitute the optical receiver PR. Further, an optical transmission medium such as an optical fiber and the like is used as the first optical waveguide portion 3 to expand the physical distance between the optical transmitter PT and the optical receiver PR. The operational example in FIG. 5 has a feature that the optical receiver PR can be constituted by relatively inexpensive parts (since an electric demodulation circuit is not required) and especially in the case of an optical distribution system, the system cost is reduced to construct the greatly economical system, although the feature is not so remarkable as that of the operational example in FIG. 4.

(2) Second specific example of configuration in the first embodiment

FIG. 6 is a block diagram showing a second specific example of configuration of the optical transmission system according to the first embodiment of the present invention. In FIG. 6, the optical transmission system of the present specific example includes an optical directional coupling portion 206 in place of the optical coupling portion 205, the first optical waveguide portion 3 and the second optical branch portion 601 in the first operational example of the first specific example (refer to FIG. 4), and the other configuration is the same as that in FIG. 4. Accordingly, description will be made of the operation below with an emphasis on the difference from the first operational example of the first specific example.

Figure 7A:
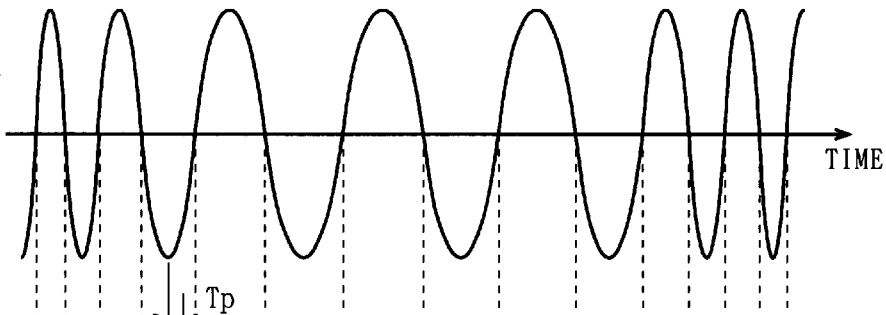
FIGS. 7a to 7c are diagrams for explaining FM demodulation operation in the optical transmission system in FIG. 6.
Figure 7B:
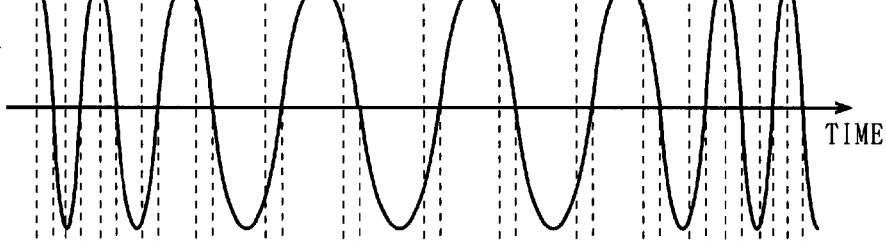
Figure 7C:
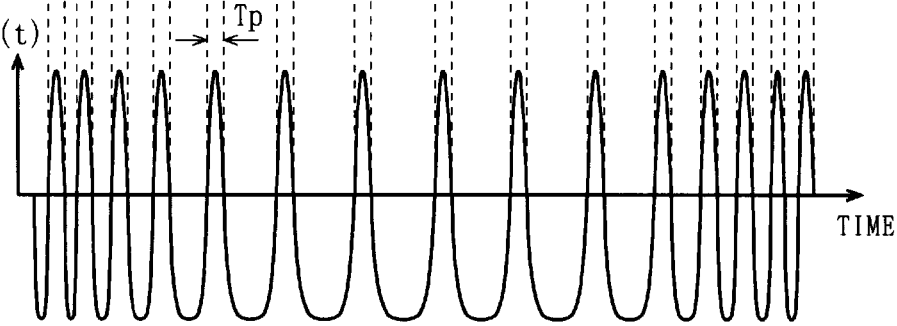

In the second specific example, the optical directional coupling portion 206 combines the optical-phase-modulated signals outputted from the first and second optical phase modulating portions 203 and 204 to convert the resultant signal into an optical-amplitude-modulated signal and then branches the optical-amplitude-modulated signal into first and second optical signals that have optical-modulated components being set in opposite phases to each other. In this case, as shown in FIG. 7c, a waveform of an optical current outputted from the optical/electrical converting portion 4 becomes a pulse-like signal being in opposite phase with respect to that of the first operational example (refer to FIG. 3c), and the number of occurrence of positive differential pluses included in the pulse-like signal uniquely corresponds to the variations in frequency of the FM signal. Accordingly, the pulse-like signal is inputted to the filter F, whereby only a signal component of a band (a low-frequency component) corresponding to that of an electrical signal inputted to the FM portion 100 is derived and as a result, the electrical signal can be acquired. Since equations of the operation are the same as those of the first operational example except that the phases of the signal waveforms are different, description of the equations is omitted here.

In the second specific example, the FM portion 100, the optical modulating portion 2 and the interference portion 6 constitute the optical transmitter PT, and the optical/ electrical converting portion 4 constitutes the optical receiver PR. Further, an optical transmission medium such as an optical fiber is used as the second optical waveguide portion 7 to expand the physical distance between the optical transmitter PT and the optical receiver PR.

As described above, the optical transmission system in the second specific example requires as a constituent of the optical receiver PR only the optical/electrical converting portion which is relatively inexpensive, as in the case with the operational example in FIG. 4, and expensive parts are all accommodated in the optical transmitter PT. Accordingly, it is possible to provide the optical receiver PR (the receiving terminal) at low costs and especially in the case of an optical distribution system, the system cost is reduced, to construct the greatly economical system.

(3) Third specific example of configuration in the first embodiment

Figure 8:
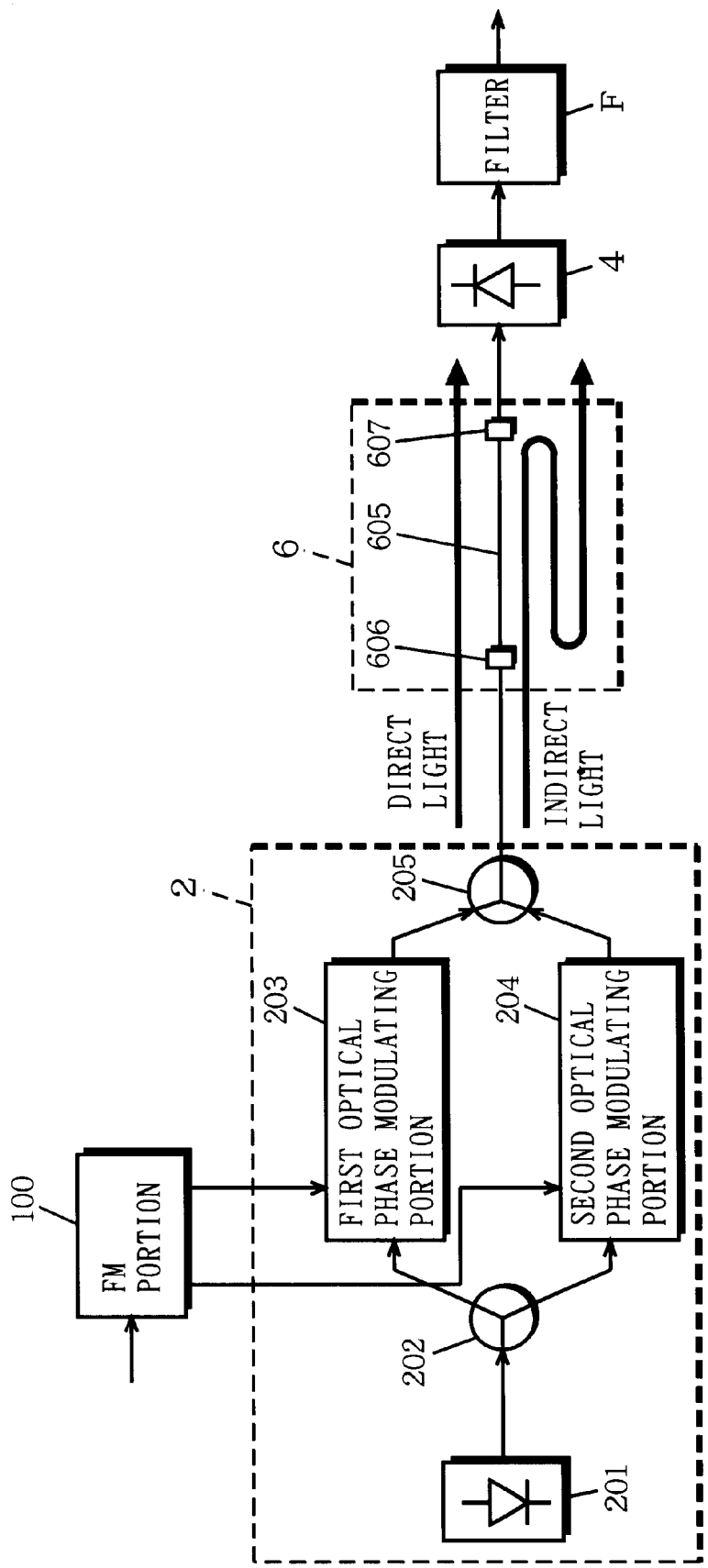
FIG. 8 is a bock diagram showing a third specific example of configuration of the optical transmission system according to the first embodiment of the present invention.

FIG. 8 is a block diagram showing a third specific example of configuration of the optical transmission. system according to the first embodiment of the present invention. In FIG. 8, the optical transmission system of the present specific example includes first and second optical transparent/reflecting portions 606 and 607 and optical waveguide portion 605 in place of the first and second optical waveguide portions 3 and 7, the second optical branch portion 601, the optical delay portion 602 and the optical combining portion 603 in the first specific example (refer to FIG. 2), and the other configuration is the same as that in FIG. 2. Therefore, the operation will be explained below with an emphasis on the difference from the first specific example.

In the third specific example, an optical signal outputted from the optical coupling portion 205 is guided through the optical waveguide portion 605 to the optical/electrical converting portion 4. The first and second optical transparent/ reflecting portions 606 and 607 are cascaded on the optical waveguide portion 605 at a prescribed interval. As shown in FIG. 8, a part of the optical signal outputted from the optical coupling portion 205 is transmitted through the first optical transparent/reflecting portion 606 and then through the second optical transparent/reflecting portion 607 and reaches the optical/electrical converting portion 4 (such optical signal is referred to as a direct light, hereinafter). Another part of the optical signal outputted from the optical coupling portion 205 is transmitted through the first optical transparent/reflecting portion 606, reflected at the second optical transmitting/reflecting portion 607, further reflected at the first optical transparent/reflecting portion 606, transmitted through the second optical transparent/reflecting portion 607 and reaches the optical/electrical converting portion 4 (such optical signal is referred to as an indirect light, hereinafter). The optical/electrical converting portion 4 subjects the direct light and the indirect light to homodyne detection with the square-law-detection characteristics and creates a product of the two lights. Propagation time in which the indirect light goes and returns between the first and second optical transparent/reflecting portions 606 and 607 installed at the predetermined interval (hereinafter referred to as round-trip propagation time) corresponds to the delay $T_p$ in the optical delay portion 602 in the first and second specific examples.

Figure 9:
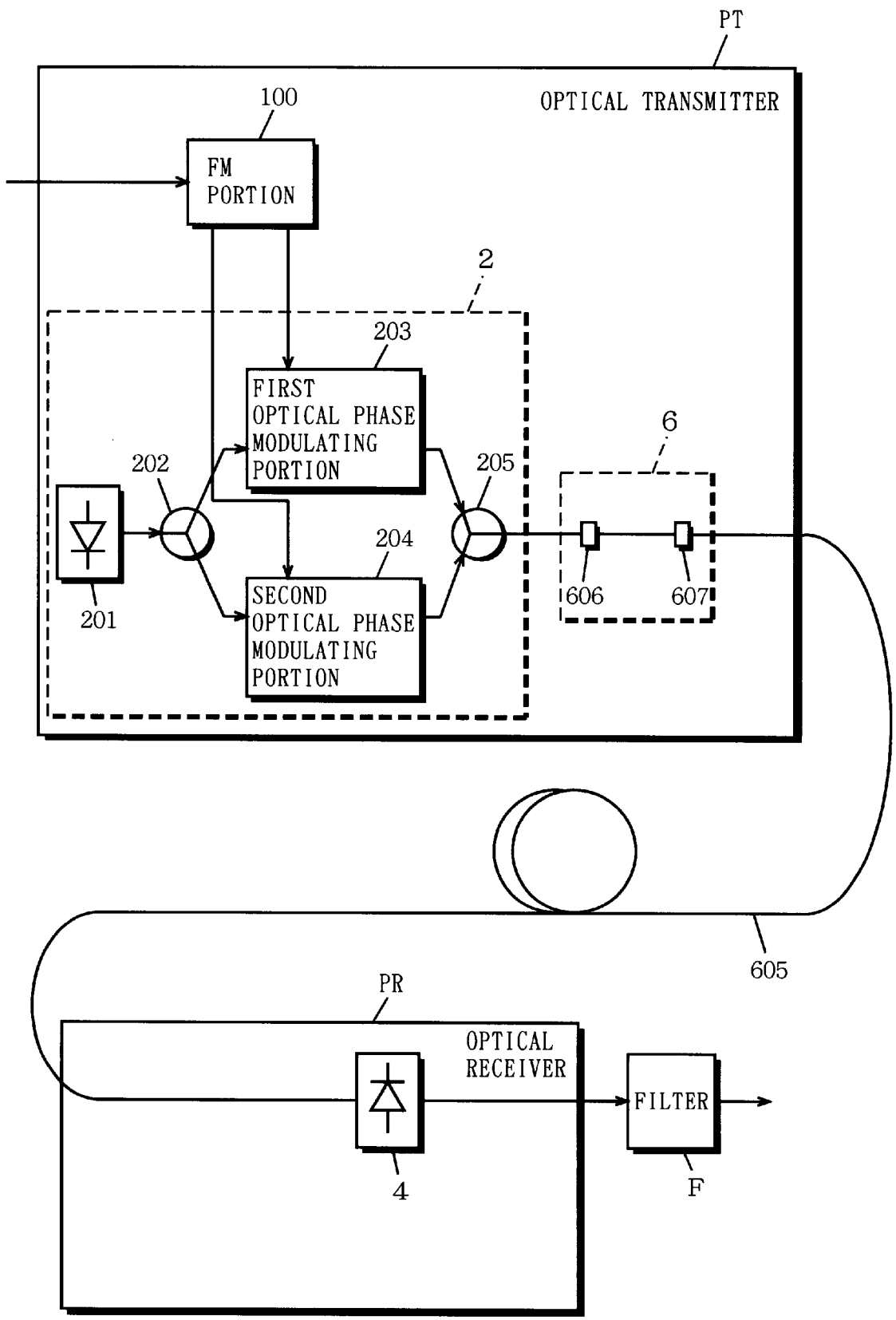
FIG. 9 is a block diagram showing a first operational example of the optical transmission system in FIG. 8.

FIG. 9 is a block diagram showing a first operational example of the optical transmission system in FIG. 8. In FIG. 9, according to the present operational example, the FM portion 100, the optical modulating portion 2 and the interference portion 6 constitute the optical transmitter PT, and the optical/electrical converting portion 4 constitutes the optical receiver PR. An optical transmission medium such as an optical fiber is used as the optical waveguide portion 605 to expand the physical distance between the optical transmitter PT and the optical receiver PR. That is, in the present operational example, the optical waveguide portion 605 functions as the second optical waveguide portion 7 in FIG. 1 as well.

In the operational example in FIG. 9, t he direct light and the indirect light transmitted through the optical waveguide portion 605 (the optical fiber) are both created from the light source 201, so that the optical wavelengths are the same. Therefore, even when not a special optical fiber having polarization maintaining features but a normal single -mode optical fiber is employed as the optical waveguide portion 605, relative polarization states of the direct light and the indirect light outputted from the second optical transparent/ reflecting portion 607 can be always maintained constant even while the lights are transmitted through the optical waveguide portion 605. Accordingly, the polarization states of the two lights are maintained the same, if the polarization states in the first and second optical transparent/reflecting portions 606 and 607 are adjusted so as to be the same, even after the lights are transmitted through the optical waveguide portion 605. As a result, the homodyne efficiency in the optical/electrical converting portion 4 reaches its maximum, thereby making it possible to realize high FM demodulation efficiency with high stability.

As described in the above, in the operational example in FIG. 9, a constituent required for the optical receiver PR is only the optical/electrical converting potion 4 which is relatively inexpensive and expensive parts are all accommodated in the optical transmitter PT as in the case with the operational example in FIG. 4. Accordingly, the optical receiver PR (the receiving terminal) can be provided at low costs and especially in the case of an optical distribution system, the system cost decreases to construct the greatly economical system.

Figure 10:
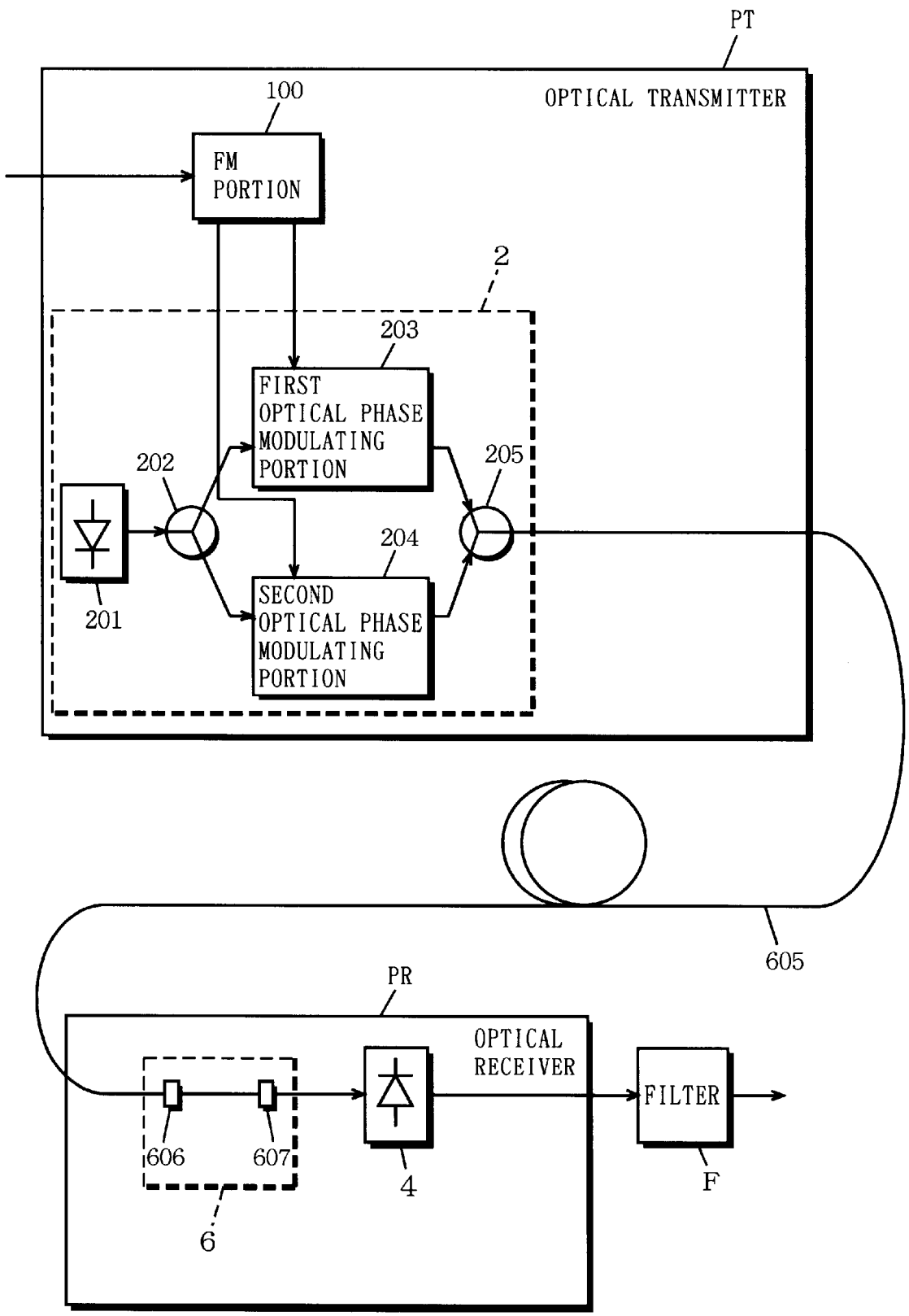
FIG. 10 is a block diagram showing a s econd operational example of the optical transmission system in FIG. 8.

FIG. 10 is a block diagram showing a second operational example of the optical transmission system in FIG. 8. In FIG. 10, according to the present operational example, the FM portion 100 and the optical modulating portion 2 constitute the optical transmitter PT, and the interference portion 6 and the optical/electrical converting portion 4 constitute the optical receiver PR. Further, an optical transmission medium such as an optical fiber and the like is used as the optical waveguide portion 605 to expand the physical distance between the optical transmitter PT and the optical receiver PR. That is, In the present operational example, the optical waveguide portion 605 functions as the first optical waveguide portion 3 in FIG. 1 as well.

As described above, the operational example in FIG. 10 has a feature that the optical receiver PR can be structured by relatively inexpensive parts and especially in the case of an optical distribution system, the system cost decreases to construct the greatly economical system, although the feature is not so remarkable as that of the operational example in FIG. 9.

The variations and operation requirements of the first to third specific examples (FIGS. 2, 6 and 8) will be explained in detail below.

A. About modulation schemes

While the first to third specific examples are configured so that an analog signal is subjected to FM to be optically transmitted, the present embodiment can be applied to a system in which an analog signal is subjected to PM to be optically transmitted, and in this case, the effect is the same as those of the specific examples. As to the configuration in this case, it is only necessary to replace the FM portion 100 with a known PM portion and the other configuration of the optical transmission system may be completely the same as those in the first to third specific examples.

Moreover, the present embodiment can naturally subject a digital signal, in place of an analog signal, to frequency modulation or phase modulation for optical transmission, and in this case, the effect is the same as those of the specific examples. As to the configuration of this case, it is only necessary to replace the FM portion 100 with a known FSK portion or PSK portion and other configuration may be completely the same as those in the first to third specific examples.

B. Definitions of optical amplitude modulation In the first to third specific examples, the phase of each optical phase modulation operation in the first and second optical phase modulating portions 203 and 204, that is, the phase of each FM signal inputted to the first and second optical phase modulating portions 203 and 204 is preferably set to a phase which enlarges an optical-amplitude-modulated component in the optical signal combined in the optical coupling portion 205 or the optical directional coupling portion 206. This will be described below.

Here, it is assumed that an electric field component $E_1(t)$ of an optical signal outputted from the first optical phase modulating portion 203 is expressed by the following equation (9) and an electric field component $E_2(t)$ of an optical signal outputted from the second optical phase modulating portion 204 is expressed by the following equation (10).

$$E_1(t) = \frac{E_0}{2}\cos(2\pi f_0 t + d_1) \qquad (9)$$

$$E_2(t) = \frac{E_0}{2}\cos(2\pi f_0 t + d_2) \qquad (10)$$

In the above equations (9) and (10), fo is an optical frequency, $d_1$ and $d_2$ are the phase shift by the first and second optical phase modulating portions 203 and 204, respectively.

After detecting a combined electric field obtained by combining the electric field components $E_1(t)$ and $E_2(t)$, an optical current $I_0(t)$ corresponding to the electric field is expressed by the following equation (11).

$$I_0(t) = \frac{I_0}{2}\{1 + \cos(d_1 - d_2)\} \qquad (11)$$

Here, as expressed by the following equation (12), $d_b$ and $d(t)$ are introduced as parameters representing relative phases between $d_1$ and $d_2$.

$$d_b + d(t) = d_1 - d_2 \qquad (12)$$

The above db and d(t) correspond to a bias level (a voltage) and a modulated signal for a Mach-Zehnder type optical modulator constituted by the first optical branch portion 202, the first and second optical phase modulating portions 203 and 204, and the optical coupling portion 205 (or the optical directional coupling portion 206), respectively.

When the bias level db satisfies the following equation (13), that is, when phase difference between the first optical phase modulating portion 203 and the second optical phase modulating portion 204 is in phase with the FM signal, the above equation (11) is expressed by the following equation (14). As is clear from the following equation (14), the optical current $I_o(t)$ outputted from the optical/electrical converting portion 4 has a component proportional to a square of the modulated signal d(t) and an optical-amplitude-modulated component is generated.

$$d_b = 0 \qquad (13)$$

$$I_0(t) = \frac{I_0}{2}\left[2 - \frac{1}{2}d(t)^2\right] \qquad (14)$$

When the bias level db satisfies the following equation (15), that is, when the phase difference between the first optical phase modulating portion 203 and the second optical phase modulating portion 204 is in opposite phase with the FM signal, the above equation (11) is expressed by the following equation (16). As is clear from the following equation (16), the optical current $I_0(t)$ outputted from the optical/electrical converting portion 4 is proportional to the square of the modulated signal d(t) and an optical-amplitude-modulated component is generated.

$$d_b = \pi \qquad (15)$$

$$I_0(t) = \frac{I_0}{4}d(t)^2 \qquad (16)$$

As explained above, the phase of each FM signal inputted to the first and second optical phase modulating portions 203 and 204 is adjusted to an optimal state, which can enlarge an optical-amplitude-modulated component in the optical signal outputted from the optical coupling portion 205 or the optical directional coupling portion 206. As a result, it is possible to perform efficient FM demodulation.

As in the above, in the second and third specific examples, the optical modulating portion 2 is structured so as to convert an FM signal into an optical-amplitude-modulated signal and output the optical-amplitude-modulated signal. The optical modulating portion 2, however, may adopt an optical intensity modulation scheme in place of the optical amplitude modulation as described in the first specific example, and the operation and effect are almost the same as those in the above-described specific examples.

Moreover, while description was made as to the optical modulating portion 2, mainly to the structure which adopts the "external optical modulation scheme" using a Mach-Zehnder interferometer structure in the above specific examples, in the case where the optical modulating portion 2 uses "optical intensity modulation" in the above first and third specific examples, it is also possible to adopt a "direct optical modulation scheme" which is more popular as an optical modulation scheme, that is a structure in which an injection current to a semiconductor laser element is direct modulated with an FM signal. In this case, the optical transmission system can be configured more readily at lower costs.

C. About delay

In the above first to third specific examples, the predetermined delay Tp in the optical delay portion 602 or the round-trip propagation time Tp between the first and second optical transparent/reflecting portions 606 and 607 installed at the predetermined interval is preferably set so as to satisfy the relation in the following equation (17) with respect to a center angular frequency $\omega_c$ ($=2\pi \cdot f_c$) of the FM signal.

$$\omega_c \times T_p = \pi/4 \qquad (17)$$

By satisfying the above-described relation, as is clear from the second expanded equation (4b) of the equation (4) or the second expanded equation (8b) of the equation (8) shown in the first specific example, improved are linearity and demodulation efficiency of the outputted optical current $I_0(t)$ from the optical/electrical converting portion 4 relative to the instantaneous frequency $f_t$ of the FM signal centering on the frequency $f_c$ (=$f_c$+$\Delta f(t)$). That is, the FM demodulation characteristics improve to acquire a demodulated signal with better quality.

Moreover, while an analog signal is subjected to FM to be optically transmitted in the first to third specific examples, in the case where a digital signal is subjected to modulation to be optically transmitted in place of the analog signal, the predetermined delay $T_p$ in the optical delay portion 602 or the round-trip propagation time $T_p$ between the first and second optical transparent/reflecting portions 606 and 607 installed at the predetermined interval is preferably set so as to satisfy the relation in the above equation (17) with respect to the center frequency $f_c$ of an FSK modulated signal, or the relation in the following equation (18) with respect to one symbol length (symbol time) L of the digital signal.

$$T_p = L \tag{18}$$

When the above relation first expanded equation (4a) of the equation (4) or the first expanded equation (8a) of the equation (8) shown in the first specific example, a delayed detection system of the FSK (or PSK) modulated signal is structured to perform demodulation with higher efficiency.

Figure 11:
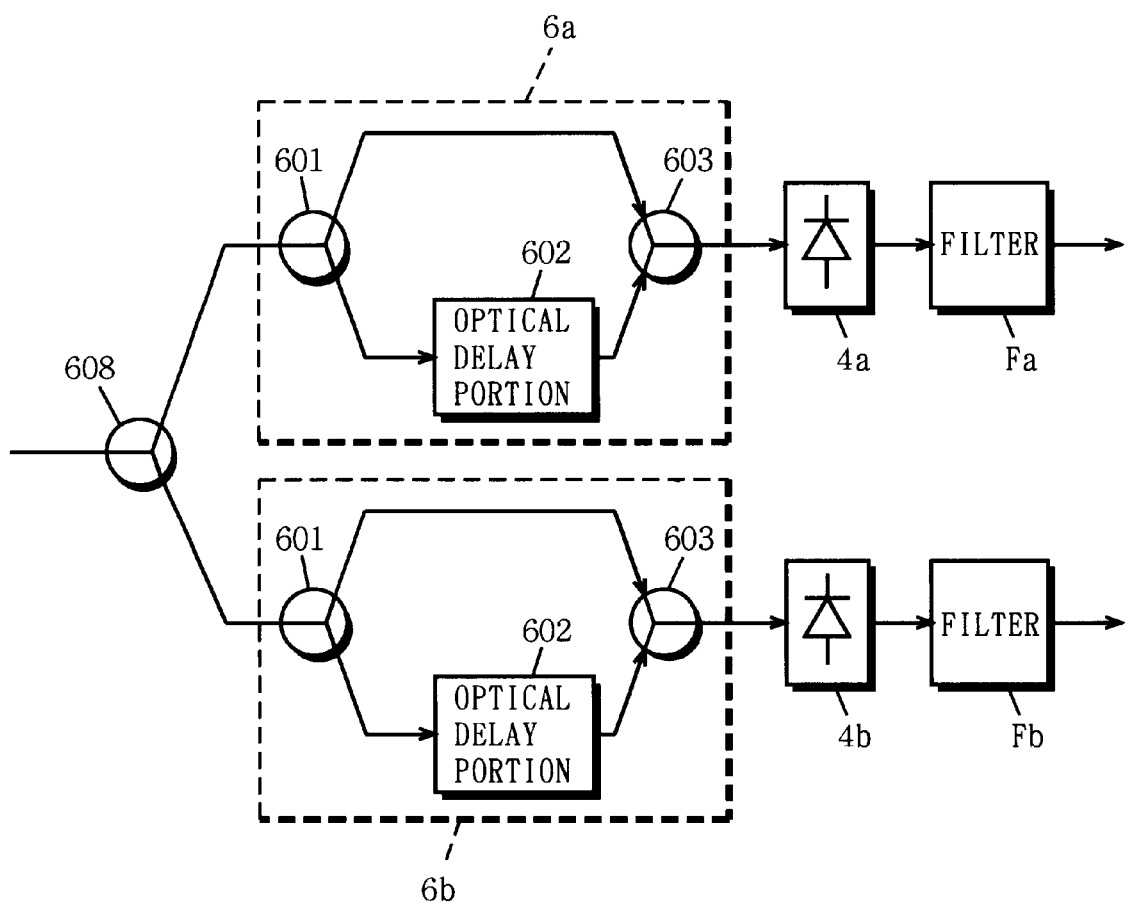
FIG. 11 is a block diagram showing an example of the structure of an optical receiver used in a system for optically transmitting a QPSK modulated signal.

Also, when a digital signal is subjected to phase modulation to optically transmit a quadrature PSK modulated signal (a QPSK modulated signal), the interference portion 6 and the optical/electrical converting portion 4 have preferably a double parallel structure shown in FIG. 11. In FIG. 11, an optical dividing portion 608 divides an optical signal outputted from the optical modulating portion 2 into first and second received lights. A first optical interference circuit 6a and a first optical/electrical converting portion 4a perform homodyne detection for the first received light, and a second optical interference circuit 6b and a second optical/electrical converting portion 4b perform homodyne detection for the second received light. A filter Fa and a filter Fb derive the original digital signal component from an outputted signal from the first optical/electrical converting portion 4a and an outputted signal from the second optical/electrical converting portion 4b, respectively. Further, a predetermined delay $T_1$ in the first optical interference circuit 6a and a predetermined delay $T_2$ in the second optical interference circuit 6b are preferably set so as to satisfy the relations in the following equations (19) and (20), respectively, with respect to one symbol length (symbol time) L of the digital signal.

$$T_1 = L/2 \tag{19}$$

$$T_2 = L/2 \tag{20}$$

By satisfying the above relations, a delayed detection system is configured for each of an I signal component and a Q signal component of the QPSK modulated signal, making it possible to favorably subject the QPSK modulated signal to demodulation.

While description was made of the case where the QPSK modulated signal is optically transmitted in the above, more generally speaking, when an electrical signal inputted to the angle modulating portion 1 is a digital signal and a PSK modulated signal with $2^n$-phase (n is a natural number) are outputted in place of the FM signal, FIG. 11 is constituted by a received light dividing portion which divides the inputted optical signal into $2^{n-1}$ received lights, first to $2^{n-1}$th interference portions which are provided for each of the $2^{n-1}$ received lights, branch each of the received lights into first and second optical signals, give a predetermined delay to the second optical signal and then combine the first and second optical signals, and optical/electrical converting portions provided for each of the first to $2^{n-1}$th interference portions.

D. About polarization states

In the first to third specific examples, for example, two optical propagation paths between the second optical branch portion 601 and optical combining portion 603 in FIG. 2, two optical propagation paths between the optical directional coupling portion 206 and optical combining portion 603 in FIG. 6, or an optical propagation part existing between the first and second optical transparent/reflecting portions 606 and 607 on the optical waveguide portion 605 in FIG. 8 are preferably constituted by an optical transmission medium capable of maintaining polarization such as a polarization maintaining fiber, an optical waveguide on the substrate of crystal or glass and the like. This enables the two optical signals (the first and second optical signals) outputted from the second optical branch portion 601 or the optical directional coupling portion 206 to be combined in the optical combining portion 603 with the polarization states of the two optical signals maintained the same. In other case, the polarization states of the direct light and the indirect light can be maintained the same in the optical waveguide portion 605 in FIG. 8. Thereby, the homodyne efficiency in the optical/electrical converting portion 4 becomes always maximum to realize high FM demodulation efficiency with high stability.

Further, in the first to third specific examples, the first optical branch portion 202, the first and second optical phase modulating portions 203 and 204 and the optical coupling portion 205 (or the optical directional coupling portion 206) are preferably constructed on a same crystal substrate. Such structure is the same as that of an optical intensity modulator of normal Mach-Zehnder type. Adopting such structure makes construction of an optical transmitter more readily.

Moreover, in order to downsize the apparatus, the second optical branch portion 601, the optical delay portion 602 and the optical combining portion 603 in the first specific example; the optical delay portion 602 and the optical combining portion 603 in the second specific example; and a part of the optical waveguide portion 605 and the first and the second optical transparent/reflecting portions 606 and 607 in the third specific example may be constructed on the above-described crystal substrate.

Additionally, in the first or second specific example, the optical propagation paths between the second optical branch portion 601 or the optical directional coupling portion 206 and the optical combining portion 603 are structured by optical waveguides on the substrate of crystal or glass, thereby maintaining the polarization states of the two optical signals to be inputted to the optical combining portion 603 the same and stable to realize high FM efficiency with stability.

Still further, in the third specific example, the optical propagation paths consist of the optical waveguide portion 605 and the first and second optical transparent/reflecting portions 606 and 607 are structured by optical waveguides on the substrate of crystal or glass, whereby the polarization states of the direct light and the indirect light are maintained the same and stable to realize high FM efficiency with stability.

(4) Fourth specific example of configuration in the first embodiment

Figure 12:
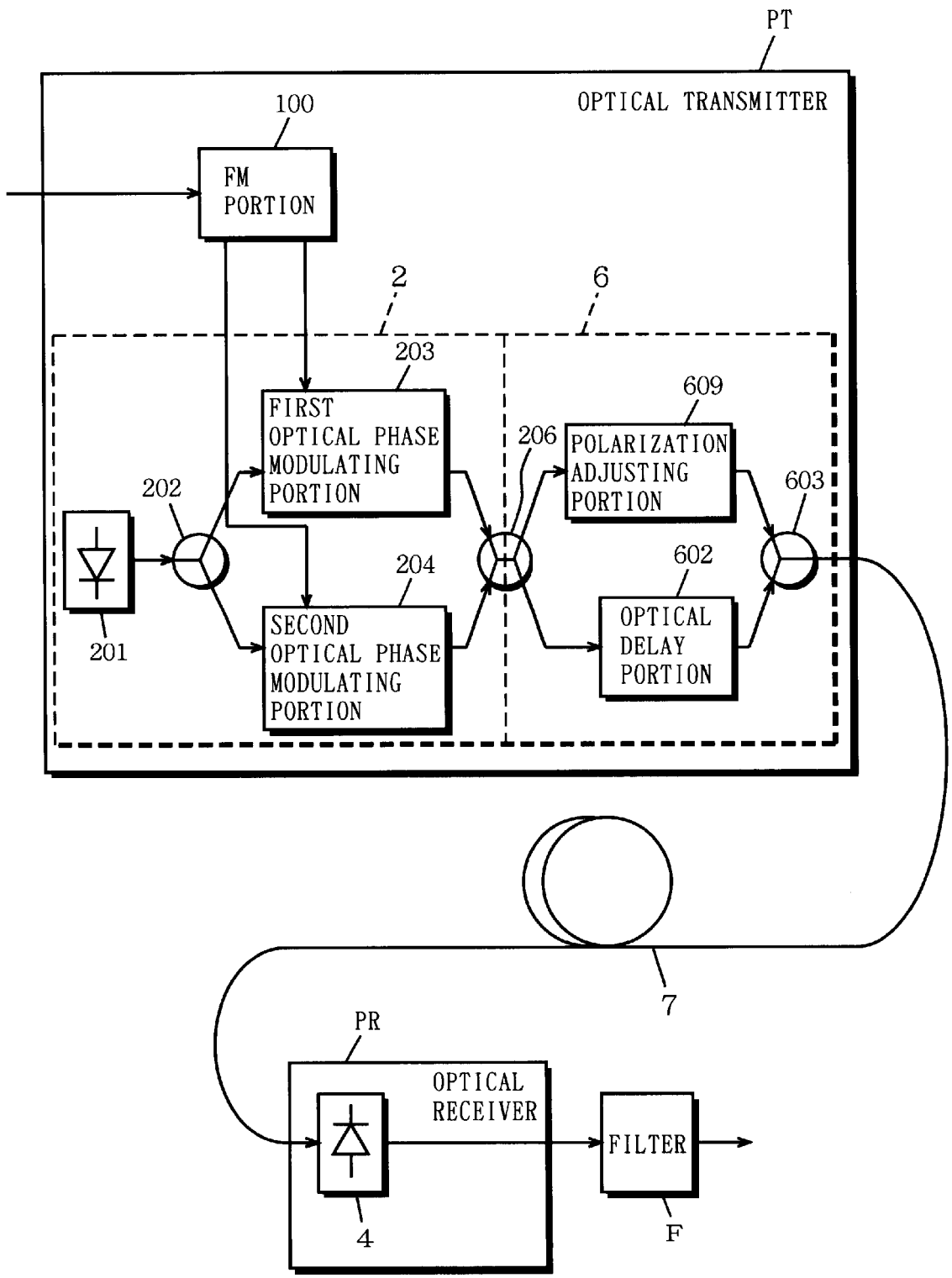
FIG. 12 is a block diagram showing a fourth specific example of configuration of the optical transmission system according to the first embodiment of the present invention.

FIG. 12 is a block diagram showing a fourth specific example of configuration of the optical transmission system according to the first embodiment of the present invention. In FIG. 12, in the optical transmission system of the present specific example, to one of the two optical propagation paths between the optical directional coupling portion 206 and the optical combining portion 603 is inserted a polarization adjusting portion 609. The other configuration of the present specific example is the same as that of the optical transmission system of the second specific example (refer to FIG. 6). The operation of the fourth specific example will be described below with an emphasis on the difference from the second specific example.

In the present specific example, a polarization state of one of two optical signals outputted from the optical directional coupling portion 206 is adjusted in the polarization adjusting portion 609 to equate the polarization states of the first and second optical signals in the optical combining portion 603. This makes the homodyne efficiency in the optical/electrical converting portion 4 maximum, which realizes high FM demodulation efficiency.

While FIG. 12 shows the case where the polarization adjusting portion 609 is inserted to the optical propagation path on the other side of the optical propagation path provided with the optical delay portion 602, the polarization adjusting portion 609 may be inserted to the optical propagation path provided with the optical delay portion 602, further, to both of the two optical propagation paths.

In addition, also in the first specific example (refer to FIG. 2), the polarization adjusting portion 609 may be inserted to both of the two optical propagation paths between the second optical branch portion 601 and the optical combining portion 603 or to either one of the optical propagation paths. In this case, the same effect can be obtained as that of the fourth specific example.

(5) Fifth specific example of configuration in the first embodiment

Figure 13:
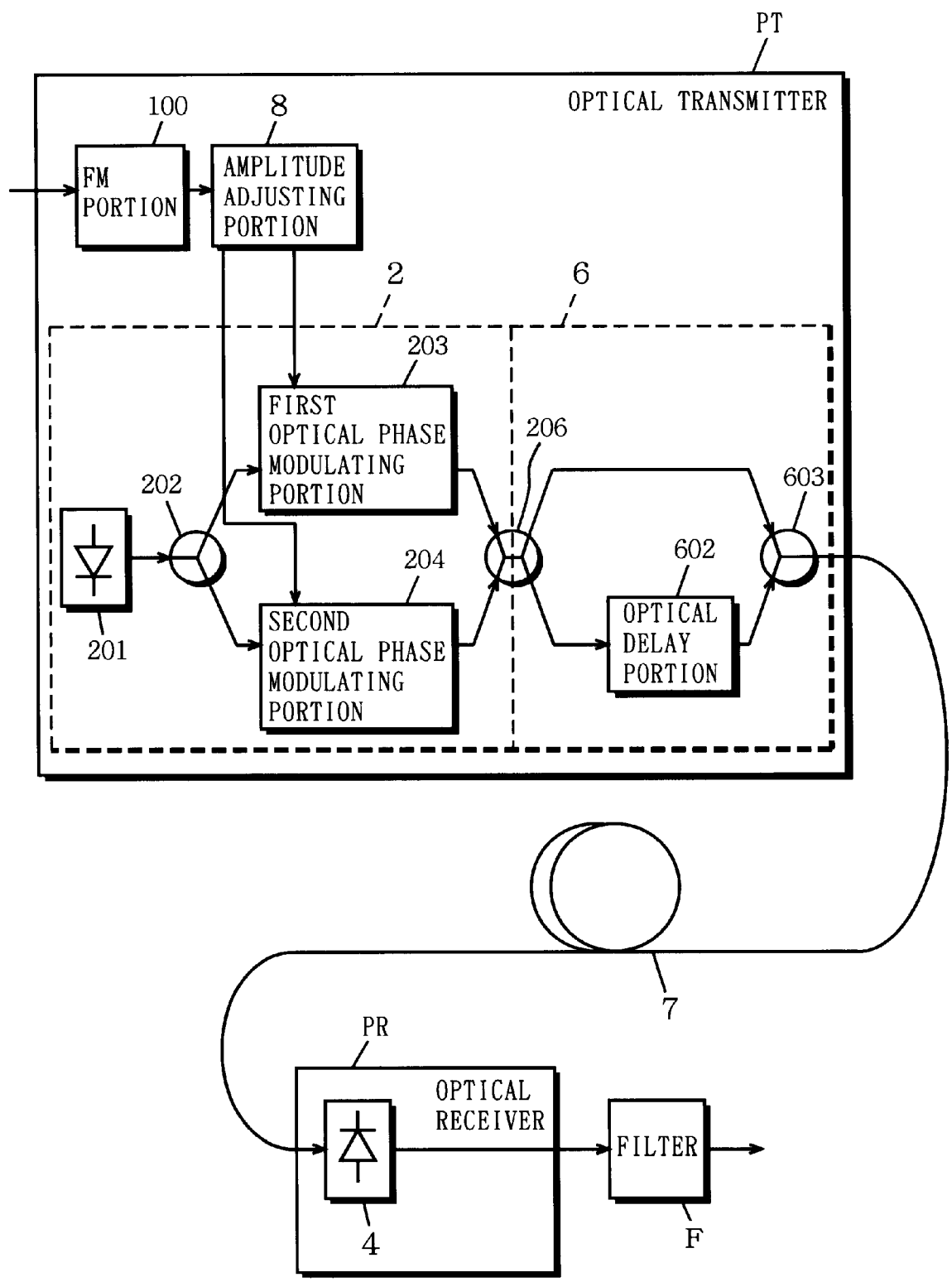
FIG. 13 is a block diagram showing a fifth specific example of configuration of the optical transmission system according to the first embodiment of the present invention.

FIG. 13 is a block diagram showing a fifth specific example of configuration of the optical transmission system according to the first embodiment of the present invention. In FIG. 13, in the optical transmission system of the present specific example, between the FM portion 100 and the first and second optical phase modulating portions 203 and 204 is additionally inserted an amplitude adjusting portion 8. The other configuration of the present specific example is the same as that of the optical transmission system in the second specific example (refer to FIG. 6). The operation of the fifth specific example will be described below with an emphasis on the difference from the second specific example.

Figure 14A:
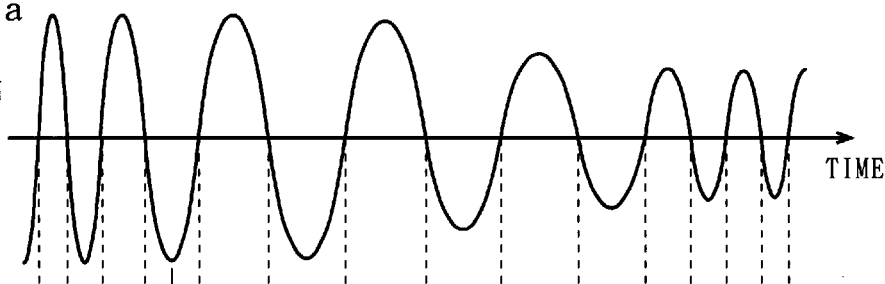
FIGS. 14a to 14d are diagrams for explaining FM demodulation operation in the optical transmission system in FIG. 13.
Figure 14B:
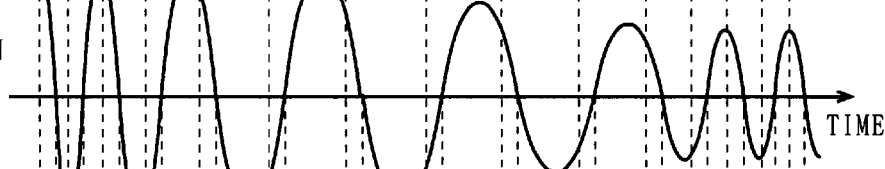
Figure 14C:
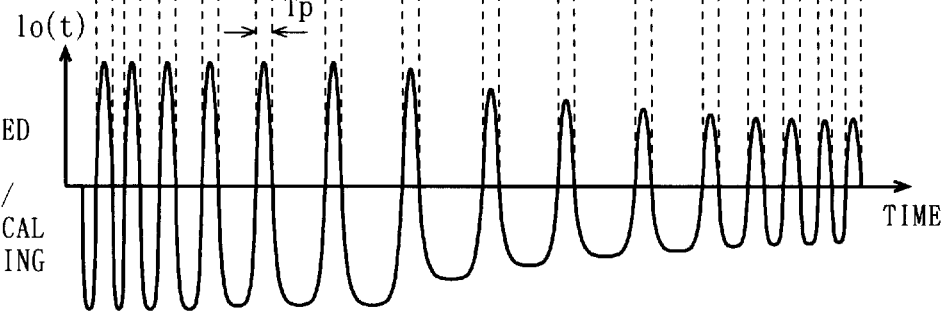
Figure 14D:
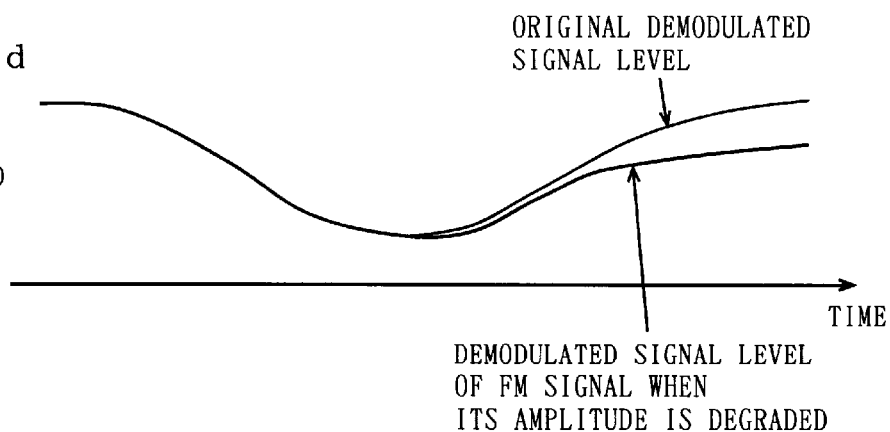

In the present specific example, the amplitude adjusting portion 8 receives an FM signal outputted from the FM portion 100 and subjects the FM signal to waveform shaping so that the amplitude is constant to output the FM signal to the first and second optical phase modulating portions 203 and 204. In the second specific example, as shown in FIG. 14c, as the amplitude of the FM signal is smaller, the amplitude of the pulse-like signal outputted from the optical/electrical converting portion 4 decreases. Therefore, the FM demodulation efficiency is degraded. In addition, the amplitude of the FM signal fluctuates with time, causing the FM demodulation efficiency to vary with time to occur distortion of a demodulated waveform.

Accordingly, by providing the amplitude adjusting portion 8 as in the present specific example, the amplitude of the FM signal is maintained constant, making it possible to suppress the degradation or variation of the FM demodulation efficiency and the distortion of the demodulated signal.

Similarly, in the first or third specific example (refer to FIG. 2 or FIG. 8), the amplitude adjusting portion 8 may be additionally inserted between the FM portion 100 and the first and second optical phase modulating portions 203 and 204. In this case, the same effect as that in the fifth specific example can be obtained.

(6) Sixth specific example of configuration in the first embodiment

Figure 15:
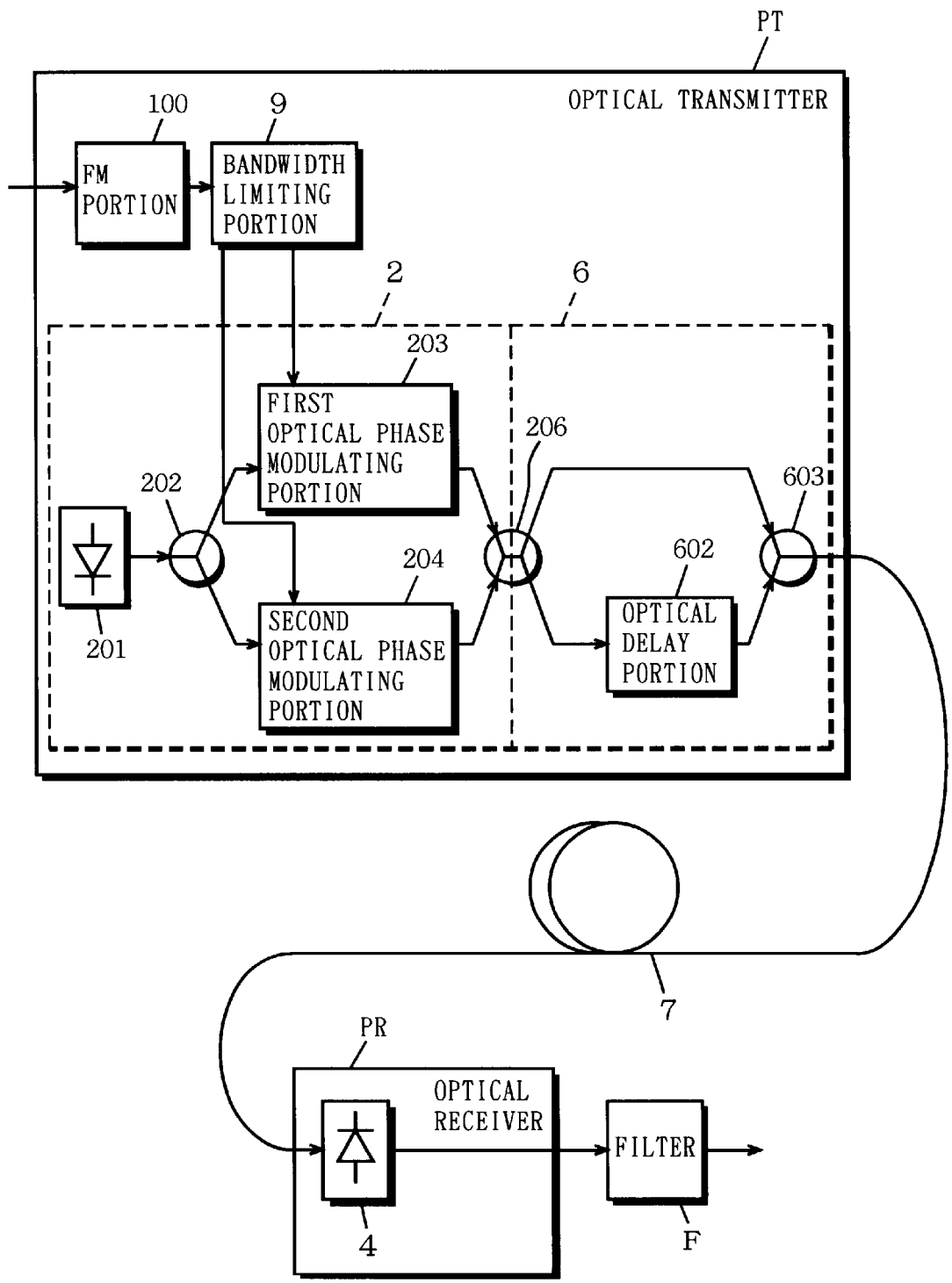
FIG. 15 is a block diagram showing a sixth specific example of configuration of the optical transmission system according to the first embodiment of the present invention.

FIG. 15 is a block diagram showing a sixth specific example of configuration of the optical transmission system according to the first embodiment of the present invention. In FIG. 15, in the optical transmission system of the present specific example, a bandwidth limiting portion 9 is additionally inserted between the FM portion 100 and the first and second optical phase modulating portions 203 and 204. The other configuration of the present specific example is the same as that of the optical transmission system of the second specific example (refer to FIG. 6). Description will be made of the operation of the sixth specific example below with an emphasis on the difference from the second specific example.

In the present specific example, the bandwidth limiting portion 9 receives an FM signal outputted from the FM portion 100 and limits an occupied bandwidth of the FM signal to output the FM signal to the first and second optical phase modulating portions 203 and 204. In the above second specific example, under the influence of non-linearities in FM demodulation characteristics and the like, a component of the FM signal passes through the optical/electrical converting portion 4 to remain in the optical current outputted from the optical/electrical converting portion 4. At this time, as shown in FIGS. 16a and 16b, in the case where a modulation index or the frequency deviation of the FM signal is large, there is possibility that a spectrum of the FM signal component remained in the output of the optical/electrical converting portion 4 spreads out in the frequency band of the demodulated signal, to interfere the demodulated signal. Therefore, as in the present specific example, the bandwidth limiting portion 9 is provided to previously eliminate a part of a lower sideband of the spectrum of the FM signal before the FM signal is inputted to the first and second optical phase modulating portions 203 and 204. Thus, it is possible to prevent the spectrum of the FM signal component remained in the output of the optical/electrical converting portion 4 from being superimposed on the frequency band of the demodulated signal, resulting in improvement in the quality of the demodulated signal.

Also in the first or third specific example (refer to FIG. 2 or FIG. 8), the bandwidth limiting portion 901 may be additionally inserted between the FM portion 100 and the first and second optical phase modulating portions 203 and 204. In this case, the same effect as that of the sixth specific example can be achieved.

(Second Embodiment)

FIG. 17 is a block diagram showing the configuration of an optical transmission system according to a second embodiment of the present invention. FIG. 17 also shows schematic diagrams of frequency spectrums of signals in respective portions. In FIG. 17, the optical transmission system of the present embodiment includes an angle modulating portion 1, an optical modulating portion 2, an optical waveguide portion 3, an optical branch portion 10, an interference portion 6, a first optical/electrical converting portion 4, a second optical/electrical converting portion 4', a filter F and a filter F', and is different from the first embodiment (refer to FIG. 1) in that the optical branch portion 10, the second optical/electrical portion 4' and the filter F' are added. Therefore, the same reference numbers are assigned to the portions operating in the same manners as those in the first embodiment and the detailed description thereof are omitted. The difference from the first embodiment will be mainly described below.

The optical branch portion 10 branches an optical signal (an optical-intensity-modulated signal or an optical-amplitude-modulated signal), which is outputted from the optical modulating portion 2 and then guided by the optical waveguide portion 3, into two. One optical signal of the two optical signals is subjected to angle demodulation by the interference portion 6 and the first optical/electrical converting portion 4 and further subjected to filtering processing by the filter F, to be re-converted into an electrical signal corresponding to an electrical signal inputted to the angle modulating portion 1. The other optical signal of the two optical signals, for example, is subjected to square-law detection in the second optical/electrical converting portion 4'. Thereby, an optical-intensity-modulated component or an optical-amplitude-modulated component in the other optical signal is re-converted into an electrical signal. After that, the signal outputted from the second optical/electrical portion 4' is subjected to filtering processing in the filter F', so that the same angle-modulated signal as an angle-modulated signal outputted from the angle modulating portion 1 can be derived.

As described in the foregoing, the optical transmission system in FIG. 17 converts an angle-modulated signal into an optical signal to branch the optical signal into a plurality of optical signals, reproduces an original electrical signal for the angle modulation from each of some of these optical signals, using the interference portion 6 and the first optical/electrical converting portion 4, as described in the first embodiment and subjects the other of these optical signals respectively to square-law detection in the second optical/electrical converting portion ' to reproduce an angle-modulated signal. This can construct a wired network using an optical fiber as a backbone and can also integrate the optical transmission system, if, for example, the angle-modulated signal outputted from the second optical/electrical converting portion 4' is sent out in the air as a radio wave, with a wireless network for mobile terminals and the like. Especially, in the case of utilizing a high-frequency, a microwave, a millimetre wave and the like, which is thought as an effective signal for a wireless network, the angle-modulated signal is received and subjected to demodulation to be the original electrical signal by a low cost configuration with optical signal processing in a wired system and at the same time it is sent to mobile terminals and the like as a radio wave. Thereby, a flexible and economical system can be constructed.

(Third Embodiment)

Figure 18:
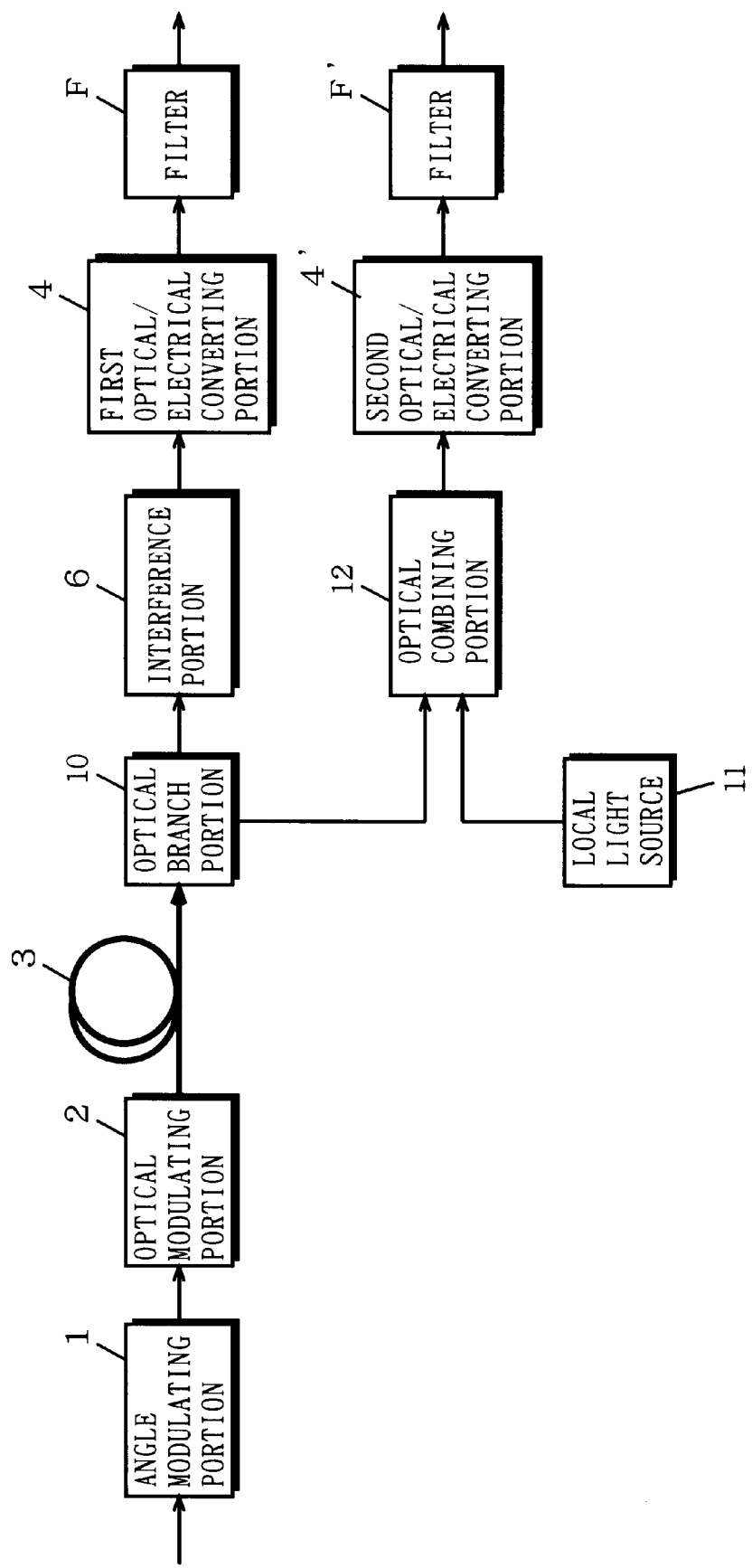
FIG. 18 is a block diagram showing the configuration of an optical transmission system according to a third embodiment of the present invention.

FIG. 18 is a block diagram showing the configuration of an optical transmission system according to a third embodiment of the present invention. In FIG. 18, the optical transmission system of the present embodiment includes an angle modulating portion 1, an optical modulating portion 2, an optical waveguide portion 3, an optical branch portion 10, an interference portion 6, a first optical/electrical converting portion 4, a local light source 11, an optical combining portion 12, a second optical/electrical converting portion 4', a filter F and a filter F', and is different from the second embodiment (refer to FIG. 17) in that the local light source 11 and the optical combining portion 12 are added. Therefore, the same reference numbers are assigned to the portions operating in the same manners as those in the second embodiment and the detailed description thereof is omitted here. The difference from the second embodiment will be mainly described below.

One optical signal of two optical signals, which are obtained by a branch and outputted in/from the optical branch portion 10, is subjected to angle modulation by the interference portion 6 and the first optical/electrical converting portion 4, and further subjected to filtering processing by the filter F, to be re-converted into an electrical signal corresponding to an electrical signal inputted to the angle modulating portion 1. The other optical signal of the two optical signals, which is obtained by the branch and outputted, is combined with a light outputted from the local light source 11 by the optical combining portion 12, to be inputted to the second optical/electrical converting portion 4'. The second optical/electrical converting portion 4' performs heterodyne detection with the combined two lights. Thereby, from the second optical/electrical converting portion 4' is outputted a beat signal of a frequency corresponding to difference in wavelength between the two lights. The filter F' derives only beat signal component from the signal outputted from the second optical/electrical converting portion 4', to output the beat signal component.

(Fourth Embodiment)

Figure 19:
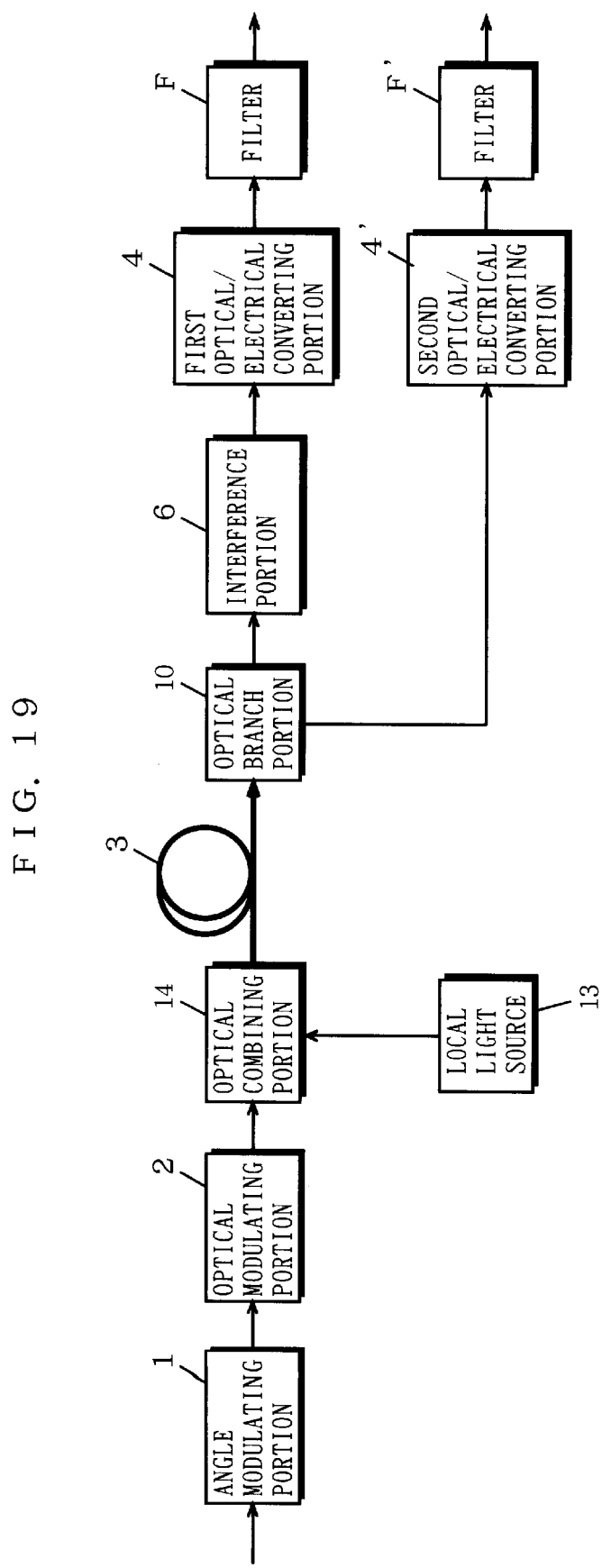
FIG. 19 is a block diagram showing the configuration of an optical transmission system according to a fourth embodiment of the present invention.

FIG. 19 is a block diagram showing the configuration of an optical transmission system according to a fourth embodiment of the present invention. In FIG. 19, the optical transmission system of the present embodiment includes an angle modulating portion 1, an optical modulating portion 2, a local light source 13, an optical combining portion 14, an optical waveguide portion 3, an optical branch portion 10, an interference portion 6, a first optical/electrical converting portion 4, a second optical/electrical converting portion 4', a filter F and a filter F', and is different from the second embodiment (refer to FIG. 17) in that the local light source 13 and the optical combining portion 14 are added. Therefore, the same reference numbers are assigned to the portions operating in the same manners as those in the second embodiment and the detailed description thereof is omitted. The difference from the second embodiment will be mainly described below.

An optical signal outputted from the optical modulating portion 2 is combined with a light outputted from the local light source 13 by the optical combining portion 14, to be transmitted to the optical branch portion 10 by the optical waveguide portion 3. One optical signal of two optical signals, which are obtained by a branch and outputted in/from the optical branch portion 10, is subjected to angle demodulation by the interference portion 6 and the first optical/electrical converting portion 4 and further subjected to filtering processing by the filter F, to be re-converted into an electrical signal corresponding to an electrical signal inputted to the angle modulating portion 1. The other optical signal of the two optical signals, which is obtained by the branch and outputted, is subjected to heterodyne detection in the second optical/electrical converting portion 4'. Thereby, outputted from the second optical/electrical converting portion 4' is a beat signal of a frequency corresponding to difference in wavelength between the optical signal outputted from the optical modulating portion 2 and the light from the local light source 13. The filter F', derives the beat signal component from the signal outputted from the second optical/electrical converting portion 4', to output the beat signal component.

(Fifth Embodiment)

Figure 20:
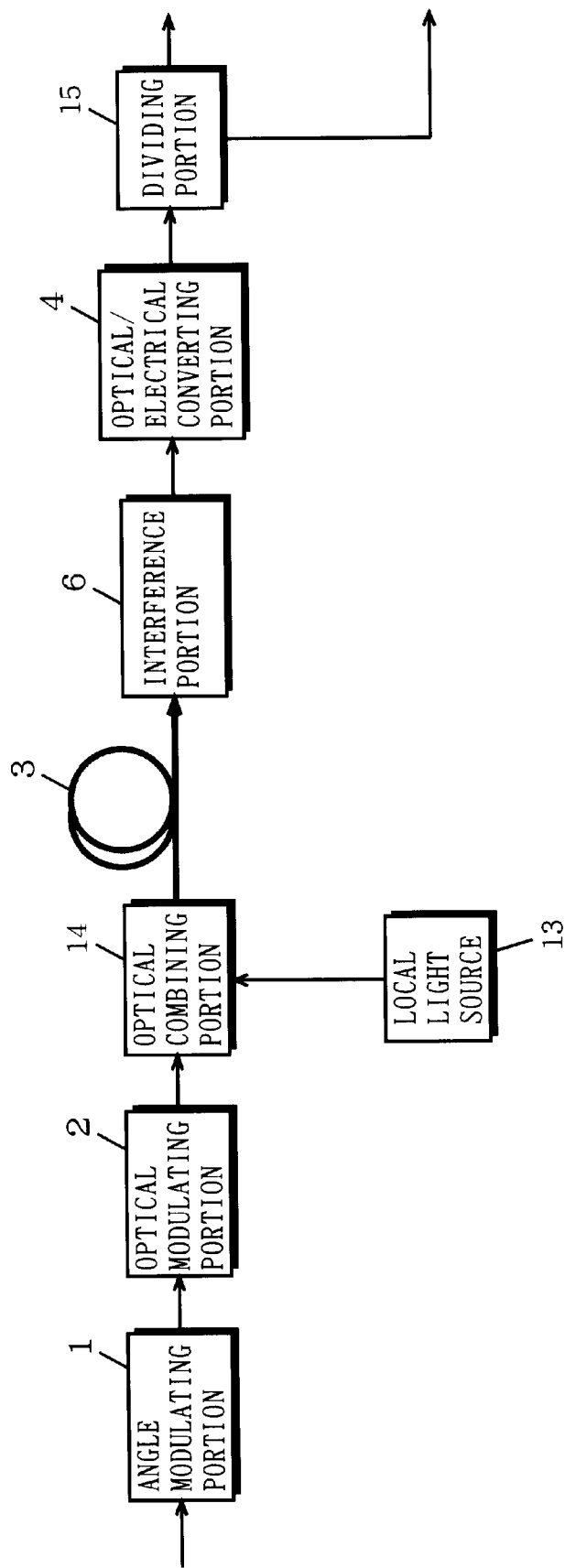
FIG. 20 is a block diagram showing the configuration of an optical transmission system according to a fifth embodiment of the present invention.

FIG. 20 is a block diagram showing the configuration of an optical transmission system according to a fifth embodiment of the present invention. In FIG. 20, the optical transmission system of the present embodiment includes an angle modulating portion 1, an optical modulating portion 2, a local light source 13, an optical combining portion 14, an optical waveguide portion 3, an interference portion 6, an optical/electrical converting portion 4 and a dividing portion 15, and is different from the first embodiment (refer to FIG. 1) in that the local light source 13, the optical combining portion 14 and the dividing portion 15 are added. Therefore, the same reference numbers are assigned to the portions operating in the same manners as those in the first embodiment and detailed description thereof is omitted. The difference from the first embodiment will be mainly described below.

An optical signal outputted from the optical modulating portion 2 is combined with a light outputted from the local light source 13 on the optical combining portion 14 and then transmitted to the interference portion 6 by the optical waveguide portion 3. The optical signal is subjected to angle demodulation and heterodyne detection by the interference portion 6 and the optical/electrical converting portion 4. At this time, the outputted signal from the optical/electrical converting portion 4 includes an angle-demodulated signal component corresponding to an electrical signal inputted to the angle modulating portion 1 and a beat signal component of a frequency corresponding to difference in wavelength between the optical signal outputted from the optical modulating portion 2 and the light outputted from the local light source 13. The dividing portion 15 branches the outputted signal from the optical/electrical converting portion 4 into two and subjects the two signal obtained by the branch to predetermined filtering processing, respectively to separate the angle-demodulated signal component and the beat signal component and output the two signals.

As described in the above, the optical transmission systems in FIG. 18, FIG. 19 and FIG. 20 can provide different kind of networks (for example, a wired network using an optical fiber and a wireless network) at the same time, as in the case with the optical transmission system in FIG. 17. Moreover, regardless of a value of the frequency of the angle-modulated signal outputted from the angle modulating portion 1, the optical transmission systems can suitably set the wavelength of the optical signal from the optical modulating portion 2 and the wavelength of the light from the local light source 11 or 13, to freely convert the frequency of the angle-modulated signal which is a beat signal outputted from the second optical/electrical converting portion 4', thereby making it possible to generate an angle-modulated signal of the frequency suitable for each network connected to the second optical/electrical converting portion 4' and thereafter. Thus, a more flexible system can be configured.

(Sixth Embodiment)

Figure 21:
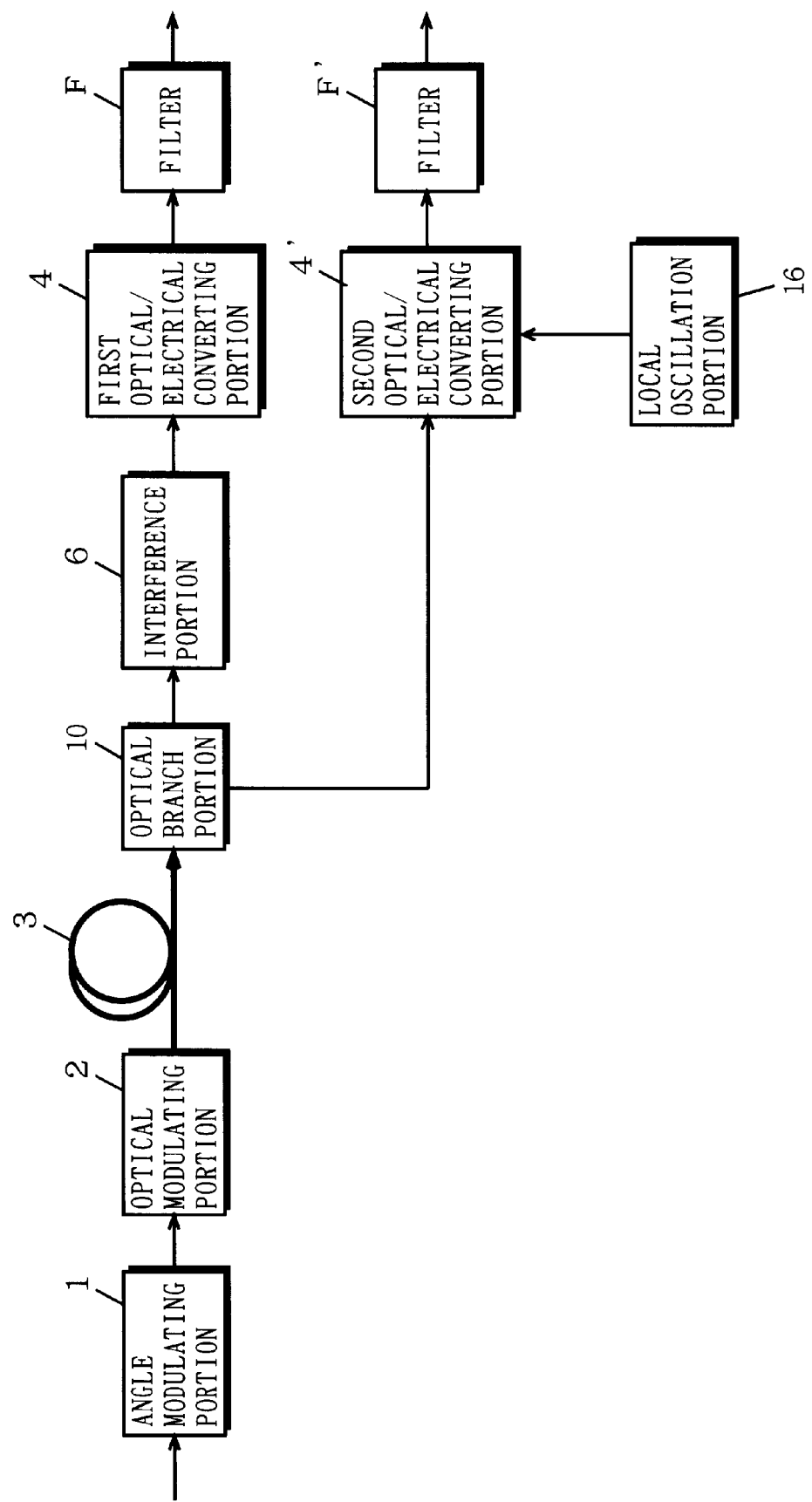
FIG. 21 is a block diagram showing the configuration of an optical transmission system according to a sixth embodiment of the present invention.

FIG. 21 is a block diagram showing the configuration of an optical transmission system according to a sixth embodiment of the present invention. In FIG. 21, the optical transmission system of the present embodiment includes an angle modulating portion 1, an optical modulating portion 2, an optical waveguide portion 3, an optical branch portion 10, an interference portion 6, a first optical/electrical converting portion 4, a second optical/electrical converting portion 4', a local oscillation portion 16, a filter F and a filter F', and is different from the second embodiment (refer to FIG. 17) in that the local oscillation portion 16 is added. Therefore, the same reference numbers are assigned to the portions operating in the same manners as those in the second embodiment and the detailed description thereof is omitted. The difference from the second embodiment will be mainly described below.

The optical branch portion 10 branches an optical signal, which is outputted from the optical modulating portion 2 and guided by the optical waveguide portion 3, into two. One optical signal of the two optical signals is subjected to angle demodulation by the interference portion 6 and the first optical/electrical converting portion 4 and further subjected to filtering processing by the filter F, to be re-converted into an electrical signal corresponding to an electrical signal inputted to the angle modulating portion 1. The other optical signal of the two optical signals is inputted to the second optical converting portion 4'. A bias voltage of the second optical/electrical converting portion 4' is modulated with a local signal (an unmodulated signal) outputted from the local oscillation portion 16. Accordingly, the second optical/electrical converting portion 4' square-law detects the receive d optical signal and thereby generates a beat signal induced by the angle-modulated signal outputted from the angle modulating portion 102 and the local signal, to output the beat signal. The filter F' derives only beat signal component from the outputted signal from the second optical/electrical converting portion 4'.

(Seventh Embodiment)

Figure 22:
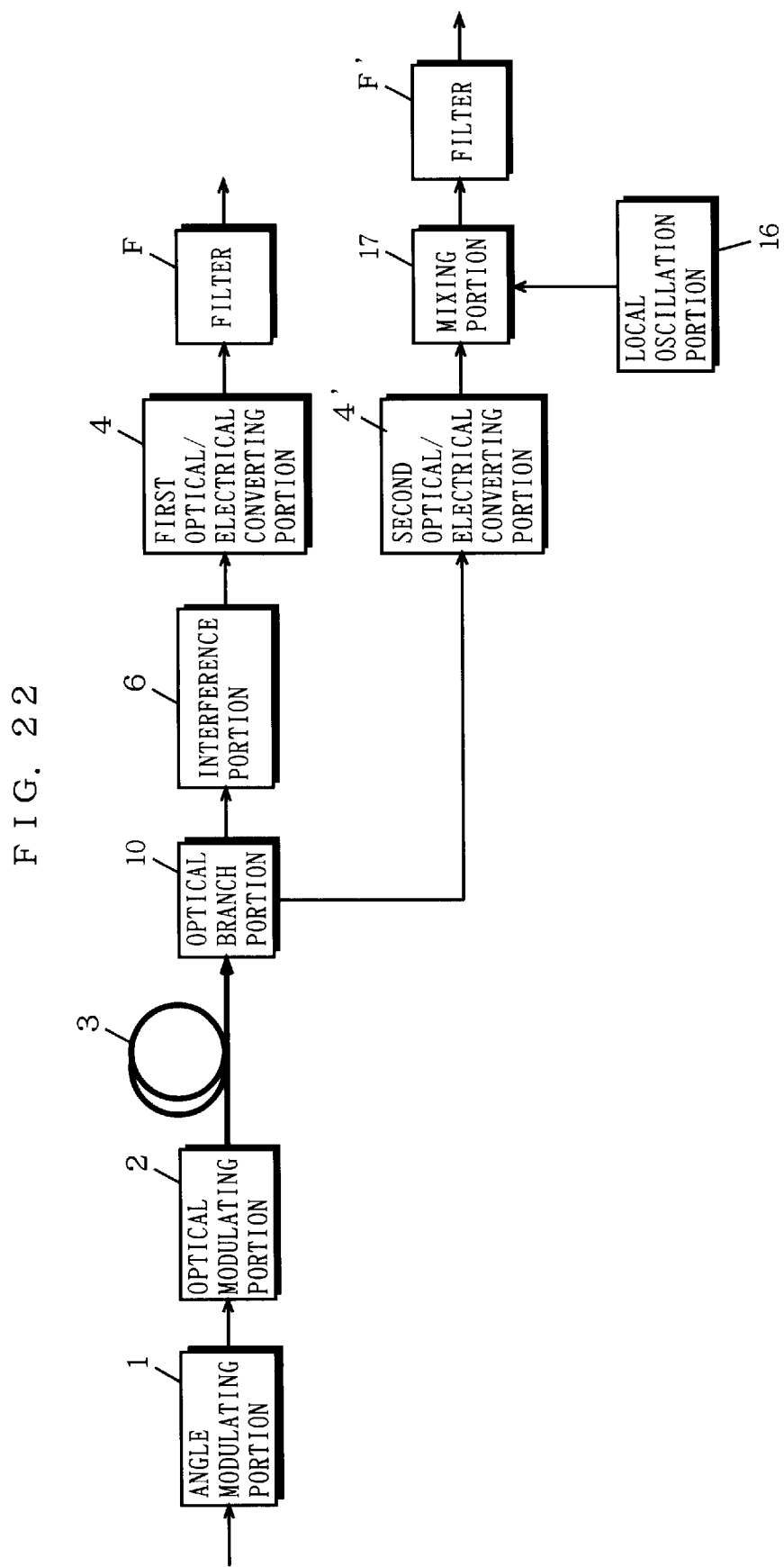
FIG. 22 is a block diagram showing the configuration of an optical transmission system according to a seventh embodiment of the present invention.

FIG. 22 is a block diagram showing the configuration of an optical transmission system according to a seventh embodiment of the present invention. In FIG. 22, the optical transmission system of the present embodiment includes an angle modulating portion 1, an optical modulating portion 2, an optical waveguide portion 3, an optical branch portion 10, an interference portion 6, a first optical/electrical converting portion 4, a second optical/electrical converting portion 4', a local oscillation portion 16 and a mixing portion 17, and is different from the second embodiment (refer to FIG. 17) in that the local oscillation portion 16 and the mixing portion 17 are added. Therefore, the same reference numbers are assigned to the portions operating in the same manners as those in the second embodiment and the detailed description thereof is omitted. The difference from the second embodiment will be mainly described.

The optical branch portion 10 branches an optical signal, which is outputted from the optical modulating portion 2 and guided by the optical waveguide portion 3, into two. One optical signal of the two optical signals is subjected to angle demodulation by the interference portion 6 and the first optical/electrical converting portion 4 and further subjected to filtering processing by the filter F, to be re-converted into an electrical signal corresponding to an electrical signal inputted to the angle modulating portion 1. The other optical signal of the two optical signals is subjected to square-law detection in the second optical/electrical converting portion 4' and an optical-intensity-modulated component or an optical-amplitude-modulated component of the optical signal is re-converted into an electrical signal. Thereby, from the second optical/electrical converting portion 4' is outputted the same angle-modulated signal as the angle-modulated signal outputted from the angle modulating portion 1. The mixing portion 17 mixes the angle-modulated signal and a local signal (an unmodulated signal) outputted from the local oscillation portion 16, to generate a beat signal induced by the angle-modulated signal and the local signal and output the beat signal. The filter F' derives only beat signal component from the outputted signal of the second optical/electrical converting portion 4' and outputs the beat signal component.

As described in the above, the optical transmission system in FIG. 21 and FIG. 22 can provide different kind of networks at the same time, as in the case with the optical transmission system in FIG. 17. Further, regardless of a value of the frequency of the angle-modulated signal outputted from the angle modulating portion 1, the optical transmission system can suitably set the frequency of the local signal outputted from the local oscillation portion 16 to freely convert the frequency of an angle-modulated signal which is the beat signal induced by the angle-modulated signal and the local signal, thereby making it possible to generate an angle-modulated signal of a frequency suitable for each network connected to the second optical/electrical converting portion 4' and thereafter and send the angle-modulated signal. Thus, a more flexible system can be configured.

(Eighth Embodiment)

Figure 23:
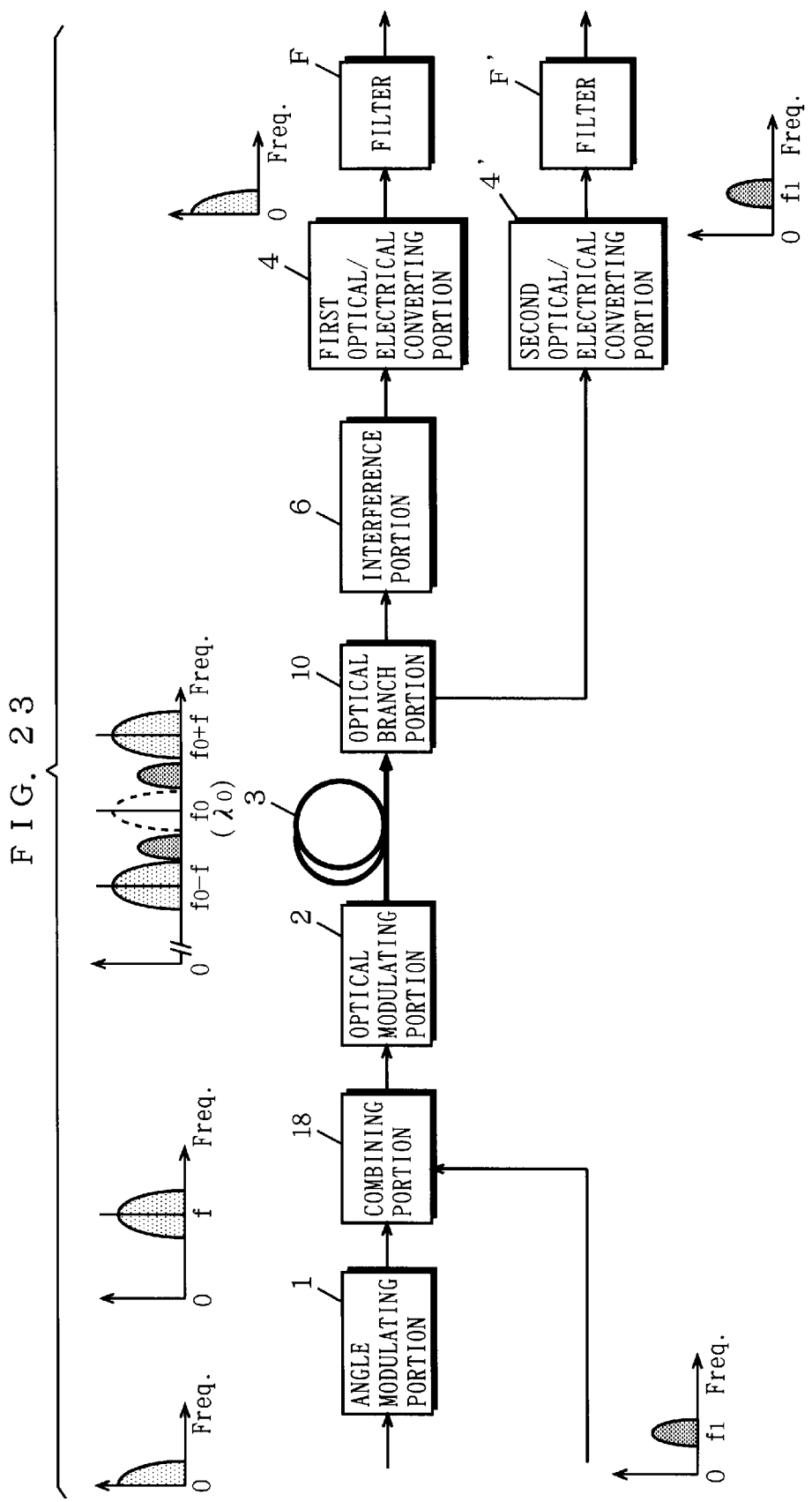
FIG. 23 is a block diagram showing the configuration of an optical transmission system according to an eighth embodiment of the present invention.

FIG. 23 is a block diagram showing the configuration of an optical transmission system according to an eighth embodiment of the present invention. FIG. 23 also shows schematic diagrams of frequency spectrums of signals in respective portions. In FIG. 23, the optical transmission system of the present embodiment includes an angle modulating portion 1, a combining portion 18, an optical modulating portion 2, an optical waveguide portion 3, an optical branch portion 10, an interference portion 6, a first optical/electrical converting portion 4, a second optical/electrical converting portion 4', a filter F and a filter F', and is different from the first embodiment (refer to FIG. 1) in that the combining portion 18, the optical branch portion 10, the second optical/electrical converting portion 4' and the filter F' are added. Therefore, the same reference numbers are assigned to the portions operating in the same manners as those in the first embodiment and the detailed description thereof is omitted here. The difference from the first embodiment will be mainly described below.

The combining portion 18 combines an angle-modulated signal outputted from the angle modulating portion 1, of which original signal is the first electrical signal, and the second electrical signal, to output the resultant signal. The optical modulating portion 2 converts the combined signal into an optical-modulated signal, to output the optical-modulated signal. The optical branch portion 10 branches the optical signal guided by the optical waveguide portion 3 into two. One optical signal of the two optical signals is subjected to angle demodulation with the interference portion 6 and the first optical/electrical converting portion 4 and further subjected to filtering processing by the filter F, to be re-converted into an electrical signal corresponding to the first electrical signal inputted to the angle modulating portion 1. The second optical/electrical converting portion 4' receives the other optical signal of the two optical signals and re-converts the optical-intensity-modulated component or the optical-amplitude-modulated component of the optical signal into an electrical signal with square-law detection, to output an electrical signal which corresponds to the second electrical signal inputted to the combining portion 18. The filter F' derives the second electrical signal component from the outputted signal of the second optical/electrical converting portion 4' and outputs the second electrical signal component.

In the eighth embodiment, it is preferable that occupied frequency bands of the first electrical signal, the angle-modulated signal and the second electrical signal do not overlap each other as shown in FIG. 23, which allows to separate each signal with filtering processing on the receiving side. Hence, a ninth embodiment described below devises a method of avoiding the overlaps of the occupied frequency bands of the above-mentioned signals.

(Ninth Embodiment)

Figure 24:
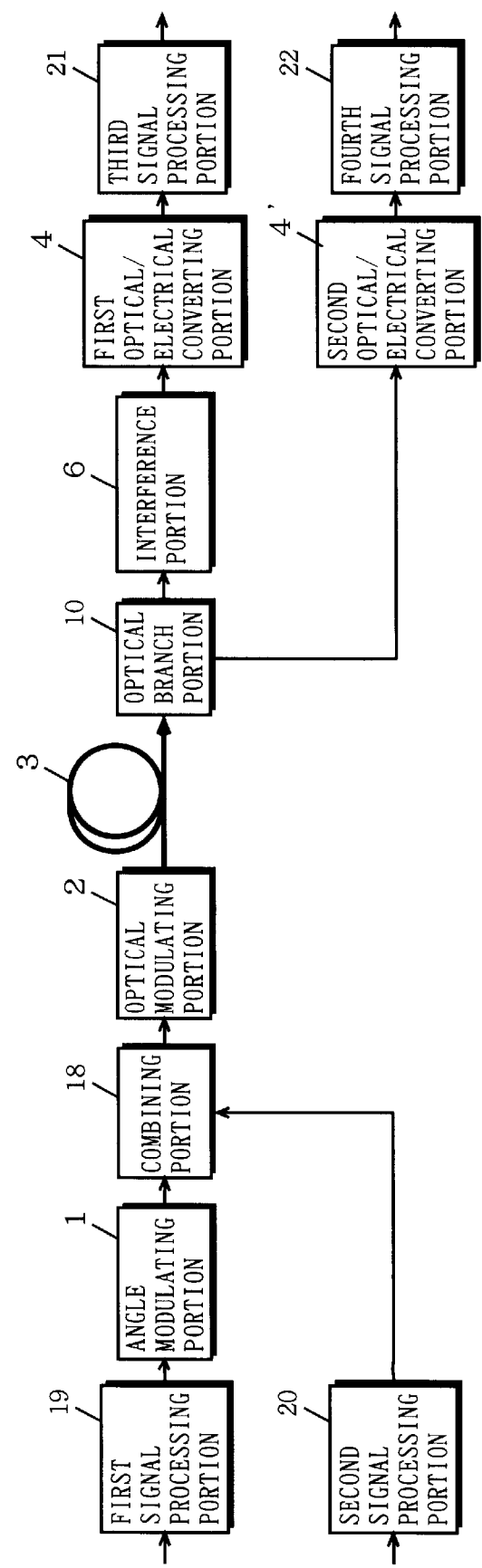
FIG. 24 is a block diagram showing the configuration of an optical transmission system according to a ninth embodiment of the present invention.

FIG. 24 is a block diagram showing the configuration of an optical transmission system according to the ninth embodiment of the present invention. The ninth embodiment is an application of the above-mentioned eighth embodiment and therein first, second, third and fourth signal processing portions 19, 20, 21 and 22 are added to the configuration of the eighth embodiment. Each of the third and fourth signal processing portions 21 and 22 also has a function of filter and therefore the filters F and F' are not provided in the present embodiment.

The first and second signal processing portions 19 and 20 limit the frequency bands of a first electrical signal and a second electrical signal so that the frequency bands occupied by the first and second electrical signals do not overlap each other, to output the electrical signals. For example, when the occupied frequency bands of the two electrical signals overlap each other, either one or both of the bands are limited. Though this bandwidth limitation causes a distortion of a reproduced waveform on the receiving side, such waveform distortion is corrected in the third and fourth signal processing portions 21 and 22. Furthermore, a carrier frequency in the angle modulating portion 1 is set to a frequency which prevents the occupied frequency band of the angle-modulated signal from overlapping with both occupied frequency bands of the first and second electrical signals.

The third signal processing portion 21 passes only a frequency component corresponding to the occupied frequency band of the first electrical signal among signals outputted from the first optical/electrical converting portion 4. The third signal processing portion 21 also reproduces waveform information, which was lost in the signal processing by the first signal processing portion 19, as required. The fourth signal processing portion 22 passes only a frequency component corresponding to the occupied frequency band of the second electrical signal among signals outputted from the second optical/electrical converting portion 4'. The fourth signal processing portion 22 also reproduces waveform information, which was lost in the signal processing by the second signal processing portion 20, as required. Waveform information lost in the first signal processing portion 19 or the second signal processing portion 20 is a low-frequency component such as a DC component and the like as an example, and in this case, the signal waveform becomes, for example, a differential waveform of the original signal. Accordingly, differential reproduction (integration) processing is performed in the third signal processing portion 21 or the fourth signal processing portion 22, thereby making it possible to reproduce the original signal waveform.

As described in the above, the optical transmission system in FIG. 23 or FIG. 24 converts a first electrical signal into an angle-modulated signal, optically transmits the angle-modulated signal, subjects the signal to angle demodulation using the interference portion 6 and the first optical/electrical converting portion 4 to produce the first electrical signal, and at the same time optically transmits a second electrical signal other than the first electrical signal, to derive the second electrical signal by the second optical/electrical converting portion 4'. This makes it possible, for example, to simultaneously transmit different types of signals such as an analog signal and a digital signal with one optical fiber. Even in the case where the transmitted signal includes a high-frequency signal such as a microwave, a millimetre wave and the like, it is possible to construct a flexible and greatly economical system which allows reception and demodulation in a low cost configuration with optical signal processing. While in the eighth and ninth embodiments, the case where two electrical signals are simultaneously transmitted is described, three or more electrical signals can, of course, be simultaneously transmitted.

(Tenth Embodiment)

Figure 25:
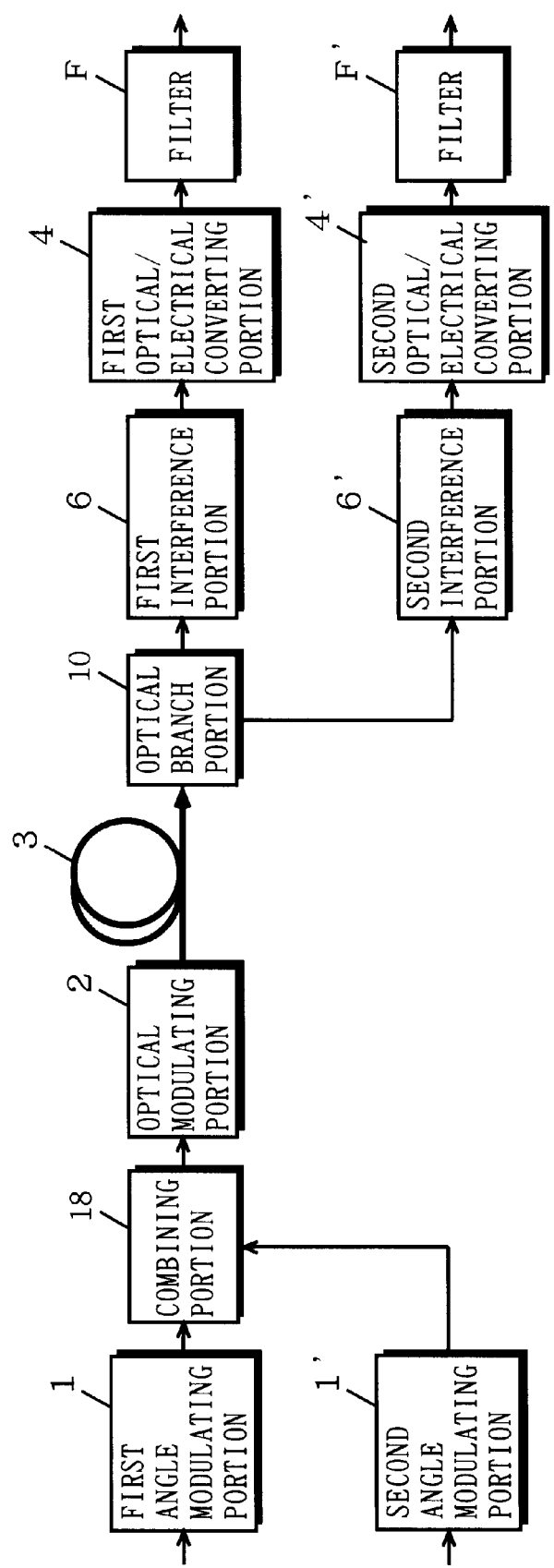
FIG. 25 is a block diagram showing the configuration of an optical transmission system according to a tenth embodiment of the present invention.

FIG. 25 is a block diagram showing the configuration of an optical transmission system according to a tenth embodiment of the present invention. In FIG. 25, the optical transmission system of the present embodiment includes a first angle modulating portion 1, a second angle modulating portion 1', a combining portion 18, an optical modulating portion 2, an optical waveguide portion 3, an optical branch portion 10, a first interference portion 6, a second interference portion 6', a first optical/electrical converting portion 4, a second optical/electrical converting portion 4', a filter F and a filter F', and is different from the first embodiment (refer to FIG. 1) in that the second angle modulating portion 1', the combining portion 18, the optical branch portion 10, the second interference portion 6', the second optical/electrical converting portion 4' and the filter F' are added. Therefore, the same reference numbers are assigned to the portions operating in the same manners as those in the first embodiment and the detailed description thereof is omitted. The difference from the first embodiment will be mainly described below.

The combining portion 18 combines a first angle-modulated-signal outputted from the first angle modulating portion 1 performing angle modulation using a first electrical signal as the original signal and a second angle-modulated signal outputted from the second angle modulating portion 1' performing angle modulation using a second electrical signal as the original signal, to output the resultant signal. The optical modulating portion 2 converts the combined signal into an optical-modulated signal, to output the optical-modulated signal. The optical branch portion 10 branches the optical signal guided by the optical waveguide portion 3 into two. One optical signal of the two optical signals is subjected to angle demodulation by the first interference portion 6 and the first optical/electrical converting portion 4 and further subjected to filtering processing by the filter F, to be re-converted into an electrical signal corresponding to the first electrical signal inputted to the first angle modulating portion 1. The other optical signal of the two optical signals is subjected to angle demodulation by the second interference portion 6' and the second optical/electrical converting portion 4' and further subjected to filtering processing by the filter F', to be re-converted into an electrical signal corresponding to the second electrical signal inputted to the second angle modulating portion 1'.

In the present embodiment, it is preferable that occupied frequency bands of the first and second electrical signals and the first and second angle-modulated signals do not overlap each other, which allows to separate each signal with filtering processing on the receiving side. Hence, an eleventh embodiment described below devises a method of avoiding overlaps of occupied frequency bands of the above-mentioned signals.

(Eleventh Embodiment)

Figure 26:
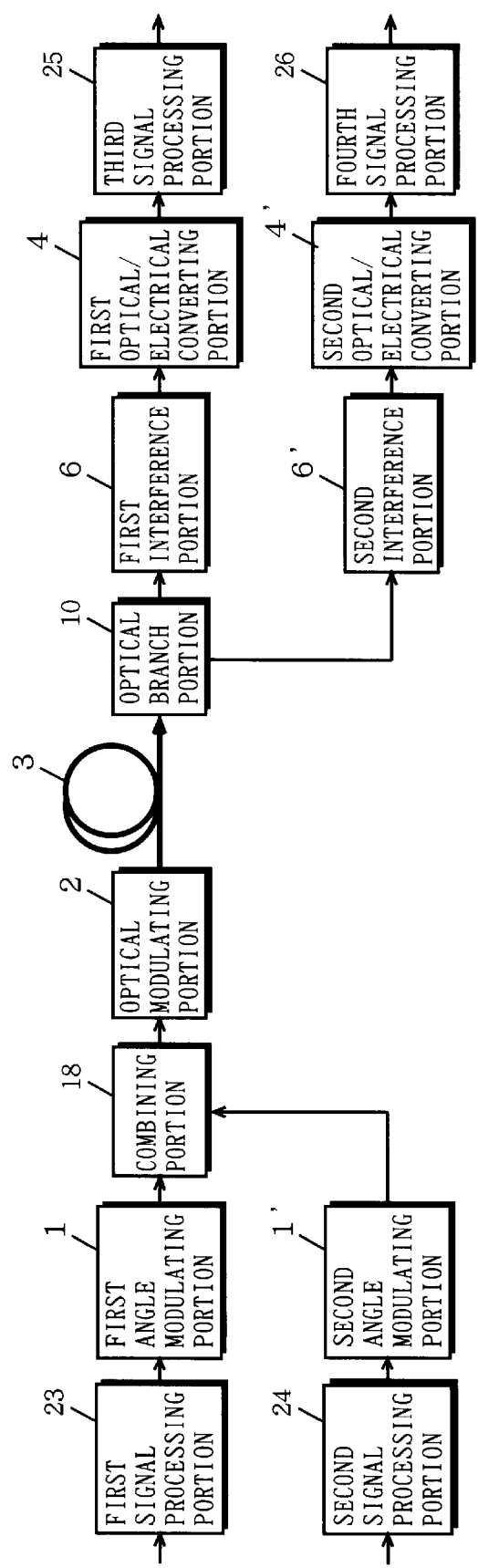
FIG. 26 is a block diagram showing the configuration of an optical transmission system according to an eleventh embodiment of the present invention.

FIG. 26 is a block diagram showing the configuration of an optical transmission system according to the eleventh embodiment of the present invention. The eleventh embodiment is an application of the tenth embodiment, and therein first, second, third and fourth signal processing portions 23, 24, 25 and 26 are added to the configuration of the tenth embodiment. The third and fourth signal processing portions 25 and 26 also have functions of filter and therefore the filters F and F' are not provided in the present embodiment.

The first signal processing portion 23 and the second signal processing portion 24 limit the frequency bands of a first electrical signal and a second electrical signal so that frequency bands occupied by the first electrical signal and the second electrical signal do not overlap each other, to output the two electrical signals. For example, when the occupied frequency bands of the two electrical signals overlap each other, either one or both of the bands of the two signals are limited. Though this bandwidth limitation causes a distortion of a reproduced waveform on the receiving side, such waveform distortion is corrected by the third and fourth signal processing portions 25 and 26. Furthermore, carrier frequencies in the first angle modulating portion 1 and the second angle modulating portion 1' are set to frequencies which prevent the occupied frequency bands of the first electrical signal, the second electrical signal, the first angle-modulated signal and the second angle-modulated signal from overlapping each other.

The third signal processing portion 25 passes only a frequency component corresponding to the occupied frequency band of the first electrical signal among signals outputted from the first optical/electrical converting portion 4. The third signal processing portion 25 also reproduces waveform information, which was lost in the signal processing by the first signal processing portion 23, as required. The fourth signal processing portion 26 passes only a frequency component corresponding t o the occupied frequency band of the s econd electrical signal among signals outputted from the second optical/electrical converting portion 4'. The fourth signal processing portion 26 also reproduces waveform information, which was lost in the signal processing by the second signal processing portion 24, as required. Waveform information lost in the first signal processing portion 23 or the second signal processing portion 24 is a low-frequency component such as a DC component and the like, and in this case, the signal waveform becomes, for example, a differential waveform of the original signal. Accordingly, differential reproduction (integration) processing is performed in the third signal processing portion 25 or the fourth signal processing portion 26, thereby making it possible to reproduce the original signal waveform.

As described in the above, the optical transmission system in FIG. 25 or FIG. 26 convert s first and second electrical signals into angle-modulated signals, then combines and optically transmits the angle-modulated signals and subjects the resultant signal to angle demodulation using the interference portion and the optical/electrical converting portion, to reproduce the first and second electrical signal. This makes it possible to simultaneously transmit different types of signals such as an analog signal and a digital signal with one optical fiber. Even in the case where the transmitted signal includes a high-frequency signal such as a micro wave, a millimetre wave and the like, it is possible to construct a flexible and greatly economical system which can receive and subject the signal to demodulation in a low cost configuration with optical signal processing. While in the tenth and eleventh embodiments, the case where two electrical signals are simultaneously transmitted is described, three or more electrical signals can, of course, be simultaneously transmitted.

(Twelfth Embodiment)

Figure 27:
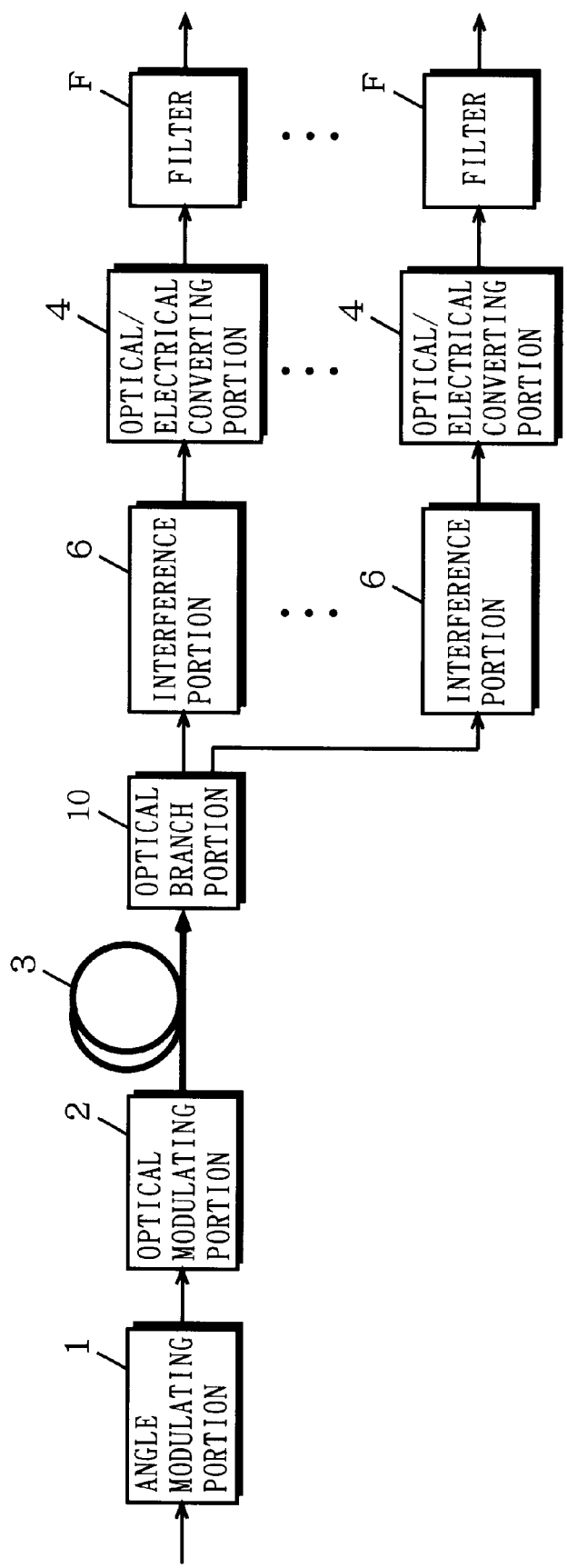
FIG. 27 is a block diagram showing the configuration of an optical transmission system according to a twelfth embodiment of the present invention.

FIG. 27 is a block diagram showing the configuration of an optical transmission system according to a twelfth embodiment of the present invention. The optical transmission system of the present embodiment has a configuration in which the configuration of the first embodiment shown in FIG. 1 is extended in order to transmit a multichannel frequency-division-multiplexed signal. In FIG. 27, to an angle modulating portion 1 is inputted a n-channel frequency-division-multiplexed signal which is obtained by frequency-division-multiplexing n-channel electrical signals. The optical branch portion 10 branches an inputted optical signal into n optical signals. A plurality of optical signal processing portions constituted by interference portions 6, optical/electrical converting portions 4 and filters F are provided in parallel, corresponding to each of the n optical signals outputted from the optical branch portion 10. The optical signal processing portions each subject the electrical signals on different channels to demodulation. Therefore, the delay for an optical signal in the interference portion 6 in an optical signal processing portion is set to a value most suitable for a frequency of an electrical signal on a channel to be subjected to demodulation in the optical signal processing portion. A passband of each of the filters F is designed so as to pass only an electrical signal on a channel to be subjected to demodulation. Since the other configuration of the present embodiment is the same as that in the first embodiment shown in FIG. 1, the same reference numbers are assigned to the corresponding portions and the description thereof is omitted here. Such extension as shown in the present embodiment can, of course, be made in the other above-described embodiments.

(Thirteenth Embodiment)

Figure 28:
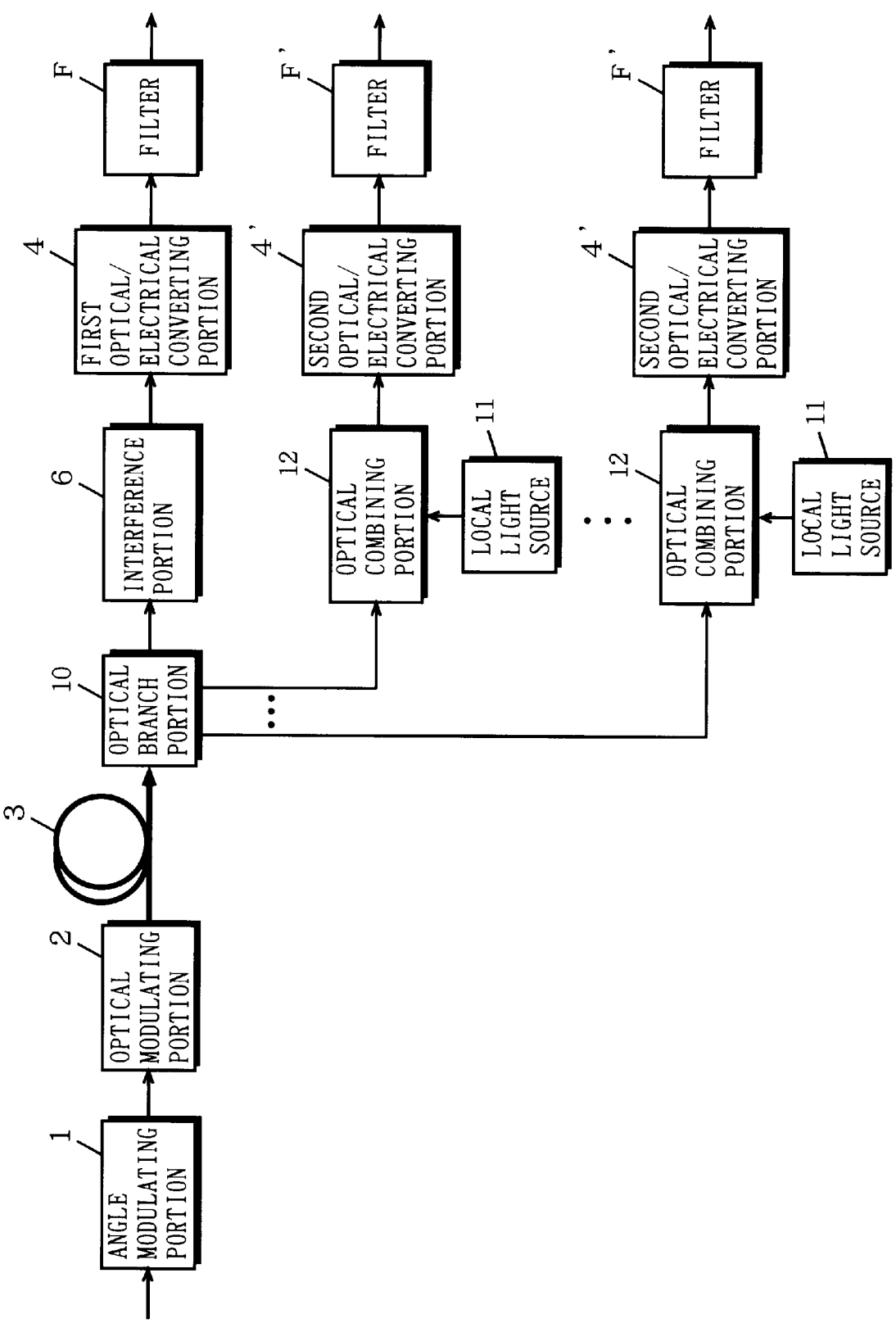
FIG. 28 is a block diagram showing the configuration of an optical transmission system according to a thirteenth embodiment of the present invention.

FIG. 28 is a block diagram showing the configuration of an optical transmission system according to a thirteenth embodiment of the present invention. The present embodiment has a configuration in which the third embodiment shown in FIG. 18 is extended in order to derive a plurality of beat signals of different frequencies. In FIG. 28, a plurality of optical heterodyne portions constituted by local light sources 11, optical combining portions 12, second optical/electrical converting portions 4' and filters F' are provided in parallel. Wavelengths of lights outputted from the local light sources 11 are set so as to be different from each other depending on frequencies of beat signals to be derived in the optical heterodyne portions. A passband of each of the filters F' is designed so as to pass only a beat signal of a frequency to be derived. Since the other configuration of the present embodiment is the same as that in the third embodiment shown in FIG. 18, the same reference numbers are assigned to the corresponding portions and the description thereof is omitted here.

(Fourteenth Embodiment)

Figure 29:
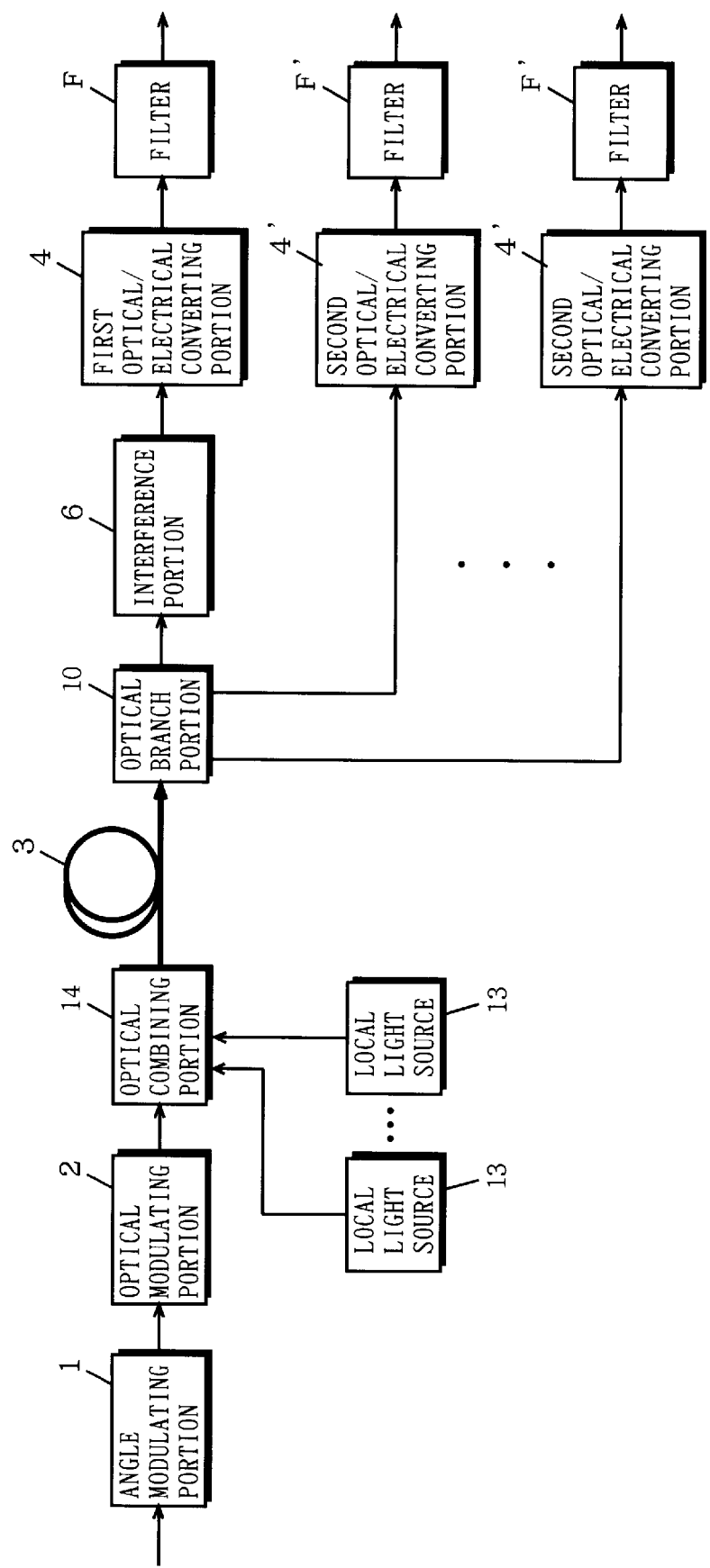
FIG. 29 is a block diagram showing the configuration of an optical transmission system according to a fourteenth embodiment of the present invention.

FIG. 29 is a block diagram showing the configuration of an optical transmission system according to a fourteenth embodiment of the present invention. The present embodiment has a configuration in which the fourth embodiment shown in FIG. 19 is extended in order to derive a plurality of beat signals of different frequencies. In FIG. 29, an optical combining portion 14 combines an optical signal outputted from an optical modulating portion 2 and a light outputted from each of a plurality of local light sources 13. Wavelengths of lights outputted from the local light sources 13 are each set so as to be different from each other. A plurality of optical detecting portions constituted by second optical/electrical converting portions 4' and filters F' are provided in parallel. A passband of each of the filters F' is designed so as to pass only a beat signal of a frequency to be derived. Since the other configuration of the present embodiment is the same as that in the fourth embodiment shown in FIG. 19, the same reference numbers are assigned to the corresponding portions and the description thereof is omitted here.

Extension for the same purpose as that of the extension performed in the thirteenth and fourteenth embodiments (that is extension in order to derive a plurality of beat signals of different frequencies) can be made in the third to seventh embodiments, although those are not shown.

The more specific examples of configuration and the operational examples of each portions described for the first embodiment (refer to FIGS. 2 to 16) can be applied to the second to fourteenth embodiments (FIGS. 17 to 29) as it is.

While the invention has been described in detail, the foregoing description is in all aspects illustrative and not restrictive. It is understood that numerous other modifications and variations can be devised without departing from the scope of the invention.

What is claimed is:

1. An optical transmission system for optically transmitting an angle-modulated signal, comprising:
   an optical modulating portion for converting said angle-modulated signal into an optical-modulated signal;
   an interference portion for separating said optical-modulated signal into a plurality of optical signals having predetermined difference in propagation delay and then combining the optical signals; and
   an optical/electrical converting portion, having square-law-detection characteristics, for converting the combined optical signal outputted from said interference portion into an electrical signal,
   said interference portion and said optical/electrical converting portion constituting a delayed detection system of an optical signal, and the delayed detection system performing conversion processing of an optical signal into an electrical signal and angle demodulation processing simultaneously.

2. The optical transmission system according to claim 1, wherein said angle-modulated signal is an FM signal obtained by subjecting an analog signal to frequency modulation.

3. The optical transmission system according to claim 1, wherein said angle-modulated signal is a PM signal obtained by subjecting an analog signal to phase modulation.

4. The optical transmission system according to claim 1, wherein said angle-modulated signal is an FSK modulated signal obtained by subjecting a digital signal to frequency modulation.

5. The optical transmission system according to claim 1, wherein said angle-modulated signal is a PSK modulated signal obtained by subjecting a digital signal to phase modulation.

6. The optical transmission system according to claim 1, wherein said optical modulating portion generates an optical-intensity-modulated signal as said optical-modulated signal.

7. The optical transmission system according to claim 6, wherein
   said optical modulating portion comprises:
      a light source for outputting a light with a given optical intensity and a given wavelength;
      an optical branch portion for branching the light from said light source into two;
      first and second optical phase modulating portions, provided for the two outputted lights from said optical branch portion respectively, for subjecting the outputted lights to optical phase modulation using said angle-modulated signal as an original signal; and
      an optical coupling portion for combining the two optical-phase-modulated signals outputted from said first and second optical phase modulating portions.

8. The optical transmission system according to claim 6, wherein said interference portion comprises:
  an optical branch portion for branching an inputted optical signal into a first optical signal and a second optical signal;
  an optical delay portion for providing the second optical signal outputted from said optical branch portion with a predetermined delay; and
  an optical combining portion for combining the first optical signal outputted from said optical branch portion and the second optical signal outputted from said optical delay portion.

9. The optical transmission system according to claim 6, wherein
said optical modulating portion comprises:
  a light source for outputting a light with a given optical intensity and a given wavelength;
  an optical branch portion for branching the light from said light source into two;
  first and second optical phase modulating portions, provided for the two outputted lights from said optical branch portion respectively, for each subjecting each of the outputted lights to optical phase modulation using said angle-modulated signal as an original signal; and
  an optical directional coupling portion for combining the two optical-phase-modulated signals outputted from said first and second optical phase modulating portions and then dividing the resultant signal into first and second optical signals in which optical-intensity modulated components are set in opposite phases to each other, and
said interference portion comprises:
  an optical delay portion for providing the second optical signal outputted from said optical directional coupling portion with a predetermined delay; and
  an optical combining portion for combining the first optical signal outputted from said optical directional coupling portion and the second optical signal outputted from said optical delay portion.

10. The optical transmission system according to claim 6, wherein
said interference portion comprises:
  an optical waveguide portion for guiding the optical signal outputted from said optical modulating portion; and
  first and second optical transparent/reflecting portions, cascaded on said optical waveguide portion at a prescribed interval, for respectively transmitting parts of the inputted optical signals and reflecting the remained parts, and
  propagation time in which an optical signal goes and returns between said first and second optical transparent/reflecting portions is said predetermined difference in propagation delay.

11. The optical transmission system according to claim 1, wherein said optical modulating portion generates an optical-amplitude-modulated signal as said optical-modulated signal.

12. The optical transmission system according to claim 11, wherein
said optical modulating portion comprises:
  a light source for outputting a light with a given optical intensity and a given wavelength;
  an optical branch portion for branching the light from said light source into two;
  first and second optical phase modulating portions, provided for the two outputted lights from said optical branch portion respectively, for each subjecting each of the outputted lights to optical phase modulation using said angle-modulated signals as an original signal; and
  an optical coupling portion for combining the two optical-phase-modulated signals outputted from said first and second optical phase modulating portions.

13. The optical transmission system according to claim 11, wherein
said interference portion comprises:
  an optical branch portion for branching the inputted optical signal into a first optical signal and a second optical signal;
  an optical delay portion for providing the second optical signal outputted from said optical branch portion with a predetermined delay; and
  an optical combining portion for combining the first optical signal outputted from said second optical branch portion and the second optical signal outputted from said optical delay portion.

14. The optical transmission system according to claim 11, wherein
said optical modulating portion comprises:
  a light source for outputting a light with a given optical intensity and a given wavelength;
  an optical branch portion for branching the light from said light source into two;
  first and second optical phase modulating portions, provided for the two outputted lights from said optical branch portion respectively, for each subjecting each of the outputted lights to optical phase modulation using said angle-modulated signal as an original signal; and
  an optical directional coupling portion for combining the two optical-phase-modulated signals outputted from said first and second optical phase modulating portions and then dividing the resultant signal into first and second optical signals in which optical-amplitude-modulated components are set in opposite phases to each other, and
said interference portion comprises:
  an optical delay portion for providing the second optical signal outputted from said optical directional coupling portion with a predetermined delay; and
  an optical combining portion for combining the first optical signal outputted from said optical directional coupling portion and the second optical signal outputted from said optical delay portion.

15. The optical transmission system according to claim 11, wherein
said interference portion comprises:
  an optical waveguide portion for guiding the optical signal outputted from said optical modulating portion; and
  first and second optical transparent/reflecting portions, cascaded on said optical waveguide portion at a predetermined interval, for respectively transmitting parts of the inputted optical signals and reflecting the remained parts, and
  propagation time in which an optical signal goes and returns between said first and second optical transparent/reflecting portions is said predetermined difference in propagation delay.

16. The optical transmission system according to claim 12, wherein predetermined optical phase modulation is performed in said first and second optical phase modulating portions so that difference between the optical phase shift by said first optical phase modulating portion and the optical phase shift by said second optical phase modulating portion is set in phase with said angle-modulated signal.

17. The optical transmission system according to claim 14, wherein predetermined optical phase modulation is performed in said first and second optical phase modulating portions so that difference between the optical phase shift by said first optical phase modulating portion and the optical phase shift by said second optical phase modulating portion is set in phase with said angle-modulated signal.

18. The optical transmission system according to claim 12, wherein predetermined optical phase modulation is performed in said first and second optical phase modulating portions so that difference between the optical phase shift by said first optical phase modulating portion and the optical phase shift by said second optical phase modulating portion is set in opposite phases with said angle-modulated signal.

19. The optical transmission system according to claim 14, wherein predetermined optical phase modulation is performed in said first and second optical phase modulating portions so that difference between the optical phase shift by said first optical phase modulating portion and the optical phase shift by said second optical phase modulating portion is set in opposite phases with said angle-modulated signal.

20. The optical transmission system according to claim 1, wherein a product value of a center angular frequency of said angle-modulated signal and the predetermined difference in propagation delay in said interference portion is set to be equal to $\pi/2$.

21. The optical transmission system according to claim 4, wherein the predetermined difference in propagation delay in said interference portion is set to be equal to one symbol length of said digital signal.

22. The optical transmission system according to claim 5, wherein the predetermined difference in propagation delay in said interference portion is set to be equal to one symbol length of said digital signal.

23. The optical transmission system according to claim 8, wherein polarization states of the first optical signal and the second optical signal to be combined in said optical combining portion are set to be the same with each other.

24. The optical transmission system according to claim 9, wherein polarization states of the first optical signal and the second optical signal to be combined in said optical combining portion are set to be the same with each other.

25. The optical transmission system according to claim 13, wherein polarization states of the first optical signal and the second optical signal to be combined in said optical combining portion are set to be the same with each other.

26. The optical transmission system according to claim 14, wherein polarization states of the first optical signal and the second optical signal to be combined in said optical combining portion are set to be the same with each other.

27. The optical transmission system according to claim 10, wherein polarization states of the optical signal transmitting through said first and second optical transparent/reflecting portions along said optical waveguide portion and the optical signal transmitting through said first optical transparent/reflecting portion, reflected at said second optical transparent/reflecting portion, reflected at said first optical transparent/reflecting portion and transmitting through said second optical transparent/reflecting portion are set to be the same with each other.

28. The optical transmission system according to claim 15, wherein polarization states of the optical signal transmitting through said first and second optical transparent/reflecting portions along said optical waveguide portion and the optical signal transmitting through said first optical transparent/reflecting portion, reflected at said second optical transparent/reflecting portion, reflected at said first optical transparent/reflecting portion and transmitting through said second optical transparent/reflecting portion are set to be the same with each other.

29. The optical transmission system according to claim 8, wherein said optical modulating portion and said interference portion are connected with a first optical waveguide portion, said interference portion and said optical/electrical converting portion are connected with a second optical waveguide portion, and said first and/or second optical waveguide portions are composed of single-mode optical fibers.

30. The optical transmission system according to claim 13, wherein said optical modulating portion and said interference portion are connected with a first optical waveguide portion, said interference portion and said optical/electrical converting portion are connected with a second optical waveguide portion, and said first and/or second optical waveguide portions are composed of single-mode optical fibers.

31. The optical transmission system according to claim 9, wherein said interference portion and said optical/electrical converting portion are connected with an optical waveguide portion, and said optical waveguide portion is composed of a single-mode optical fiber.

32. The optical transmission system according to claim 14, wherein said interference portion and said optical/electrical converting portion are connected with an optical waveguide portion, and said optical waveguide portion is composed of a single-mode optical fiber.

33. The optical transmission system according to claim 10, wherein a whole or a part of the optical waveguide portion in said interference portion is composed of a single-mode optical fiber.

34. The optical transmission system according to claim 15, wherein a whole or a part of the optical waveguide portion in said interference portion is composed of a single-mode optical fiber.

35. The optical transmission system according to claim 1, further comprising an amplitude adjusting portion for adjusting an amplitude of said angle-modulated signal and outputting said angle-modulated signal of a constant amplitude.

36. The optical transmission system according to claim 1, further comprising a bandwidth limiting portion for limiting a band of said angle-modulated signal.

* * * * *